United States Patent
Oya et al.

(10) Patent No.: US 8,124,317 B2
(45) Date of Patent: Feb. 28, 2012

(54) PLANOGRAPHIC PRINTING PLATE PRECURSOR AND METHOD OF PRODUCING A COPOLYMER USED THEREIN

(75) Inventors: Toyohisa Oya, Haibara-gun (JP); Shigefumi Kanchiku, Haibara-gun (JP); Keisuke Arimura, Haibara-gun (JP)

(73) Assignee: Fujifilm Corporation, Tokyo (JP)

( * ) Notice: Subject to any disclaimer, the term of this patent is extended or adjusted under 35 U.S.C. 154(b) by 628 days.

(21) Appl. No.: 12/233,988

(22) Filed: Sep. 19, 2008

(65) Prior Publication Data
US 2009/0087787 A1    Apr. 2, 2009

(30) Foreign Application Priority Data
Sep. 28, 2007   (JP) ................. 2007-255971

(51) Int. Cl.
G03F 7/09 (2006.01)
G03F 7/11 (2006.01)
G03F 7/027 (2006.01)

(52) U.S. Cl. ............. 430/271.1; 430/270.1; 430/281.1

(58) Field of Classification Search ........... 430/270.1, 430/271.1, 276.1, 287.1, 302, 281.1, 300; 526/307.6, 307.7, 318
See application file for complete search history.

(56) References Cited

U.S. PATENT DOCUMENTS

| | | | | |
|---|---|---|---|---|
| 3,622,473 | A * | 11/1971 | Ohta et al. | 205/50 |
| 4,062,817 | A | 12/1977 | Westerman | |
| 6,306,557 | B1 * | 10/2001 | Lin et al. | 430/288.1 |
| 2004/0185375 | A1 | 9/2004 | Takahashi et al. | |
| 2007/0072116 | A1 | 3/2007 | Yamasaki et al. | |
| 2007/0231739 | A1 * | 10/2007 | Koizumi | 430/270.1 |

FOREIGN PATENT DOCUMENTS
EP    1 170 149    *  1/2002
(Continued)

OTHER PUBLICATIONS

Japanese Office Action dated Nov. 22, 2011, corresponding to JP 2007-255971.

Primary Examiner — Anca Eoff
(74) Attorney, Agent, or Firm — Sughrue Mion, PLLC

(57) ABSTRACT

A planographic printing plate precursor having an intermediate layer containing a copolymer containing structural units represented by Formulae (1), (2) and (3) below, and a image forming layer, in this order on a support,

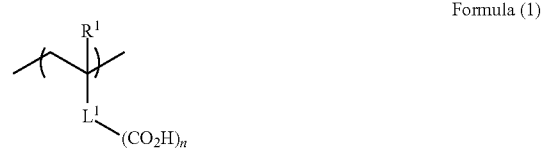

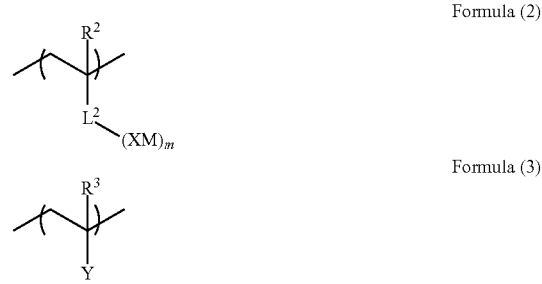

wherein $R^1$, $R^2$ and $R^3$ each represent a hydrogen atom, a substituent having from 1 to 30 carbon atoms, or a halogen atom, $L^1$ represents a single bond or a (n+1)-valent connecting group, n represents an integer of from 0 to 10, $L^2$ represents a single bond or a (m+1)-valent connecting group, X represents a carboxylate ion, M represents a counter cation necessary for neutralization of charge, m represents an integer of from 1 to 10, and Y represents a substituent having from 0 to 30 carbon atoms, provided that Y does not represent a carboxy group and does not represent the same constituent as (XM).

7 Claims, No Drawings

FOREIGN PATENT DOCUMENTS

| | | |
|---|---|---|
| JP | 7-103171 B2 | 11/1989 |
| JP | 7-285275 A | 10/1995 |
| JP | 10-228109 A | 8/1998 |
| JP | 11-38633 A | 2/1999 |
| JP | 2001-272787 A | 10/2001 |
| JP | 2005-99113 A | 4/2005 |
| JP | 2007199647 A | 8/2007 |
| JP | 2007248863 A | 9/2007 |
| WO | 8200147 A1 | 1/1982 |

\* cited by examiner

PLANOGRAPHIC PRINTING PLATE PRECURSOR AND METHOD OF PRODUCING A COPOLYMER USED THEREIN

CROSS-REFERENCE TO RELATED APPLICATION

This application claims priority under 35 USC 119 from Japanese Patent Application No. 2007-255971, the disclosure of which is incorporated by reference herein.

BACKGROUND OF THE INVENTION

1. Field of the Invention

The present invention relates to a planographic printing plate precursor including a specific copolymer-containing intermediate layer and an image forming layer in this order on a support and a method of producing a copolymer used in the intermediate layer. More specifically, the invention relates to a novel planographic printing plate precursor satisfying both high printing durability on an image area and low scumming on a non-image area.

2. Description of the Related Art

Conventionally presensitized plate precursors having a lipophilic photosensitive resin layer formed on a hydrophilic support have been widely used as planographic printing plate precursors. Desirable presensitized plates have been produced commonly by subjecting the image forming layer to mask exposure (surface exposure) through a lithographic film and then dissolving and removing the non-image areas thereof. In recent years, digital technology, by which image information is processed, stored, and outputted electronically by computer, is becoming increasingly popular. Accordingly, various newer image-output methods compatible with digital technology have been commercialized. As a result, there is an urgent need for a "computer to plate (CTP) technology" that allows direct production of printing plates by scanning a high-directivity light such as a laser beam according to digitalized image information without using a lithographic film, and thus there is also a need for planographic printing plate precursors that are compatible with the CTP technology.

As a planographic printing plate precursor compatible with such scanning exposure, a planographic printing plate precursor in which a lipophilic photosensitive resin layer (hereinafter, referred to as a image forming layer) containing a photosensitive compound that may generate an active species such as a radical or Bronsted acid by laser exposure is formed on a hydrophilic support has been proposed and already commercialized. It is possible to obtain negative planographic printing plates by scanning the planographic printing plate precursor with a laser according to digital information, generating an active species and thus causing physical and chemical changes in the image forming layer, insolubilizing the exposed regions, and developing the images thereon.

In particular, a planographic printing plate precursor in which a photopolymerizable image forming layer containing a photopolymerization initiator superior in sensitization speed, an addition-polymerizable, ethylenically unsaturated compound, and a binder polymer soluble in alkaline developing solution, and additionally an oxygen-blocking protective layer as needed, are formed on a hydrophilic support (see, for example, Japanese Patent Application Laid-Open (JP-A) No. 10-228109), is superior in productivity, easier in developing processing, and superior in resolution and inking property and is therefore a desirable printing plate precursor with superior printing properties.

For further improvement in productivity, i.e., in plate-making speed, a recording material that employs a photopolymerizable composition containing a cyanine dye having a particular structure, an iodonium salt and an addition-polymerizable compound having an ethylenically unsaturated double bond as the image forming layer and that does not require heat treatment after image exposure has been proposed (see, for example, Japanese Patent Application Publication (JP-B) No. 7-103171), however the recording material is susceptible to polymerization inhibition by oxygen in the air during the polymerization reaction and thus had problems that the sensitivity is lower and the strength of the formed image area is insufficient.

To address these problems, a method of forming a protective layer containing a water-soluble polymer on an image forming layer and a method of forming a protective layer containing an inorganic layered compound and a water-soluble polymer are known (see, for example, JP-A No. 11-38633). Presence of the protective layer enables prevention of polymerization inhibition, acceleration of the curing reaction of the image forming layer, and improvement in the strength of the image region.

A positive planographic printing plate precursor for infrared laser for direct plate making wherein a novolac resin or the like is used as an alkali-soluble resin is known. In particular, a positive planographic printing plate precursor of high image quality for infrared laser is disclosed which has a image forming layer wherein a substance that absorbs light to generate heat, various onium salts, and a positive photosensitive compound such as a quinonediazide compound, are added to an alkali-soluble resin having phenolic hydroxyl groups, such as novolac resin (see, for example, JP-A No. 7-285275).

Generally, these planographic printing plate precursors are provided with an intermediate layer (also referred to as an undercoat layer or an adhesion-improving layer) between a support and a image forming layer in order to improve the adhesiveness between the image forming layer and the support or to improve development removability of a light-unexposed region of the image forming layer (see, for example, JP-A No. 2001-272787).

However, when the conventional intermediate layer is used, development removability may be deteriorated during storage for a long time, particularly under high temperature/high humidity conditions, or when the upper layer of the intermediate layer is coated with a image forming layer, the intermediate layer may be dissolved in or swollen with a solvent in the image forming layer, thus sometimes exerting an adverse effect on printing durability and scumming, so there is demand for development of products capable of coping with improvement in request levels for higher printing durability and lower scumming in recent years.

Use of polymer compounds having acid groups in an intermediate layer is known (see, for example, JP-A No. 2005-99113). In JP-A No. 2005-99113, use of a polymer compound having a sulfonic acid or carboxylic acid as an acid group in an intermediate layer is disclosed. When sulfonic acid is contained as an acid group in a side chain, formation of an alkali metal salt, an ammonium salt or a water-soluble amine salt is disclosed. Such compound gives excellent printing durability and scumming resistance in a specific planographic printing plate precursor, however when used in, for example, a highly durable planographic printing plate precursor having a support whose surface roughness (arithmetic mean deviation of the profile) was increased to improve printing durability, the compound sometimes hardly attains sufficient scumming resistance.

In consideration of the problem, an object of the invention is to provide a planographic printing plate precursor excellent both in prevention of scumming on a non-image area and in printing durability attributable to the adhesiveness between an image area and a support.

Another object of the invention is to provide a method of producing a copolymer, which may easily synthesize a copolymer suitable for the planographic printing plate precursor.

As a result of extensive study, the inventors found that an intermediate layer having a specific polymer compound, and a image forming layer, are formed in this order on an aluminum support, thereby enabling achievement of the objects, and the invention was thereby completed.

SUMMARY OF THE INVENTION

A first aspect of the present invention provides the planographic printing plate precursor of the present invention has an intermediate layer and an image forming layer in this order on a support, said intermediate layer comprising at least one copolymer containing:

a structural unit represented by the following Formula (1):

Formula (1)

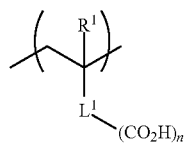

wherein $R^1$ represents a hydrogen atom, a substituent having from 1 to 30 carbon atoms, or a halogen atom, $L^1$ represents a single bond or a (n+1)-valent connecting group, and n represents an integer of from 1 to 10, a structural unit represented by the following Formula (2):

Formula (2)

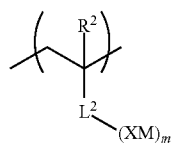

wherein $R^2$ represents a hydrogen atom, a substituent having from 1 to 30 carbon atoms, or a halogen atom, $L^2$ represents a single bond or a (m+1)-valent connecting group, X represents a carboxylate ion, M represents a counter cation necessary for neutralization of charge, and m represents an integer of from 1 to 10, and a structural unit represented by the following Formula (3):

Formula (3)

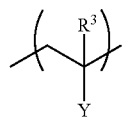

wherein $R^3$ represents a hydrogen atom, a substituent having from 1 to 30 carbon atoms, or a halogen atom, and Y represents a substituent having from 0 to 30 carbon atoms provided that Y does not represent a carboxy group and does not represent the same constituent as (XM) in Formula (2).

A second aspect of the present invention provides the method of producing a copolymer of the invention includes synthesizing a copolymer containing a structural unit represented by Formula (1) above and a structural unit represented by Formula (3) above in a substantially water-free solvent and then adding water and a basic compound simultaneously or successively to produce a copolymer containing a structural unit represented by Formula (1) above, a structural unit represented by Formula (2) above and a structural unit represented by Formula (3) above.

DETAILED DESCRIPTION OF THE INVENTION

The planographic printing plate precursor of the invention is preferably in the following exemplary embodiments (1) to (7). The exemplary embodiments (1) to (7) may be suitably combined.

Exemplary embodiment (1) wherein Y in Formula (3) represents a substituent containing a group selected from a carboxylate ester group, a carbamoyl group, an aromatic group, a hydroxy group, and an acyloxy group.

Exemplary embodiment (2) wherein Y in Formula (3) is a substituent containing a carboxylate ester group.

Exemplary embodiment (3) wherein the molar ratio of content of the structural unit represented by Formula (1) to content of the structural unit represented by Formula (2) is from 0.8:0.2 to 0.2:0.8.

Exemplary embodiment (4) wherein the molar ratio of total content of the structural units represented by Formulae (1) and (2) to content of the structural unit represented by Formula (3) is from 0.8:0.2 to 0.2:0.8.

Exemplary embodiment (5) wherein the image forming layer is capable of recording with an infrared laser.

Exemplary embodiment (6) wherein the image forming layer includes a polymerization initiator, a polymerizable compound, and a binder polymer, and preferably further includes an infrared absorbing agent.

Exemplary embodiment (7) which has on the image forming layer a protective layer including polyvinyl alcohol, fine particles composed of an organic resin, and mica particles.

(8) The method of producing a copolymer of the invention includes synthesizing a copolymer containing a structural unit represented by Formula (1) and a structural unit represented by Formula (3) in a substantially water-free solvent and then adding water and a basic compound simultaneously or successively to produce a copolymer containing a structural unit represented by Formula (1), a structural unit represented by Formula (2) and a structural unit represented by Formula (3).

(9) The method of producing a copolymer according to the (8), wherein Y in Formula (3) represents a substituent containing a group selected from a carboxylate group, a carbamoyl ester group, an aromatic group, a hydroxy group, and an acyloxy group.

(10) The method of producing a copolymer according to the (8), wherein Y in Formula (3) is a substituent containing a carboxylate ester group.

(11) The method of producing a copolymer according to the above-mentioned (8), wherein the molar ratio of content of the structural unit represented by Formula (1) to content of the structural unit represented by Formula (2) is from 0.8:0.2 to 0.2:0.8.

(12) The method of producing a copolymer according to the (8), wherein the molar ratio of total content of the structural units represented by Formulae (1) and (2) to content of the structural unit represented by Formula (3) is from 0.8:0.2 to 0.2:0.8.

The mechanism of the invention is estimated as follows.

In the invention, the copolymer used in the intermediate layer is composed of a carboxylic acid-containing structural unit represented by Formula (1), a carboxylate-containing structural unit represented by Formula (2), and a carboxylic acid- or carboxylate-free structural unit represented by Formula (3). The reason for this copolymer may provide the excellent planographic printing plate precursor of the invention is not evident, however is estimated as follows.

That is, it is estimated that in an image area, the carboxylic acid-containing structural unit represented by Formula (1) exhibits excellent adhesiveness to a support, and in a non-image area, is converted by alkali development into a carboxylate, thereby reducing adhesiveness to the support and simultaneously improving its solubility, to exhibit a function of promoting development. It is estimated that the carboxylate-containing structural unit represented by Formula (2) has an effect of reducing the solubility in an organic solvent used in formation of a image forming layer, and thus exhibits a function of suppressing the deterioration in scumming in a non-image area caused by interfacial mixing of the intermediate layer with the image forming layer, or of suppressing deterioration in developability. It is also estimated that the structural unit represented by Formula (3) has high affinity for a relatively lipophilic image forming layer, and thus this structural unit, when copolymerized with the structural unit having adhesiveness to the support, confers the resulting copolymer with a property allowing the copolymer to serve as an adhesive between the support and the image forming layer.

From the foregoing, the planographic printing plate precursor of the invention is made excellent both in prevention of scumming on a non-image area and in printing durability attributable to the adhesiveness between an image area and a support.

The method of producing the copolymer of the invention has a reaction in a substantially water-free solvent and adding a small amount of water in neutralization. This method has advantages such as easy production and a broad range of choice for a polymerization initiator and a chain transfer agent. Further, the method has a feature of a small amount of water contained in a copolymer solution upon termination of neutralization. Therefore, a solution containing the copolymer produced by this method may reduce drying load in production of the planographic printing plate precursor, and thus the method also has a feature of excellent production suitability.

According to an aspect of the invention, there may be provided a planographic printing plate precursor excellent both in prevention of scumming on a non-image area and in printing durability attributable to the adhesiveness between an image area and a support.

According to an aspect of the invention, there may also be provided a production method wherein a copolymer preferable in the planographic printing plate precursor may be easily produced. The planographic printing plate precursor prepared by using the copolymer obtained by this production method also has an effect of being excellent in production suitability.

<Planographic Printing Plate Precursor>

The planographic printing plate precursor of the invention has an intermediate layer containing at least one copolymer (hereinafter referred to sometimes as "specific copolymer") containing a structural unit represented by Formula (1), a structural unit represented by Formula (2) and a structural unit represented by Formula (3), and a image forming layer, in this order on a support. The phrase "precursor having an intermediate layer and a image forming layer in this order on a support" means that these layers are coated in this order on the support, and does not deny the presence of known layers arranged as necessary, such as a back coat layer, a hydrophilic layer and a protective layer.

Hereinafter, the elements constituting the planographic printing plate precursor of the invention are described respectively.

<Support>

The support in the invention may be a known arbitrary support and is preferably paper, a polyester film, or an aluminum plate, and more preferably an aluminum plate which is superior in dimensional stability and relatively cheap and whose surface may be provided with superior hydrophilicity and strength by surface treatment as needed. In addition, the support is also preferably a composite sheet in which an aluminum sheet is laminated on a polyethylene terephthalate film, such as those disclosed in JP-B No. 48-18327. A support subjected to hydrophilization treatment as described later is also preferably used.

The aluminum plate as a preferable support in the invention is a metal plate based on dimensionally stable aluminum, and is selected not only from a pure aluminum plate however also from an alloy plate based on aluminum containing a very small amount of different elements and a plastic film or paper having aluminum (alloy) laminated or vapor-deposited thereon. In the following description, supports made of the aluminum or the aluminum alloys are referred to collectively as the aluminum support. The different elements contained in the aluminum alloy include silicon, iron, manganese, copper, magnesium, chromium, zinc, bismuth, nickel, titanium etc. The content of the different elements in the alloy is up to 10% by mass or less. A pure aluminum plate is preferable in the invention, however because production of absolutely pure aluminum by refining techniques is difficult, aluminum may contain a very small amount of different elements. The composition of the aluminum plate used in the invention is not limited, and any aluminum plates made of known and conventionally used aluminum materials such as JIS A 1050, JIS A 1100, JIS A 3103 and JIS A 3005 may be used as necessary.

The thickness of the aluminum support used in the invention is from about 0.1 to 0.6 mm. This thickness may be suitably changed depending on the size of a printing machine, the size of a printing plate, and user's request.

The aluminum support is preferably hydrophilized by surface treatment described below.

(Surface Roughening Treatment)

A method for roughening a surface includes mechanical surface roughening, chemical etching, and electrolytic graining as disclosed in JP-A No. 56-28893. Other methods that may be used in the invention include an electrochemical surface roughening method of electrochemically roughening a surface in a hydrochloric acid or nitric acid electrolyte; and a mechanical surface roughening method such as a wire brush graining method of scratching an aluminum surface with a metal wire, a ball graining method of roughening an aluminum surface with a polishing ball and an abrasive, and a brush graining method of roughening a surface with a nylon brush and an abrasive. One of these roughening methods or a combination of two or more of them may be used. The surface roughening method is usefully an electrochemical method of chemically roughening a surface in a hydrochloric or nitric acid electrolyte. The suitable amount of electric current is in the range of 50 to 400 C/dm$^2$, when the support serves as an anode. More specifically, alternate and/or direct current electrolysis is preferably carried out in an electrolyte having a hydrochloric or nitric acid content of 0.1 to 50% by mass at a temperature in the range of 20 to 80° C. at an electric current density of 100 to 400 C/dm$^2$ for one second to 30 minutes.

The aluminum support thus surface-roughened may be chemically etched in an acid or alkaline solution. Preferable examples of an etching agent include sodium hydroxide, sodium carbonate, sodium aluminate, sodium metasilicate, sodium phosphate, potassium hydroxide, and lithium hydroxide. The concentration and temperature of the etching agent are preferably 1 to 50% by mass and 20 to 100° C., respectively. In order to remove scummings (smuts) which remain on the etched surface, the substrate is washed with acid. Typical examples of the acid used include nitric acid, sulfuric acid, phosphoric acid, chromic acid, hydrofluoric acid, and borofluoric acid. A method for removing smuts on a surface electrochemically roughened is preferably a method described in JP-A No. 53-12739 in which a surface is brought into contact with 15 to 65% by mass of sulfuric acid at a temperature in the range of 50 to 90° C., and a method described in JP-B No. 48-28123 in which a surface is etched with alkali.

The method and conditions are not particularly limited, as long as the surface roughness of the roughened surface Ra (Arithmetic Mean Deviation of the Profile) is preferably from 0.2 to 0.7 μm, more preferably from 0.3 to 0.65 μm, still more preferably from 0.45 to 0.60 μm.

(Anodizing Treatment)

The thus treated aluminum substrate is then subjected to anodizing treatment to form an oxide layer thereon.

In the anodizing treatment, an aqueous solution of sulfuric acid, phosphoric acid, oxalic acid or boric acid-sodium borate, or an aqueous solution of a combination of two or more of such substances, may be used as the major component in an electrolytic bath. In this case, the electrolytic solution may naturally contain at least components usually contained in the Al alloy plate, the electrodes, tap water and underground water. Second and third components may also be contained. The second and third components referred to herein include, for example, cations of metals such as Na, K, Mg, Li, Ca, Ti, Al, V, Cr, Mn, Fe, Co, Ni, Cu and Zn, ammonium ions, and anions such as nitrate ion, carbonate ion, chlorine ion, phosphate ion, fluorine ion, sulfite ion, titanate ion, silicate ion and borate ion. The concentration thereof in the electrolytic solution may be from about 0 to 10000 ppm. Although the conditions for the anodizing treatment are not particularly limited, the plate is preferably treated with 30 to 500 g/L solution at a temperature of 10 to 70° C. by direct current or alternating current electrolysis at a current density in the range of 0.1 to 40 A/m$^2$. The thickness of the anodized layer formed may be in the range of 0.5 to 1.5 μm, preferably in the range of 0.5 to 1.0 μm.

The conditions for the treatment are preferably selected such that the anodic oxidation film formed on the treated support has micropores having a size of 5 to 10 nm and a pore density of $8\times10^{15}$ to $2\times10^{16}$ pores/m$^2$.

(Hydrophilization Treatment)

A treatment for imparting hydrophilicity to the surface of the support may be any of known methods. A treatment for imparting hydrophilicity with silicate or polyvinylphosphonic acid is particularly preferably conducted. The film is formed such that the amount of a silicon or phosphorus element is 2 to 40 mg/m$^2$, more preferably 4 to 30 mg/m$^2$. The coating amount may be measured by a fluorescent X-ray analysis method.

In the hydrophilicity-imparting treatment, the aluminum support having an anodized layer formed thereon is dipped in an aqueous solution at pH 10 to 13 (determined at 25° C.) containing an alkali metal silicate or polyvinylphosphonic acid in an amount of 1 to 30% by mass, more preferably 2 to 15% by mass, for example at 15 to 80° C. for 0.5 to 120 seconds.

As the alkali metal silicate used in the treatment for imparting hydrophilicity, sodium silicate, potassium silicate, lithium silicate, or the like is used. The hydroxide used for raising the pH value of the aqueous alkali metal silicate solution may be sodium hydroxide, potassium hydroxide, lithium hydroxide, or the like. Alkaline earth metal salts or the group IVB metal salts may be incorporated into the treating solution described above. Examples of the alkaline earth metal salts include nitrates such as calcium nitrate, strontium nitrate, magnesium nitrate and barium nitrate, and water-soluble salts such as sulfate, hydrochloride, phosphate, acetate, oxalate and borate. Examples of the group IVB metal salts include titanium tetrachloride, titanium trichloride, titanium potassium fluoride, titanium potassium oxalate, titanium sulfate, titanium tetraiodide, zirconium chloride oxide, zirconium dioxide, zirconium oxychloride, and zirconium tetrachloride.

The alkaline earth metal salts and group IVB metal salts may be used singly or in combination of two or more thereof. The amount of these metal salts is preferably in the range of 0.01 to 10% by mass, more preferably 0.05 to 5.0% by mass. Electrodeposition with silicate as described in U.S. Pat. No. 3,658,662 is also effective. A surface treatment which is a combination of a support which has been subjected to electrolytic graining as disclosed in JP-B No. 46-27481, JP-A No. 52-58602 and JP-A No. 52-30503, and the anodizing treatment and the hydrophilicity-imparting treatment, is also useful.

[Intermediate Layer]

Now, the intermediate layer in the planographic printing plate precursor of the invention is described.

The intermediate layer in the invention has at least one copolymer (specific copolymer) containing a structural unit represented by Formula (1), a structural unit represented by Formula (2) and a structural unit represented by Formula (3).

(Specific Copolymer)

First, the specific copolymer used in the intermediate layer in the invention is described.

The specific copolymer in the invention includes a structural unit represented by Formula (1) below, a structural unit represented by Formula (2) below and a structural unit represented by Formula (3) below.

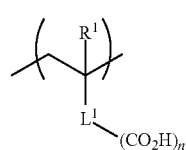

Formula (1)

wherein $R^1$ represents a hydrogen atom, a substituent having 1 to 30 carbon atoms, or a halogen atom, $L^1$ represents a single bond or a (n+1)-valent connecting group, and n represents an integer of 1 to 10.

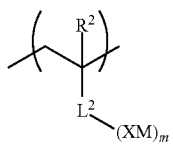

Formula (2)

wherein $R^2$ represents a hydrogen atom, a substituent having 1 to 30 carbon atoms, or a halogen atom, $L^2$ represents a single bond or a (m+1)-valent connecting group, X represents a carboxylate ion, M represents a counter cation necessary for neutralization of charge, and m represents an integer of 1 to 10.

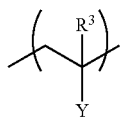

Formula (3)

wherein $R^3$ represents a hydrogen atom, a substituent having 1 to 30 carbon atoms, or a halogen atom, and Y represents a substituent having 0 to 30 carbon atoms provided that Y does not represent a carboxy group or (XM) in Formula (2).

Now, $R^1$ in Formula (1) is described.

$R^1$ represents a hydrogen atom, a substituent having 1 to 30 carbon atoms (for example, methyl, ethyl, propyl, butyl, pentyl, hexyl, cyclohexyl, methoxy, ethoxy, butoxy, acetoxy, propionyloxy, methoxycarbonyl, ethoxycarbonyl or cyano) or a halogen atom (for example, a fluorine atom, a chlorine atom, a bromine atom or an iodine atom). $R^1$ is more preferably a hydrogen atom, methyl, ethyl, a fluorine atom or a chlorine atom, particularly preferably a hydrogen atom or methyl.

$R^2$ in Formula (2) and $R^3$ in Formula (3) have the same meanings as those of $R^1$ in Formula (1), and preferable examples thereof are also the same as defined therein.

Now, $L^1$ in Formula (1) is described.

$L^1$ represents a single bond or a (n+1) connecting group. The (n+1) connecting group represents a divalent or more group consisting of at least one nonmetallic atom, preferably a group consisting of 0 to 10 carbon atoms, 0 to 10 nitrogen atoms, 0 to 50 oxygen atoms, and 0 to 20 sulfur atoms.

An example of the divalent connecting group is preferably a group composed of a single structural unit selected from —$CR_2$—, —O—, —C=O—, —S—, —S=O—, —S(=O)$_2$—, —NR—, vinylene, phenylene, cycloalkylene, naphthylene, and biphenylene, wherein R represents a hydrogen atom or a substituent, or a combination thereof.

Examples of the trivalent connecting group include a tri-substituted benzene ring, —$C_6H_4$—$CH_2$—N—($CH_2$—)$_2$, and —N—($CH_2$—)$_2$, and examples of the tetravalent connecting group include a tetra-substituted benzene ring.

Particularly preferable examples of $L^1$ include a single bond, —O($CH_2$)$_t$—, —NH($CH_2$)$_t$—, —COO—, —CONH—, and a phenylene group, wherein t represents an integer of 0 to 20.

The (n+1)-valent connecting group represented by $L^1$ may have a substituent, and the substituent includes a hydroxyl group and a halogen atom.

$L^2$ in Formula (2) represents a single bond or a (m+1) connecting group. The (m+1) connecting group represented by $L^2$ has the same meaning as that of the (n+1)-valent connecting group represented by Formula (1), and preferable examples thereof are also the same as defined therein.

Preferable examples of $L^2$ in Formula (2) are also the same as those of $L^1$ in Formula (1).

The (m+1)-valent connecting group represented by $L^2$ may have a substituent, and the substituent includes a hydroxyl group, a halogen atom and a carboxylic acid group.

In Formula (1), n represents an integer of 1 to 10. When n is 2 or more, $L^1$ is meant to be a trivalent or more connecting group to which a plurality of —$CO_2H$ groups are bound. n is preferably an integer of 1 to 8, more preferably an integer of 1 to 4, still more preferably 1 to 2, from the viewpoint of regulating the acid value and hydrophilicity of the specific copolymer in a suitable range.

In Formula (2), m represents an integer of 1 to 10. When m is 2 or more, $L^2$ is meant to be a trivalent or more connecting group to which a plurality of —(XM) groups are bound. m is preferably an integer of 1 to 8, more preferably an integer of 1 to 4, still more preferably 1 to 2, from the viewpoint of regulating the acid value and hydrophilicity of the specific copolymer in a suitable range.

Now, (XM) in Formula (2) is described.

In Formula (2), X represents a carboxylic acid ion, and M represents a counter cation necessary for neutralizing the charge. That is, (XM) represents an ion pair wherein a hydrogen in the carboxyl group is replaced by a counter cation represented by M (for example, —$CO_2^-$.$M^+$), which is a structure wherein the charge of the carboxy group is neutralized with the counter ion.

M may be a cationic species having a valence other than monovalence, and (XM) may be a double salt in which a plurality of counter cations are present.

As M, an arbitrary cationic species may be selected, and preferable examples thereof include an alkali metal ion (lithium, sodium or potassium), a metal ion in the II group (magnesium, calcium, strontium or barium), another metal ion (aluminum, titanium, iron or zinc), an ammonium ion, an organic ammonium ion (methyl ammonium, ethyl ammonium, diethyl ammonium, dimethyl ammonium, trimethyl ammonium, triethyl ammonium, tetraethyl ammonium, tetramethyl ammonium, tetrabutyl ammonium, pyridinium, morpholinium or guanidinium), a phosphonium ion and a sulfonium ion. Preferable among those mentioned above are an alkali metal ion, an ammonium ion and an organic ammonium ion, among which a sodium ion and a potassium ion are particularly preferable.

Now, Y in Formula (3) is described.

Y represents a substituent having 0 to 30 carbon atoms provided that Y does not represent a carboxy ester group or (XM) in Formula (2).

Examples of Y include a carboxylate group (for example, an alkylcarboxylate ester group such as methoxycarbonyl, ethoxycarbonyl, propyloxycarbonyl, isopropyloxycarbonyl, butyloxycarbonyl, hexyloxycarbonyl, octyloxycarbonyl, cyclohexyloxycarbonyl, 2-ethylhexyloxycarbonyl, benzyloxycarbonyl, 2-hydroxyethoxycarbonyl or 2-methoxyethoxycarbonyl, or an arylcarboxylate ester group such as phenoxycarbonyl), a linear, branched or cyclic alkyl group (methyl, ethyl, propyl, isopropyl, butyl, hexyl, cyclohexyl, octyl, dodecyl or the like), an aryl group (phenyl or the like), an alkynyl group, a heterocyclic group, a halogen atom (—F, —Br, —Cl, —I or the like), a hydroxy group, an alkoxy group, an aryloxy group, a mercapto group, an alkylthio group, an arylthio group, an alkyldithio group, an aryldithio group, an amino group, an N-alkylamino group, an N,N-diarylamino group, an N-alkyl-N-arylamino group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, an ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—$SO_3H$) and a conjugated base group thereof (referred to hereinafter as a sulfonato group), an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, a phosphono group (—$PO_3H_2$) and a conjugated base group thereof (referred to hereinafter as a phosphonato group), a dialkylphosphono group (—$PO_3(alkyl)_2$), a diarylphosphono group (—$PO_3(aryl)_2$), an alkylarylphosphono group (—$PO_3(alkyl)(aryl)$), a monoalkylphosphono group (—$PO_3H(alkyl)$) and a conjugated base group thereof (referred to hereinafter as an alkylphosphonato group), a monoarylphosphono group (—$PO_3H(aryl)$) and a conjugated base group thereof (referred to hereinafter as an arylphosphonato group), a phosphonooxy group (—$OPO_3H_2$) and a conjugated base group thereof (referred to hereinafter as a phosphonatooxy group), a dialkylphosphonoxy group (—$OPO_3(alkyl)_2$), a diarylphosphonoxy group (—$OPO_3(aryl)_2$), an alkylarylphosphonoxy group (—$OPO(alkyl)(aryl)$), a monoalkylphosphonoxy group (—$OPO_3H(alkyl)$) and a conjugated base group thereof (referred to hereinafter as an alkylphosphonatooxy group), a monoarylphosphonoxy group (—$OPO_3H(aryl)$) and a conjugated base group thereof (referred to hereinafter as an arylphosphonatooxy group), an alkoxysilyl group, a cyano group, a nitro group, an onium group (preferably an onium group consisting of atoms in the V or VI group in the periodic table, more preferably ammonium, phosphonium or sulfonium, particularly preferably ammonium; as a counter cation of the onium, an arbitrary cation may be selected, and preferable examples include a halide ion (a fluoride ion, a chloride ion, a bromide ion or an iodide ion), a sulfate ion, and a sulfonate ion (a methanesulfonate ion, a benzenesulfonate ion, a p-toluenesulfonate ion or the like), a tetrafluoroborate ion, a hexaflurophosphate ion, a borate ion, a phosphate ion, a hydrogen phosphate ion, a dihydrogen phosphate ion, or the like).

These groups may be combined to form a combined substituent, and this combined substituent may be Y.

Preferable examples of Y include a carboxylate group (for example, an alkylcarboxylate ester group such as methoxycarbonyl, ethoxycarbonyl, propyloxycarbonyl, isopropyloxycarbonyl, butyloxycarbonyl, hexyloxycarbonyl, octyloxycarbonyl, cyclohexyloxycarbonyl, 2-ethylhexyloxycarbonyl, benzyloxycarbonyl, 2-hydroxyethoxycarbonyl or 2-methoxyethoxycarbonyl, or an arylcarboxylate ester group such as phenoxycarbonyl), a hydroxy group, an acyloxy group (acetyloxy, propionyloxy or the like), an alkoxy group, an aryloxy group, a carbamoyl group, an N-alkylcarbamoyl group (methylcarbamoyl, ethylcarbamoyl, isopropylcarbamoyl, benzylcarbamoyl or the like), an N,N-dialkylcarbamoyl group (dimethylcarbamoyl, diethylcarbamoyl or the like), an N-arylcarbamoyl group (phenylcarbamoyl or the like), and an aromatic group (phenyl, 4-aminophenyl, 4-hydroxyphenyl, 4-methoxycarbonylphenyl, 4-ethoxycarbonylphenyl, 4-octyloxycarbonylphenyl).

Further preferable examples of Y include a carboxylate ester group (for example, an alkylcarboxylate ester group such as methoxycarbonyl, ethoxycarbonyl, propyloxycarbonyl or isopropyloxycarbonyl), a hydroxy group, an acyloxy group (acetyloxy, propionyloxy or the like), a carbarmoyl group, an N-alkylcarbamoyl group (methylcarbamoyl, ethylcarbamoyl, isopropylcarbamoyl, benzylcarbamoyl or the like), an N,N-dialkylcarbamoyl group (dimethylcarbamoyl, diethylcarbamoyl or the like), an N-arylcarbamoyl group (phenylcarbamoyl or the like), and an aromatic group (phenyl, 4-aminophenyl, 4-hydroxyphenyl, 4-methoxycarbonylphenyl, 4-ethoxycarbonylphenyl, 4-octyloxycarbonylphenyl).

Particularly preferable examples of Y include methoxycarbonyl, ethoxycarbonyl, propyloxycarbonyl, isopropyloxycarbonyl, hydroxy, acetyloxy, propionyloxy, carbamoyl, methylcarbamoyl, ethylcarbamoyl, isopropylcarbamoyl, benzylcarbamoyl or the like, dimethylcarbamoyl, diethylcarbamoyl, phenyl, 4-hydroxyphenyl, 4-methoxycarbonylphenyl, and 4-ethoxycarbonylphenyl.

Preferable examples of the structural unit represented by Formula (1) are shown below, however the invention is not limited thereto.

In the following structural units, "4.5" given as the number of ethylene oxide repeating units means that the number of ethylene oxide repeating units is 4.5 on average.

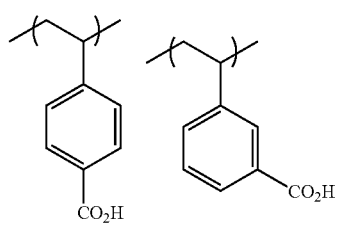

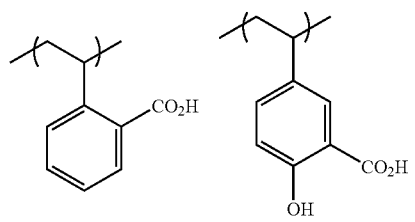
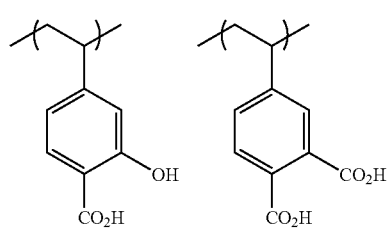
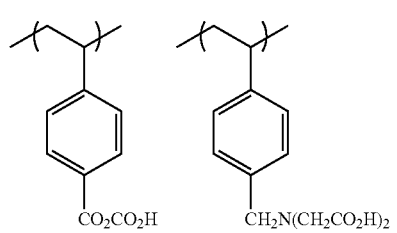
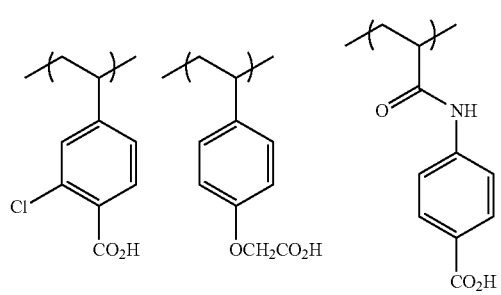
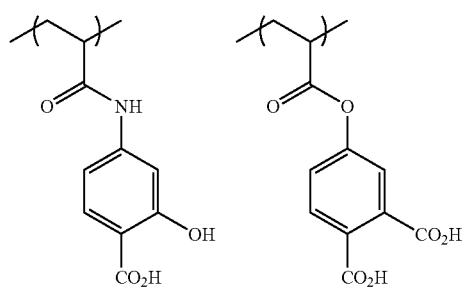
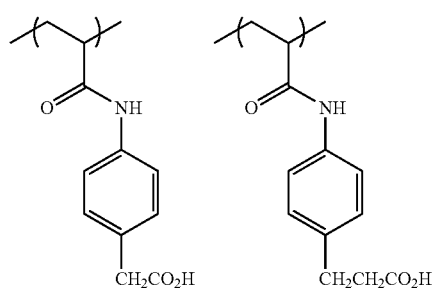
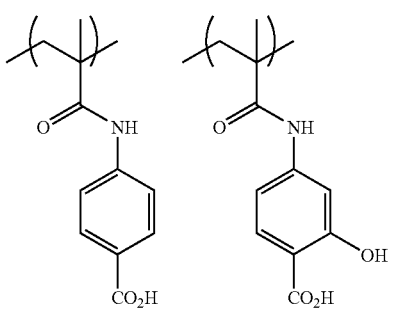
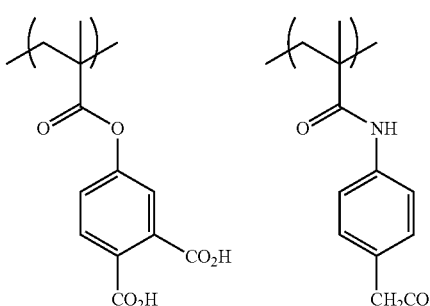
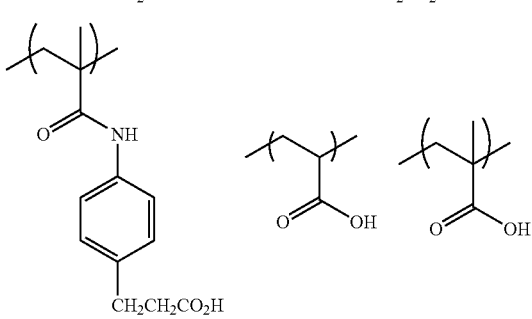
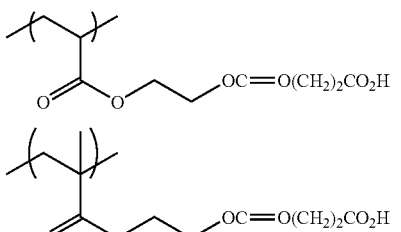
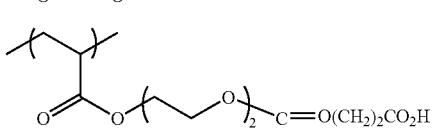
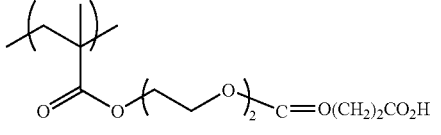
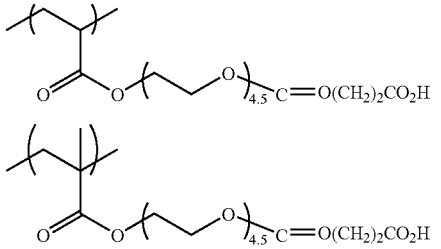

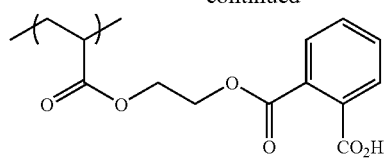
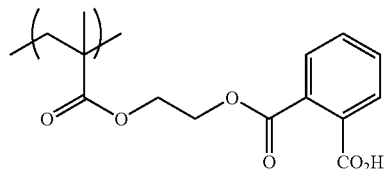
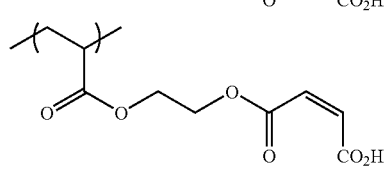
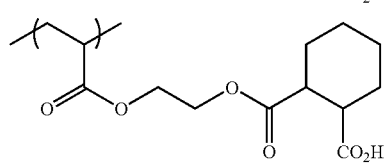
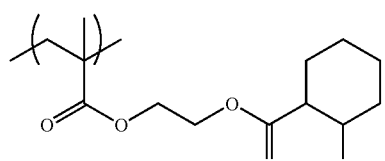
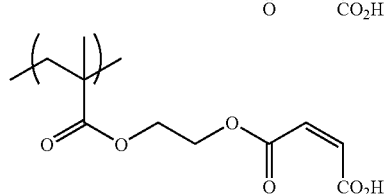

Preferable examples of the structural unit represented by Formula (2) are shown below, however the invention is not limited thereto.

When a group corresponding to (XM) and a carboxylic acid are coexist in one structural unit in the following examples, the structural unit may be the structural unit represented by Formula (1) because of the relationship to another structural unit constituting the specific copolymer. That is, when the structural unit represented by Formula (2), and both a group corresponding to (XM) and a carboxylic acid group, are contained as structural units constituting the specific copolymer, the structural unit having both a group corresponding to (XM) and a carboxylic acid group becomes the structural unit represented by Formula (1).

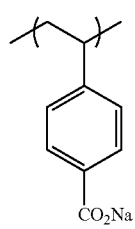
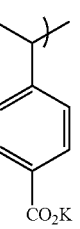
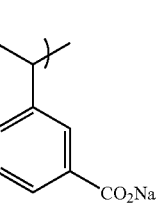
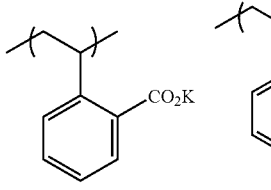
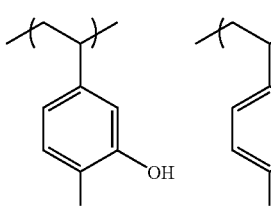
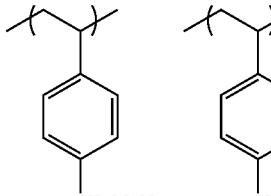
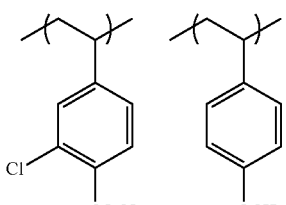
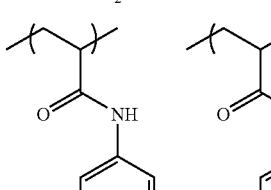
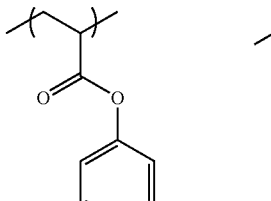

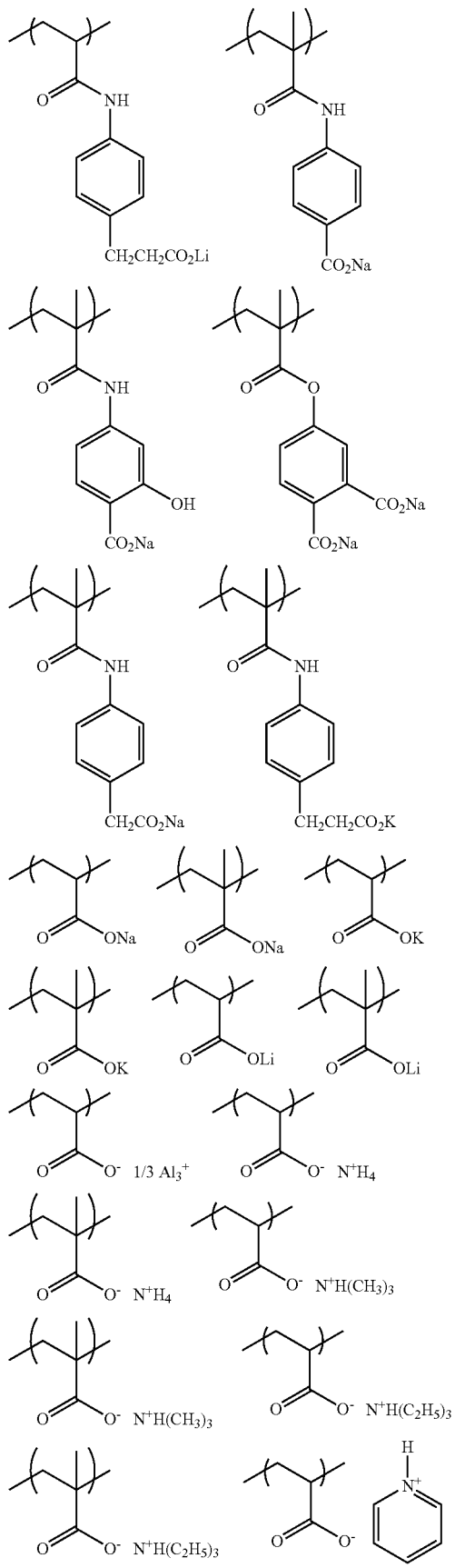
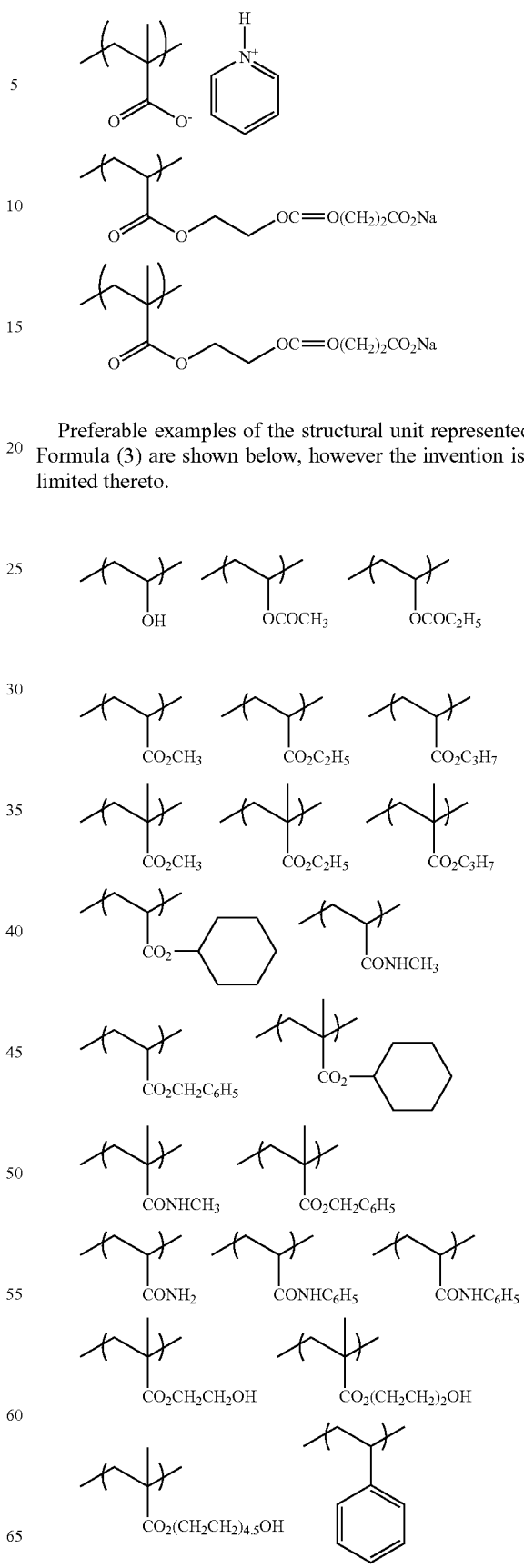
Preferable examples of the structural unit represented by Formula (3) are shown below, however the invention is not limited thereto.

-continued

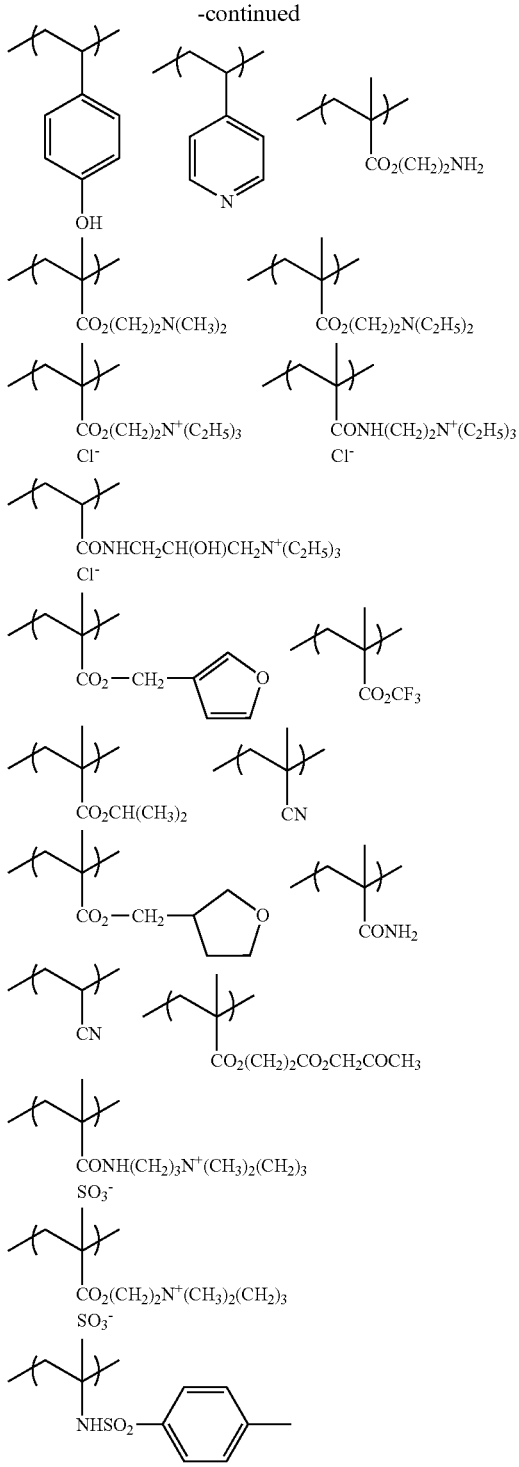

In the specific polymer in the invention, the molar ratio of content of the structural unit represented by Formula (1) to content of the structural unit represented by Formula (2) is preferably from 0.9:0.1 to 0.1:0.9, more preferably from 0.8:0.2 to 0.2:0.8, even more preferably from 0.7:0.3 to 0.3:0.7.

The molar ratio of total content of the structural units represented by Formulae (1) and (2) to content of the structural unit represented by Formula (3) is preferably from 0.9:0.1 to 0.1:0.9, more preferably from 0.8:0.2 to 0.2:0.8, still more preferably from 0.7:0.3 to 0.3:0.7.

By satisfying the above range, physical properties such as adsorption onto a support, hydrophilicity/hydrophobicity, and development speed may be regulated in a suitable range, and a planographic printing plate precursor excellent in balance among printing durability, scumming resistance on non-image areas, and developability may be obtained.

In the specific copolymer in the invention, the structural unit represented by Formula (1), the structural unit represented by Formula (2) or the structural unit represented by Formula (3) may be a single structural unit or a combination of two or more structural units respectively. Other structural units may be further contained as long as the effect of the invention is not impaired.

Components derived from a polymerization initiator, a chain transfer agent and the like used in synthesis may be contained in the terminals or side chains of the specific copolymer.

Synthesis of the specific copolymer in the invention may be carried out in a usual manner. Specifically, arbitrary synthesis methods selected from known methods such as anion polymerization, radical polymerization, cation polymerization and a polymer reaction method may be used singly or in combination thereof. The synthesis method is preferably radical polymerization or a polymer reaction method.

Particularly, the specific copolymer in the invention is produced preferably by the following methods.

The method of producing the specific copolymer in the invention is selected preferably from a method (A) of copolymerizing a monomer corresponding to the structural unit represented by Formula (1), a monomer corresponding to the structural unit represented by Formula (2), and a monomer corresponding to the structural unit represented by Formula (3) respectively and a method (B) of copolymerizing a monomer corresponding to the structural unit represented by Formula (1) with a monomer corresponding to the structural unit represented by Formula (3) and then neutralizing a part of carboxyl groups in the product.

In the invention, the method (B) is preferably used.

Copolymerization between a monomer derived from the structural unit represented by Formula (2), which is highly soluble in water, and a monomer derived from the structural unit represented by Formula (3), which is highly soluble in an organic solvent, is generally difficult where a single solvent is used. However, this difficulty may be overcome by selecting the method (B).

The method (B) is described in more detail.

It is preferable in the method (B) that a copolymer containing a structural unit represented by Formula (1) and a structural unit represented by Formula (3) is synthesized in a substantially water-free solvent (for example, methanol, ethanol, propanol, isopropyl alcohol, propylene glycol monomethyl ether, dimethylsulfoxide, tetrahydrofuran, N-methyl-2-pyrrolidone, dimethylacetamide, dimethylformamide, acetonitrile, acetone, ethyl methyl ketone, or methyl isobutyl ketone), and then the copolymer is neutralized by adding water and a basic compound simultaneously or subsequently (the method of producing the copolymer of the invention).

Examples of the step of neutralization by adding water and a basic compound simultaneously or successively include a method of adding an aqueous solution of a basic compound, a method of adding water and a basic compound (solid, liquid, or gas) simultaneously without previously mixing them, a method of adding water and a basic compound (solid, liquid, or gas) successively without previously mixing them, a method of adding water and a solution of a basic compound simultaneously without previously mixing them, and a method of adding water and a solution of a basic compound successively without previously mixing them.

The basic compound referred to herein means a compound that may give a cationic species represented by the above-mentioned M by neutralization, and preferable examples include alkali metal, divalent metal or other metal hydroxides, oxides, carbonates, hydrogen carbonates and alkoxides, ammonia (gas or an aqueous solution), and amines (methylamine, ethylamine, diethylamine, dimethylamine, trimethylamine, triethylamine, tetraethyl ammonium hydroxide, tetramethyl ammonium hydroxide, tetrabutyl ammonium hydroxide, pyridine, morpholine, and guanidine).

More preferable examples include alkali metal hydroxides, alkali metal alkoxides, an aqueous solution of ammonia, and amines.

When neutralization is conducted as described above, the degree of neutralization of the product is regulated such that the structural unit represented by Formula (1) and the structural unit represented by Formula (2) are in a preferable molar ratio.

The degree of neutralization may be regulated by suitably controlling the amount of the basic compound added for neutralization.

The average molecular weight of the copolymer in the invention may be in a broad range. The weight-average molecular weight (Mw) as determined by gel permeation chromatography (GPC) is preferably in the range of 1,000 to 500,000, more preferably in the range of 2,000 to 200,000, even more preferably in the range of 5,000 to 100,000.

The amount of unreacted monomers contained in this specific copolymer is arbitrary, however is preferably 20% by mass or less, more preferably 10% by mass or less, even more preferably 5% by mass or less.

Preferable examples of the specific copolymer [exemplary compounds (a-1) to (a-31)] in the invention are shown below, however the invention is not limited thereto.

(a-1)

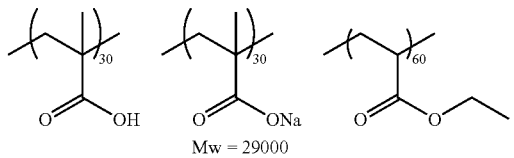

Mw = 32000

(a-2)

Mw = 28000

(a-3)

Mw = 35000

(a-4)

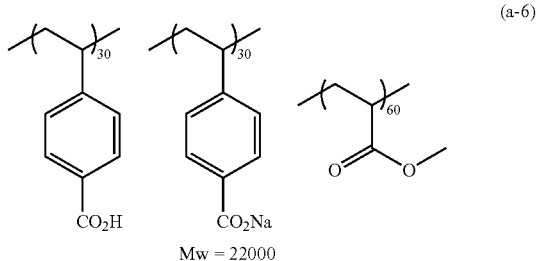

Mw = 30500

-continued (a-5)

Mw = 29000

(a-6)

Mw = 22000

(a-7)

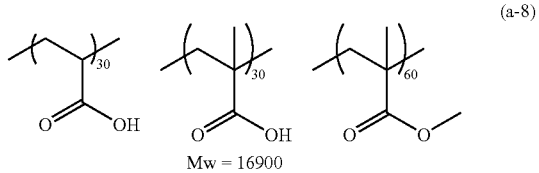

Mw = 56000
(40 mol % of all carboxylic acid groups are Na salts)

(a-8)

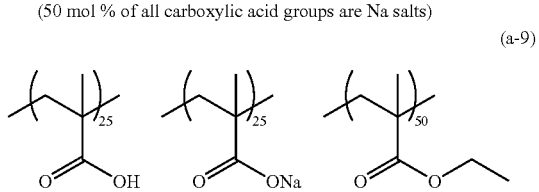

Mw = 16900
(50 mol % of all carboxylic acid groups are Na salts)

(a-9)

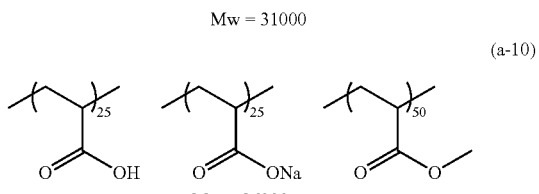

Mw = 31000

(a-10)

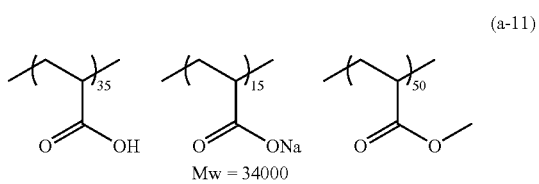

Mw = 36000

(a-11)

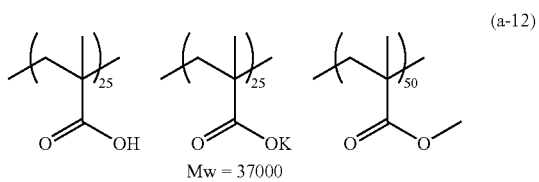

Mw = 34000

(a-12)

Mw = 37000

(a-13)
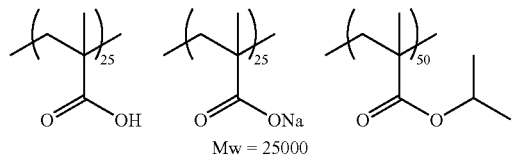
Mw = 25000
(a-14)
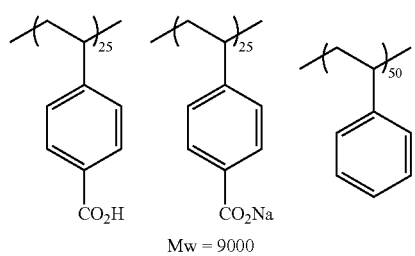
Mw = 9000
(a-15)
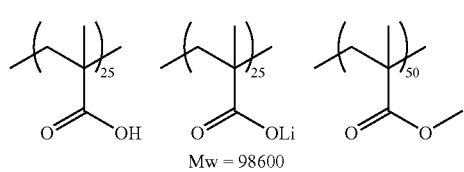
Mw = 98600
(a-16)
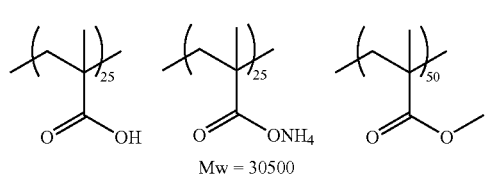
Mw = 30500
(a-17)
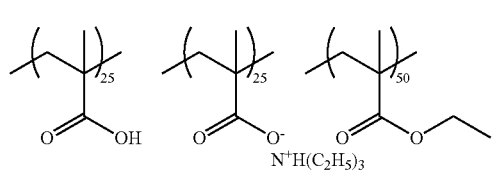
Mw = 24600
(a-18)
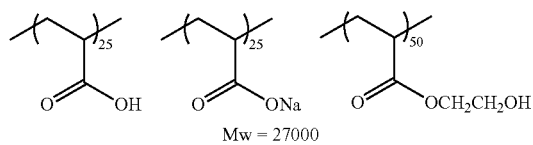
Mw = 27000
(a-19)
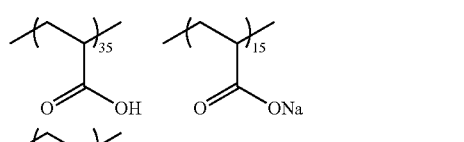
Mw = 15000
(a-20)
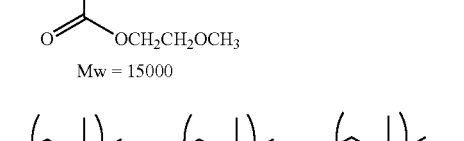
Mw = 19000
(a-21)
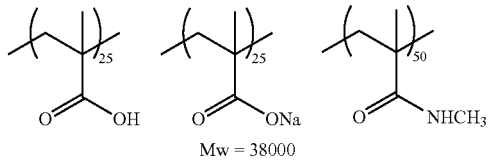
Mw = 38000
(a-22)
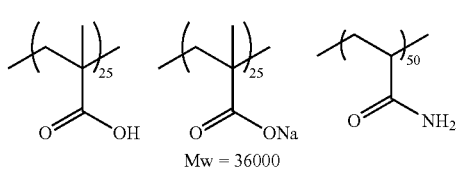
Mw = 36000
(a-23)
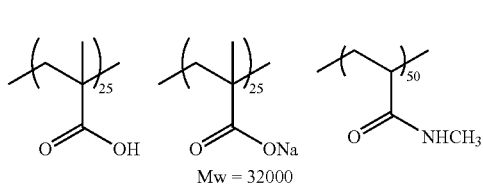
Mw = 32000
(a-24)
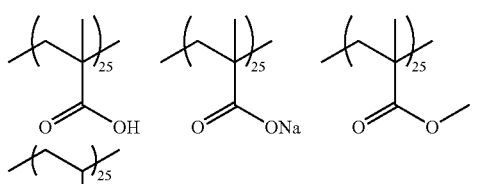
Mw = 32500
(a-25)
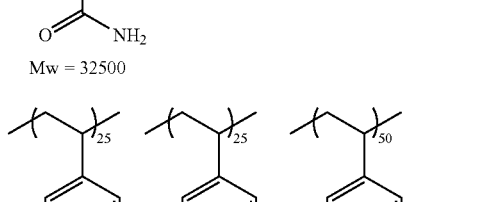
Mw = 36300
(a-26)
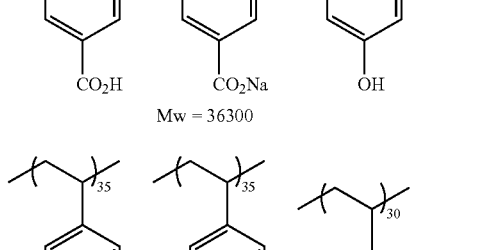
Mw = 33000
(a-27)
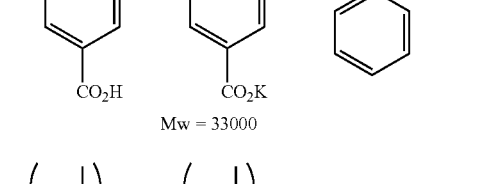
Mw = 42000

-continued

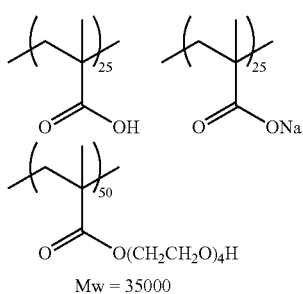
(a-28)
Mw = 35000

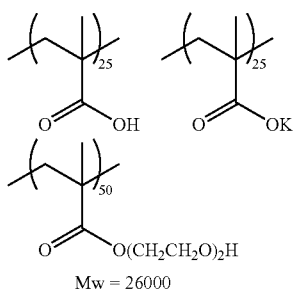
(a-29)
Mw = 26000

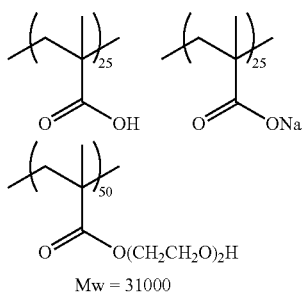
(a-30)
Mw = 31000

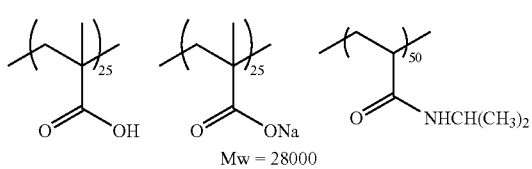
(a-31)
Mw = 28000

A numerical value at the right side of parentheses indicates a copolymerization compounding ratio, and this ratio is the ratio of each component relative to the total that is not necessarily 100.

Now, synthesis examples of the specific copolymer in the invention are described.

The specific copolymers other than those shown below are synthesized in the same method. The method of synthesizing the specific polymer in the invention is not limited thereto.

The weight-average molecular weight of the synthesized specific copolymer may be measured by gel permeation chromatography (GPC). Hereinafter, the measurement method is specifically described.

Using PEG (manufactured by Tosoh Corporation) as the standard sample, the average molecular weight was measured under the following analytical conditions:

Columns: Shodex OHpak SB-806M HQ 8×300 mm
  Shodex OHpak SB-806M HQ 8×300 mm
  Shodex OHpak SB-802.5 HQ 8×300 mm Mobile phase: 50 mM disodium hydrogenphosphate (acetonitrile/water=1/9)
Flow rate: 0.8 ml/min.
Detector: RI
Injection volume: 100 μl
Sample concentration: 0.1% by mass

SYNTHESIS EXAMPLE 1

Synthesis of Exemplary Compound (a-1)

107.1 parts by mass of propylene glycol monomethyl ether was placed in a reaction container, then heated to 80° C. and stirred for 30 minutes in a nitrogen stream. Separately, a mixture of 75.1 parts by mass of methyl methacrylate, 64.6 parts by mass of methacrylic acid, 7.6 parts by mass of dimethyl 2,2'-azobis(2-methylpropionate), and 428.4 parts by mass of propylene glycol monomethyl ether was prepared and added dropwise to the reaction solution over 2 hours. The mixture was reacted at 80° C. for 4.5 hours, then 3.8 parts by mass of dimethyl 2,2'-azobis(2-methylpropionate) were added, and the mixture was heated to 90° C. and stirred for 2 hours. The reaction solution was cooled to 20° C. or less, and 202.5 parts by mass of 2 mol/L aqueous sodium hydroxide was added to the mixture which was then stirred to give a solution of Exemplary Compound (a-1) (solid content: 17.9%) The weight-average molecular weight by GPC was 32000.

SYNTHESIS EXAMPLE 2

Synthesis of Exemplary Compound (a-2)

99.7 parts by mass of propylene glycol monomethyl ether was placed in a reaction container, then heated to 80° C. and stirred for 30 minutes in a nitrogen stream. Separately, a mixture of 75.1 parts by mass of methyl methacrylate, 54.1 parts by mass of acrylic acid, 7.6 parts by mass of dimethyl 2,2'-azobis(2-methylpropionate), and 398.6 parts by mass of propylene glycol monomethyl ether was prepared and added dropwise to the reaction solution over 2 hours. The mixture was reacted at 80° C. for 4.5 hours, then 3.8 parts by mass of dimethyl 2,2'-azobis(2-methylpropionate) were added, and the mixture was heated to 90° C. and stirred for 2 hours. The reaction solution was cooled to 20° C. or less, and 202.5 parts by mass of 2 mol/L aqueous sodium hydroxide was added to the mixture which was then stirred to give a solution of Exemplary Compound (a-2) (solid content: 17.7% by mass) The weight-average molecular weight by GPC was 28000.

(Formation of an Intermediate Layer)

The intermediate layer in the invention is arranged by application onto a support by various methods.

Specifically, the intermediate layer may be arranged by the following method.

That is, the intermediate layer may be arranged by a method wherein a solution of the specific copolymer in the invention dissolved in an organic solvent such as methanol, ethanol, methyl ethyl ketone, acetonitrile, N-methyl-2-pyrrolidone or dimethylsulfoxide, in a mixed solvent thereof, or in a mixed solvent of such organic solvent and water may be applied onto a support and then dried to arrange an intermediate layer thereon.

Alternatively, the intermediate layer may be arranged by a method wherein a support is dipped in a solution of the specified copolymer in the invention dissolved in an organic solvent such as methanol, ethanol or methyl ethyl ketone, in a mixed solvent thereof, or in a mixed solvent of such organic solvent and water, thereby adsorbing the specific copolymer onto the support, and thereafter, the support is washed if necessary with water or the like, followed by drying, to provide an intermediate layer thereon.

In the former method, a solution of the specific copolymer at a concentration of preferably 0.005 to 20% by mass, more preferably 0.01 to 10% by mass, even more preferably 0.05 to 5% by mass, may be applied by various methods. For example, any method such as bar coating, spin coating, spray coating or curtain coating may be used.

In the latter method, the concentration of the specific copolymer is preferably 0.01 to 20% by mass, more preferably 0.05 to 5% by mass. The dipping temperature is preferably 20 to 90° C., more preferably 25 to 50° C., and the dipping time is 0.1 second to 20 minutes, more preferably 2 seconds to 1 minute.

The pH of the solution used in the method may be regulated with basic substances such as ammonia, triethylamine, sodium hydroxide and potassium hydroxide, inorganic acids such as hydrochloric acid, phosphoric acid, sulfuric acid and nitric acid, and various organic acidic substances, for example, organic sulfonic acids such as nitrobenzenesulfonic acid and naphthalenesulfonic acid, organic phosphonic acids such as phenylphosphonic acid, and organic carboxylic acids such as benzoic acid, fumaric acid and malic acid. In this case, the pH of the solution is preferably in the range of 0 to 12, more preferably 3 to 10.

In the planographic printing plate precursor of the invention, other known compounds may be used in combination with the specific copolymer in the invention.

Specific examples of the known intermediate layer include those described in JP-B No. 50-7481, JP-A Nos. 54-72104, 59-101651, 60-149491, 60-232998, 3-56177, 4-282637, 5-16558, 5-246171, 7-159983, 7-314937, 8-202025, 8-320551, 9-34104, 9-236911, 9-269593, 10-69092, 10-115931, 10-161317, 10-260536, 10-282682, 11-84674, 10-69092, 10-115931, 11-38635, 11-38629, 10-282645, 10-301262, 11-24277, 11-109641, 10-319600, 11-84674, 11-327152, 2000-10292, 2000-235254, 2000-352854 and 2001-209170, and the compounds used therein may be used in combination with the specific copolymer in the invention.

The coating amount of the copolymer in the invention after drying (coating amount of the intermediate layer) is preferably 2 to 100 mg/m$^2$, more preferably 3 to 50 mg/m$^2$, even more preferably 4 to 30 mg/m$^2$. When the coating amount is less than 2 mg/m$^2$, the effect of the invention may not be sufficiently obtained. This also applies where the coating amount is more than 100 mg/m$^2$.

[Image Forming Layer]

The planographic printing plate precursor of the invention includes an intermediate layer and a image forming layer in this order on a support.

In the invention, the image forming layer may be an arbitrary image forming layer known in the art, however from the viewpoint of the effect, it is preferably an image forming layer capable of recording by heat-mode exposure with an infrared laser or the like. The image forming layer may have a single-layer structure or a laminated structure consisting of a plurality of layers.

Hereinafter, various planographic printing plate precursors are described.

(Infrared Laser Recording Planographic Printing Plate Precursor)

The planographic printing plate precursor capable of forming an image by exposure to infrared light from an infrared laser, which is preferable in the invention, is described.

A known recording system such as a negative- or positive image forming layer using a material having alkali solubility changed by exposure to infrared light, or an image forming layer containing a hydrophobated precursor capable of forming an ink-receiving region and forming a hydrophobated region in an area exposed to infrared light, is arbitrarily selected.

First, the positive or negative image forming layer will be described. This image forming layer is divided into a negative image forming layer wherein image exposure with an infrared laser causes decrease in solubility in an alkali developing solution so that the light-exposed area serves as an image area and a positive image forming layer wherein the exposure causes increase in solubility in an alkali developing solution so that the light-exposed area serves as a non-image area.

The positive image forming layer includes an interaction-cancelled (heat-sensitive positive) image forming layer, a known acid-catalyzed degradation system, and an o-quinonediazide compound-containing system. The positive image forming layer has a function of releasing bonds of layer-forming polymer compounds by an acid or heat energy upon exposure or heating so that the compounds are rendered soluble in water or alkaline water and removed by development to form a non-image area.

The negative image forming layer includes a known acid-catalyzed crosslinkable (e.g., cationic-polymerizable) image forming layer and a polymerization-curable image forming layer. In the negative image forming layer, an acid generated by exposure or heating acts as a catalyst to facilitate the crosslinking reaction of compounds constituting the image forming layer, to cure the compounds to form an image area, or radials formed by exposure or heating causes the polymerization reaction of the polymerizable compounds, to cure the compounds to form an image area.

Regardless of the type of the image forming layer to be formed, the intermediate layer in the invention exhibits an excellent effect.

Hereinafter, the respective image forming layers are described in detail.

1. Positive Image Forming Layer

In a preferable exemplary embodiment of the invention, the planographic printing plate precursor has a positive image forming layer provided with a image forming layer containing 50% by mass or more novolac phenol resin (hereinafter referred to sometimes as novolac resin) and a light-to-heat conversion agent and being capable of recording with an infrared laser. The image forming layer may have a single-layer structure or a laminated structure consisting of a plurality of layers.

(Novolac Type Phenol Resin)

First, the novolac type phenol resin is described. The novolac resin refers to a resin produced by polycondensation of at least one phenol with at least one aldehyde or ketone in the presence of an acidic catalyst.

Examples of the phenol include phenol, o-cresol, m-cresol, p-cresol, 2,5-xylenol, 3,5-xylenol, o-ethylphenol, m-ethylphenol, p-ethylphenol, propylphenol, n-butylphenol, tert-butylphenol, 1-naphthol, 2-naphthol, pyrocatechol, resorcinol, hydroquinone, pyrogallol, 1,2,4-benzenetriol, phloroglucinol, 4,4'-biphenyldiol, and 2,2-bis(4'-hydroxyphenol)propane. Examples of the aldehyde include formaldehyde, acetaldehyde, propionaldehyde, benzaldehyde and furfural. Examples of the ketone include acetone, methyl ethyl ketone and methyl isobutyl ketone.

The novolac type phenol resin is preferably a polycondensate between a phenol selected from phenol, o-cresol, m-cresol, p-cresol, 2,5-xylenol, 3,5-xylenol and resorcinol and an aldehyde or ketone selected from formaldehyde, acetaldehyde and propionaldehyde, more preferably a polycondensate between mixed phenols consisting of m-cresol:p-cresol: 2,5-xylenol: 3,5-xylenol:resorcinol in a molar ratio of 40 to 100:0 to 50:0 to 20:0 to 20:0 to 20, or (mixed) phenols consisting of phenol:m-cresol:p-cresol in a molar ratio of 0 to 100:0 to 70:0 to 60, and formaldehyde.

The novolac resins that are used in the invention are those having a polystyrene-equivalent weight-average molecular weight (hereinafter referred to simply as "weight-average molecular weight") of preferably 500 to 20,000, more preferably 1,000 to 15,000, even more preferably 3,000 to 12,000, as determined by gel permeation chromatography. A weight-average molecular weight in this range is preferable for sufficient film-making property and excellent alkali developability in a light-exposed area.

The novolac resins when used as the binder resin in the image forming layer may be used singly or as a mixture of two or more thereof. As all the binder resin, the novolac resin may be used alone or in combination with another resin. When the novolac resin is used in combination with another resin, the novolac resin is preferably a main binder, and the content of the novolac resin in the binder resin component constituting the image forming layer is preferably 50% by mass or more, more preferably in the range of 65 to 99.9% by mass.

A binder resin that may be used in combination with the novolac resin may be an alkali-soluble resin having an acidic group in a main chain and/or a side chain of a generally used water-insoluble and alkali-soluble polymer. Phenol resins other than the novolac resin, for example, resol resins, polyvinyl phenol resins, and acrylic resins having phenolic hydroxyl groups are also preferably used. Specific examples of the resin that may be used in combination with the novolac resin include polymers described in JP-A No. 11-44956 and JP-A No. 2003-167343.

(Light-to-Heat Conversion Agent)

The image forming layer in the invention preferably contains a light-to-heat conversion agent. The absorption wavelength range of the light-to-heat conversion agent used herein is not particularly limited as long as it is a substance that absorbs light-energy irradiation and emits heat. From the viewpoint of compatibility with easily available high-output lasers, the light-to-heat conversion agent is preferably an infrared absorbing dye or pigment having an absorption maximum at wavelengths of from 760 nm to 1,200 nm.

The dye may be any one of commercial dyes including known dyes described in e.g. "Senryo Binran" (Dye Handbook) (published in 1970 and compiled by Society of Synthetic Organic Chemistry, Japan). Specific examples of such dyes include azo dyes, metal complex salt azo dyes, pyrazolone azo dyes, naphthoquinone dyes, anthraquinone dyes, phthalocyanine dyes, carbonium dyes, quinone imine dyes, methine dyes, cyanine dyes, squarylium dyes, pyrylium salts, metal thiolate complexes, oxonol dyes, diimonium dyes, aminium dyes and croconium dyes.

Preferable dyes include, for example, cyanine dyes described in JP-A Nos. 58-125246, 59-84356, 59-202829, 60-78787, etc., methine dyes described in JP-A Nos. 58-173696, 58-181690, 58-194595 etc., naphthoquinone dyes described in JP-A Nos. 58-112793, 58-224793, 59-48187, 59-73996, 60-52940, 60-63744 etc., squarylium dyes described in JP-A No. 58-112792 etc., and cyanine dyes described in UK Patent No. 434,875.

A near infrared ray absorption sensitizer disclosed in U.S. Pat. No. 5,156,938, a substituted arylbenzo(thio)pyrylium salt disclosed in U.S. Pat. No. 3,881,924, a trimethine thiapyrylium salt disclosed in JP-A No. 57-142645 (U.S. Pat. No. 4,327,169), a pyrylium compound disclosed in JP-A No. 58-181051, 58-220143, 59-41363, 59-84248, 59-84249, 59-146063, or 59-146061, a cyanine dye disclosed in JP-A No. 59-216146, a pentamethine thiopyrylium salt disclosed in U.S. Pat. No. 4,283,475, or a pyrylium compound disclosed in JP-B No. 5-13514, or 5-19702 is preferably used.

Other preferable examples of the dyes include the near infrared ray-absorbing dyes of Formulae (I) and (II) described in U.S. Pat. No. 4,756,993.

Particularly preferable among these dyes are cyanine dyes, phthalocyanine dyes, oxonol dyes, squalirium dyes, pyrylium salts, thiopyrylium dyes, and nickel thiolate complexes. Compounds described on pages 26 to 38 in JP-A No. 2005-99685 are also preferable because they are excellent in photothermal conversion efficiency, and particularly cyanine dyes represented by Formula (a) in JP-A No. 2005-99685 are most preferable because the cyanine dyes when used in the photosensitive composition of the invention manifest a high degree of interaction with the alkali-soluble resin and are also excellent in terms of stability and economy.

(Dissolution Suppressing Agent)

A dissolution suppressing agent may also be added in preparing the image forming layer for image recording in the invention. A substance (dissolution suppressing agent) which is thermally degradable, and in the not degraded state, substantially reduces the solubility of an alkali-soluble resin, such as an onium salt, an o-quinonediazide compound, and an alkyl ester sulfonate is preferably used together in order to improve the dissolution suppressing ability of an image area in a developing solution. The dissolution suppressing agent is preferably an onium salt such as a sulfonium salt, an ammonium salt, a diazonium salt or an iodonium salt, or an o-quinonediazide compound, more preferably a sulfonium salt, an ammonium salt or a diazonium salt.

Preferable examples of the onium salts used in the invention include ammonium salts described in U.S. Pat. Nos. 4,069,055, 4,069,056, and JP-A Nos. 3-140140, 2006-293162 and 2004-117546; and sulfonium salts described in J. V. Crivello et al., Polymer J. 17, 73 (1985), J. V. Crivello et al., J. Org. Chem., 43, 3055 (1978), W. R. Watt et al., J. Polymer Sci., Polymer Chem. Ed., 22, 1789 (1984), J. V. Crivello et al., Polymer Bull., 14, 279 (1985), J. V. Crivello et al., Macromolecules, 14 (5), 1141 (1981), J. V. Crivello et al., J. Polymer Sci., Polymer Chem. Ed., 17, 2877 (1979), EP Nos. 370,693, 233,567, 297,443 and 297,442, U.S. Pat. Nos. 4,933,377, 3,902,114, 5,041,358, 4,491,628, 4,760,013, 4,734,444 and 2,833,827, and DE Patents Nos. 2,904,626, 3,604,580, and 3,604,58, and JP-A Nos. 2006-293162 and 2006-258979. Further examples include diazonium salts shown in S. I. Schlesinger, Photogr, Sci, Eng., 18, 387 (1974), T. S. Bal et al, Polymer, 21, 423 (1980), JP-A No. 5-158230, Formula (I) in JP-A No. 5-158230, and Formula (1) in JP-A No. 11-143064.

Other preferable onium salts include phosphonium salts described in D. C. Necker et al, Macromolecules, 17, 2468 (1984), C. S. Wen et al., Teh, Proc. Conf. Rad. Curing ASIA p. 478, Tokyo, October (1988), and U.S. Pat. Nos. 4,069,055 and 4,069,056; iodonium salts described in J. V. Crivello et al., Macromolecules, 10(6), 1307 (1977), Chem. & Eng. News, November 28, p. 31 (1988), EP No. 104,143, U.S. Pat. Nos. 5,041,358, and 4,491,628, and JP-A Nos. 2-150848 and 2-296514; selenonium salts described in J. V. Crivello et al., Macromolecules, 10(6), 1307 (1977), J. V. Crivello et al., J. Polymer Sci., Polymer Chem. Ed., 17, 1047 (1979); and arsenonium slats described in C. S. Wen et al., Teh, Proc. Conf. Rad. Curing ASIA p. 478, Tokyo, October (1988).

Examples of the counter ion for the onium salt include ions of tetrafluoroboric acid, hexafluorophosphoric acid, triisopropylnaphthalenesulfonic acid, 5-nitro-o-toluenesulfonic acid, 5-sulfosalicylic acid, 2,5-dimethylbenzenesulfonic acid, 2,4,6-trimethylbenzenesulfonic acid, 2-nitrobenzenesulfonic acid, 3-chlorobenzenesulfonic acid, 3-bromobenzenesulfonic acid, 2-fluorocaprylnaphthalenesulfonic acid, dodecylbenzenesulfonic acid, 1-naphthol-5-sulfonic acid, 2-methoxy-4-hydroxy-5-benzoyl-benzenesulfonic acid, and p-toluenesulfonic acid. Among these, hexafluorophosphoric acid and alkylaromatic sulfonic acids such as triisopropylnaphthalenesulfonic acid and 2,5-dimethylbenzenesulfonic acid are particularly preferred.

These onium salts may be used singly or in combination of two or more thereof. When the image forming layer has a laminated structure, the onium salt may be added to the same layer or a plurality of layers, or plural kinds of onium salts may be added to separate layers.

The quinonediazide compounds are preferably o-quinonediazide compounds. The o-quinonediazide compounds used in the invention are compounds which each have at least one o-quinonediazide group and each have alkali-solubility increased by being thermally decomposed, and which may have various structures. In other words, the o-quinonediazide compounds assist the dissolution of the photosensitive material by both of the effect that the compounds are thermally decomposed so that their inhibition for the developing inhibitor is lost and the effect that the o-quinonediazide compounds themselves change to alkali-soluble substances. The o-quinonediazide compound used in the invention may be for example a compound described on pp. 339-352 in "Light-Sensitive Systems" authored by J. Cohser (John & Wiley & Sons. Inc.). Particularly preferable is a sulfonic acid ester or sulfonamide of o-quinonediazide, which is obtained by reacting the o-quinonediazide with an aromatic polyhydroxy compound or aromatic amino compound. Preferable are also an ester made from benzoquinone-(1,2)-diazidesulfonic acid chloride or naphthoquinone-(1,2)-diazide-5-sulfonic acid chloride and pyrogallol-acetone resin, described in JP-B No. 43-28403, and an ester made from benzoquinone-(1,2)-diazidesulfonic acid chloride or naphthoquinone-(1,2)-diazide-5-sulfonic acid chloride and phenol-formaldehyde resin, described in U.S. Pat. Nos. 3,046,120 and 3,188,210.

Further preferable examples include an ester made from naphthoquinone-(1,2)-diazide-4-sulfonic acid chloride and phenol formaldehyde resin or cresol-formaldehyde resin, and an ester made from naphthoquinone-(1,2)-diazide-4-sulfonic acid chloride and pyrogallol-acetone resin. Other useful o-quinonediazide compounds are reported and disclosed in many examined or unexamined patent documents, for example, JP-A Nos. 47-5303, 48-63802, 48-63803, 48-96575, 49-38701 and 48-13354, JP-B Nos. 41-11222, 45-9610 and 49-17481, U.S. Pat. Nos. 2,797,213, 3,454,400, 3,544,323, 3,573,917, 3,674,495 and 3,785,825, U.K. Patents Nos. 1,227,602, 1,251,345, 1,267,005, 1,329,888 and 1,330,932, and DE Patent No. 854,890.

The amount of the onium salt and/or the o-quinonediazide compound added as a dissolution suppressing agent is preferably from 0.1 to 10% by mass, more preferably from 0.1 to 5% by mass, even more preferably from 0.2 to 2% by mass, based on the total solid content in the image forming layer in the invention. These compounds may be used singly or as a mixture of two or more thereof.

The amount of additives other than the o-quinonediazide compound is preferably from 0 to 5% by mass, more preferably from 0 to 2% by mass, even more preferably from 0.1 to 1.5% by mass. The additives and the binder used in the invention are contained preferably in the same layer.

A dissolution suppressing agent not having degradability may be simultaneously used. Preferable examples of such dissolution suppressing agents include sulfonate esters, phosphate esters, aromatic carboxylate esters, aromatic disulfones, carboxylic acid anhydrides, aromatic ketones, aromatic aldehydes, aromatic amines and aromatic ethers described in detail in JP-A No. 10-268512; an acid coloring dye having a lactone skeleton, N,N-diarylamide skeleton or diarylmethylimino skeleton and also acting as a coloring agent described in detail in JP-A No. 11-190903; and non-ionic surfactants described in detail in JP-A No. 2000-105454.

(Other Additives)

For the purpose of strengthening discrimination of an image (identification of hydrophobicity/hydrophilicity) and strengthening scratch resistance on the surface, it is enable to use in combination a polymer containing, as a polymerization component, a (meth)acrylate monomer having two or three perfluoroalkyl groups having 3 to 20 carbon atoms in the molecule, as disclosed in JP-A No. 2000-187318. The amount of the polymer added is preferably 0.1 to 10% by mass, more preferably 0.5 to 5% by mass, based on the total solid content of the recoding layer in the invention.

For the purpose of imparting scratch resistance, a compound that lowers a static friction coefficient of the surface may be added to the image forming layer of the invention. Specific examples of such compound include an ester of a long-chain alkyl carboxylic acid as disclosed in U.S. Pat. No. 6,117,913. The amount of such compound added is preferably 0.1 to 10% by mass, more preferably 0.5 to 5% by mass, based on the total solid content of the image forming layer.

If necessary, the image forming layer in the invention may contain a low-molecular compound having an acid group. Examples of the acid group include a sulfonic acid group, a carboxylic acid group and a phosphoric acid group. In particular, a compound having a sulfonic acid group is preferable. Specific examples of such compound include an aromatic sulfonic acid or an aliphatic sulfonic acid such as p-toluenesulfonic acid or naphthalenesulfonic acid.

Further cyclic acid anhydrides, phenols and organic acids may also be used in combination for the purpose of improving sensitivity. The cyclic acid anhydrides include those described in U.S. Pat. No. 4,115,128, such as phthalic anhydride, tetrahydrophthalic anhydride, hexahydrophthalic anhydride, 3,6-endoxy-Δ4-tetrahydrophthalic anhydride, tetrachlorphthalic anhydride, maleic anhydride, chlormaleic anhydride, α-phenylmaleic anhydride, succinic anhydride and pyromellitic anhydride. The phenols include bisphenol A, p-nitrophenol, p-ethoxyphenol, 2,4,4'-trihydroxybenzophenone, 2,3,4-trihydroxybenzophenone, 4-hydroxybenzophenone, 4,4',4"-trihydroxytriphenyl methane, and 4,4',3", 4"-tetrahydroxy-3,5,3',5'-tetramethyl triphenyl methane. The organic acids include those described in JP-A Nos. 60-88942 and 2-96755, such as sulfonic acids, sulfinic acids, alkyl sulfuric acids, phosphonic acids, phosphate esters and carboxylic acids, and specifically, mention is made of p-toluene sulfonic acid, dodecyl benzene sulfonic acid, p-toluene sulfinic acid, ethyl sulfuric acid, phenyl phosphonic acid, phenyl phosphinic acid, phenyl phosphate, diphenyl phosphate, benzoic acid, isophthalic acid, adipic acid, p-toluic acid, 3,4-dimethoxybenzoic acid, phthalic acid, terephthalic acid, 4-cyclohexene-1,2-dicarboxylic acid, erucic acid, lauric acid, n-undecanoic acid and ascorbic acid. The amount of the cyclic acid anhydrides, phenols and organic acids, when added to the image forming layer, is preferably 0.05 to 20% by mass, more preferably 0.1 to 15% by mass, even more preferably 0.1 to 10% by mass, based on the image forming layer.

When a coating solution for the image forming layer of the invention is prepared, a nonionic surfactant as disclosed in JP-A Nos. 62-251740 and 3-208514, an amphoteric surfactant as disclosed in JP-A Nos. 59-121044 and 4-13149, a siloxane compound as disclosed in EP No. 950517, and a copolymer of fluorine-containing monomers as disclosed in JP-A No. 11-288093 may be added for improvement of the enhancement of processing stability to developing conditions.

Examples of the nonionic surfactant include sorbitan tristearate, sorbitan monopalmitate, sorbitan trioleate, stearate monoglyceride, and polyoxyethylene nonyl phenyl ether. Examples of the amphoteric surfactant include alkyl di(aminoethyl)glycine, alkyl polyaminoethyl glycine hydrochloride, 2-alkyl-N-carboxyethyl-N-hydroxyethyl imidazolium betaine and N-tetradecyl-N,N-betaine type surfactants (e.g. trade name: AMOGEN K, manufactured by Dai-Ichi Kogyo Seiyaku Co., Ltd.).

The siloxane compound is preferably a block copolymer of dimethylsiloxane and polyalkylene oxide. Specific examples thereof include polyalkylene oxide modified silicones (trade names: DBE-224, DBE-621, DBE-712, DBP-732 and DBP-534, manufactured by Chisso Corp., and trade name: Tego Glide 100 manufactured by Tego Co. in Germany).

The content of the nonionic surfactant and the amphoteric surfactant in the image forming layer is preferably 0.05 to 15% by mass, more preferably 0.1 to 5% by mass.

The image forming layer of the invention may contain a printing-out agent for obtaining visible images immediately after heating by exposure, as well as a dye or pigment as an image coloring agent.

A typical example of the printing-out agent is a combination of a compound which releases an acid by heating upon exposure to light (optically acid-releasing agent) with an organic dye which may form a salt. Specific examples thereof include combinations of o-naphthoquinonediazide-4-sulfonic acid halogenide with a salt-formable organic dye, described in JP-A Nos. 50-36209 and 53-8128; and combinations of a trihalomethyl compound with a salt-formable organic dye, described in JP-A Nos. 53-36223, 54-74728, 60-3626, 61-143748, 61-151644 and 63-58440. The trihalomethyl compound is an oxazole type compound or a triazine type compound. Either of these compounds is excellent in stability over time and may give vivid printed-out images.

As the image coloring agent, some other dyes than the salt-formable organic dye may be used in the image forming layer in the invention. Preferable examples of the dye including the salt-formable organic dye may include oil-soluble dyes and basic dyes. Specific examples include Oil Yellow #101, Oil Yellow #103, Oil Pink #312, Oil Green BG, Oil Blue BOS, Oil Blue #603, Oil Black BY, Oil Black BS, Oil Black T-505 (which are manufactured by Orient Chemical Industries, Ltd.), Victoria Pure Blue, Crystal Violet (CI42555), Methyl Violet (CI42535), Ethyl Violet, Rhodamine B (CI145170B), Malachite Green (CI42000) and Methylene Blue (CI52015). Dyes described in JP-A 62-293247 are particularly preferable.

These dyes may be added to the image forming layer in an amount of from 0.01 to 10% by mass, preferably from 0.1 to 3% by mass, based on the total solid content in the image forming layer.

A coating solution used in forming the image forming layer of the invention may contain a plasticizer for imparting flexibility to a coating film as necessary. Examples thereof include butylphthalyl, polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate and an oligomer or polymer of acrylic acid or methacrylic acid.

In addition to them, an epoxy compound, vinyl ethers, a phenol compound having a hydroxymethyl group described in JP-A No. 8-276558, a phenol compound having an alkoxymethyl group, and a crosslinking compound having alkali dissolution suppressing action described in JP-A No. 11-160860 may be appropriately added depending on the purpose.

The thus obtained image forming layer in the invention is excellent in film-forming property and film strength, and upon exposure to infrared light, shows high alkali solubility in a light-exposed area.

2. Negative Image Forming Layer

When the image forming layer according to the invention is a negative image forming layer, the image forming layer is preferably a polymerizable negative image forming layer containing a polymerization initiator, a polymerizable compound, a binder polymer and as necessary an infrared absorbing agent, a coloring agent and other optional components.

Since the polymerizable negative image forming layer in the invention is sensitive to infrared light, it may be sensitive to infrared light lasers useful for CTP. An infrared absorbing agent contained in the image forming layer is electronically excited upon exposure to infrared laser light with high sensitivity, and actions accompanying the electronically excited state, such as electron transfer, energy transfer, and heat generation (light-to-heat converting function), induce the polymerization initiator contained in the same image forming layer to cause chemical change to generate radicals.

Possible mechanisms for generation of radicals include: 1. the heat generated by the light-to-heat converting function of the infrared absorbing agent thermally decomposes the polymerization initiator that will be described later (e.g., sulfonium salt), to generate radicals; 2. an excited electron generated in the infrared absorbing agent is transferred to the polymerization initiator (e.g., active halogen compound) to generate radicals; and 3. electron transfer from the polymerization initiator (e.g., borate compound) to the excited infrared absorbing agent generates radicals. The generated radicals initiate the polymerization reaction of the polymerizable compound, and the exposed area is cured to form an image area.

The planographic printing plate precursor in the invention, which has a image forming layer containing an infrared absorbing agent, is particularly favorable for use in plate making for direct printing with infrared laser beam having a wavelength of 750 to 1400 nm, and shows an image-forming property better than that of the conventional recording printing plate precursors.

Hereinafter, the components used in the image forming layer in the invention will be described.

(Infrared Absorbing Agent)

The image forming layer in the invention contains an infrared absorbing agent for the purpose of the energy transfer function (electron transfer) and the light-to-heat converting function.

The infrared absorbing agent is useful for generating radicals because it is electronically excited upon exposure to infrared laser light with high sensitivity, and actions accompanying the electronically excited state, such as electron transfer, energy transfer, and heat generation (light-to-heat converting function) induce a polymerization initiator described later, thus allowing the polymerization initiator to cause chemical change with high sensitivity to generate radicals.

The infrared absorbing agent used in the invention is preferably a dye or pigment having an absorption maximum at wavelengths of 750 nm to 1400 nm. Such a dye can be a commercially available dye, or a known dye disclosed in "Dye Handbook" edited by The Society of Synthetic Organic Chemistry, Japan and published in 1970. Specific examples thereof include an azo dye, a metal complex azo dye, a pyrazolone azo dye, a naphthoquinone dye, an anthraquinone dye, a phthalocyanine dye, a carbonium dye, a quinonimine dye, a methine dye, a cyanine dye, a squarylium dye, a pyrylium salt, and a metal thiolate complex.

Preferable dyes include, for example, cyanine dyes described in JP-A Nos. 58-125246, 59-84356, 60-78787 etc., methine dyes described in JP-A Nos. 58-173696, 58-181690, 58-194595 etc., naphthoquinone dyes described in JP-A Nos. 58-112793, 58-224793, 59-48187, 59-73996, 60-52940, 60-63744 etc., squarylium dyes described in JP-A No. 58-112792 etc., and cyanine dyes described in U.K. Patent No. 434,875.

Near infrared ray-absorbing sensitizers described in U.S. Pat. No. 5,156,938 are also preferably used. Also preferably used are substituted aryl benzo(thio)pyrylium salts described in U.S. Pat. No. 3,881,924, trimethine thiapyrylium salts described in JP-A No. 57-142645 (U.S. Pat. No. 4,327,169), pyrylium type compounds described in JP-A Nos. 58-181051, 58-220143, 59-41363, 59-84248, 59-84249, 59-146063, and 59-146061, cyanine dyes described in JP-A No. 59-216146, pentamethine thiopyrylium salts described in U.S. Pat. No. 4,283,475, and pyrylium compounds described in JP-B Nos. 5-13514 and 5-19702. The dye is also preferably a near infrared ray absorption dye represented by Formula (I) or (II) in U.S. Pat. No. 4,756,993.

Moreover, the infrared ray absorption dye in the invention is also preferably a specific indolenine cyanine dye disclosed in JP-A No. 2002-278057, which will be illustrated below:

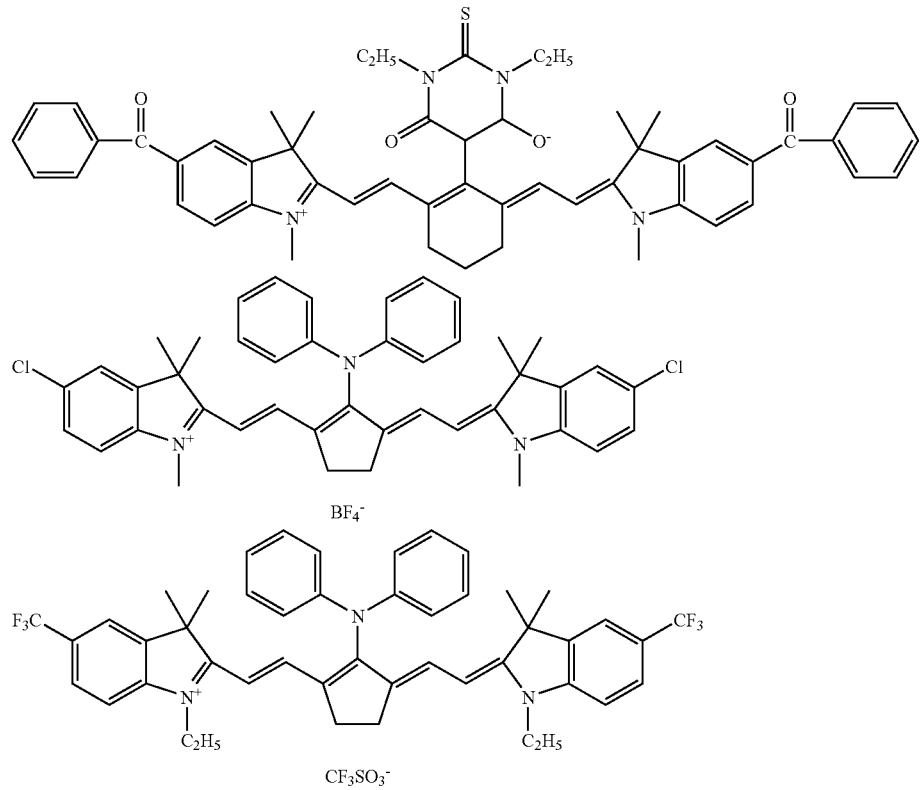

The infrared ray absorption dye in the invention is more preferably a cyanine dye, a squarylium dye, a pyrylium salt, a nickel thiolate complex, or an indolenine cyanine dye, still more preferably a cyanine dye or an indolenine cyanine dye, and particularly preferably a cyanine dye represented by the following Formula (a).

Formula (a)

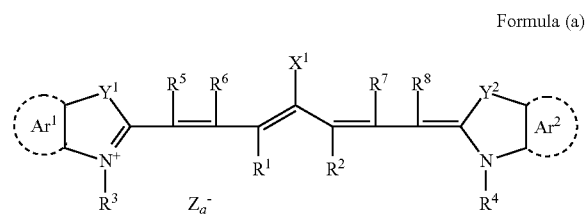

In Formula (a), $X^1$ represents a hydrogen atom, a halogen atom, $-NPh_2$, $X^2-L^1$, or a group shown below. $X^2$ represents an oxygen atom, a nitrogen atom, or a sulfur atom, and $L^1$ represents a hydrocarbon group having 1 to 12 carbon atoms, an aromatic ring having a heteroatom, or a hydrocarbon group containing a heteroatom and having 1 to 12 carbon atoms. The heteroatom is N, S, O, a halogen atom, or Se. In the following Formula, definition of $Xa^-$ is the same as that of $Za^-$ described hereinafter, and Ra represents a hydrogen atom or a substituent selected from alkyl groups, aryl groups, substituted or unsubstituted amino groups, and halogen atoms.

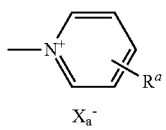

$R^1$ and $R^2$ each independently represent a hydrocarbon group having 1 to 12 carbon atoms. $R^1$ and $R^2$ is preferably a hydrocarbon group having two or more carbon atoms from the viewpoint of storage stability of a coating solution for the image forming layer. $R^1$ and $R^2$ particularly preferably bind to each other to form a five- or six-membered ring.

In formula (a), $Ar^1$ and $Ar^2$ may be the same or different, and represent an aromatic hydrocarbon group which may have at least one substituent. Typical examples of the aromatic hydrocarbon group include a benzene ring and a naphthalene ring. Also, typical examples of the substituent include a hydrocarbon group having 12 or less carbon atoms, halogen atoms and alkoxy groups having 12 or less carbon atoms. $Y^1$ and $Y^2$ may be the same or different, and represent a sulfur atom or a dialkylmethylene group having 12 or less carbon atoms. $R^3$ and $R^4$ may be the same or different, and represent a hydrocarbon group which may have at least one substituent and which has 20 or less carbon atoms. Typical examples of the substituent include alkoxy groups having 12 or less carbon atoms, a carboxyl group and a sulfo group. $R^5$, $R^6$, $R^7$ and $R^8$ may be the same or different, and represent a hydrogen atom or a hydrocarbon group having 12 or less carbon atoms. In light of availability of raw materials, they are preferably hydrogen atoms. $Za^-$ represents a counter anion. However, $Za^-$ is not necessary, if the cyanine dye represented by Formula (a) has an anionic substituent in its structure, and therefore does not need for neutralization of charges due to a counter anion. $Za^-$ is preferably a halogen ion, a perchlorate ion, a tetrafluoro borate ion, a hexafluorophosphate ion or a sulfonate ion from the viewpoint of storage stability of the coating solution for the image forming layer. $Za^-$ is more preferably a perchlorate ion, a hexafluorophosphate ion or an arylsulfonate ion.

Typical examples of the cyanine dye represented by Formula (a) preferably used in the invention include those described in paragraph Nos. [0017] to [0019] in JP-A No. 2001-133969.

Particularly preferable examples of the cyanine dye include a specific indolenine cyanine dye described in the JP-A No. 2002-278057.

The pigment used in the invention may be a commercially available pigment or a pigment described in Color Index (C.I.) Handbook, "Latest Pigment Handbook" (edited by Japan Pigment Technique Association, and published in 1977), "Latest Pigment Applied Technique" (by CMC Publishing Co., Ltd. in 1986), and "Printing Ink Technique" (by CMC Publishing Co., Ltd. in 1984).

Examples of the pigment include black pigments, yellow pigments, orange pigments, brown pigments, red pigments, purple pigments, blue pigments, green pigments, fluorescent pigments, metal powder pigments, and polymer-bonded dyes. Specifically, insoluble azo pigments, azo lake pigments, condensed azo pigments, chelate azo pigments, phthalocyanine pigments, anthraquinone pigments, perylene and perynone pigments, thioindigo pigments, quinacridone pigments, dioxazine pigments, isoindolinone pigments, quinophthalone pigments, dyeing lake pigments, azine pigments, nitroso pigments, nitro pigments, natural pigments, fluorescent pigments, inorganic pigments, and carbon black can be used. The pigment is preferably carbon black.

These pigments may or may not be surface-treated. Examples of the surface treatment include a method of coating the surface of the pigment with a resin or wax; a method of adhering a surfactant onto the surface; and a method of bonding a reactive material (such as a silane coupling agent, an epoxy compound, or a polyisocyanate) to the surface. The surface treatment methods are described in "Nature and Application of Metal Soap" (Saiwai Shobo), "Printing Ink Technique" (by CMC Publishing Co., Ltd. in 1984), and "Latest Pigment Applied Technique" (by CMC Publishing Co., Ltd. in 1986).

The diameter of the pigment particle is preferably in the range of 0.01 to 10 μm, more preferably in the range of 0.05 to 1 μm, and still more preferably in the range of 0.1 to 1 μm. Pigment particles having a diameter within this preferable range are stably dispersed in the recording layer and thus enable formation of a uniform recording layer.

The pigment may be dispersed by a known dispersing technique used in the production of an ink or a toner. Examples of a dispersing machine used therein include an ultrasonic disperser, a sand mill, an attritor, a pearl mill, a super mill, a ball mill, an impeller, a disperser, a KD mill, a colloid mill, a dynatron, a three-roll mill, and a pressing kneader, of which the details are described in "Latest Pigment Applied Technique" (by CMC Publishing Co., Ltd. in 1986).

When used in the image forming layer, the infrared absorbing agent and other components may be contained in the same layer together or in separate layers.

From the viewpoints of uniformity of the infrared ray absorbing agent in the image forming layer and durability of the image forming layer, the content of the infrared ray absorbing agent in the image forming layer is preferably 0.01 to 50% by mass, more preferably 0.1 to 10% by mass, relative to the total solid content of the image forming layer. The content of the infrared absorbing agent is preferably 0.5 to 10% by mass (in the case where the infrared absorbing agent is a dye) or 0.1 to 10% by mass (in the case where the infrared absorbing agent is a pigment).

Polymerization Initiator

The polymerization initiator used in the invention may be any compound that has a function of initiating and advancing the curing reaction of a polymerizable compound described hereinafter and can generate radicals due to application of energy. Such a compound can be a thermal decomposition-type radical generator that, when heated, decomposes to generate radicals, an electron transfer-type radical generator that receives an excited electron from the infrared ray absorbent to generate radicals, or an electron transfer-type radical generator that generates electrons, which move to the excited infrared ray absorbent so as to generate radicals. Specific examples thereof include onium salts, activated halogen compounds, oxime ester compounds, and borate compounds. Two or more of these initiators may be used together. In the invention, the polymerization initiator is preferably an onium salt, and more preferably a sulfonium salt.

The sulfonium salt polymerization initiator preferably used in the invention may be an onium salt represented by the following Formula (I).

Formula (I)

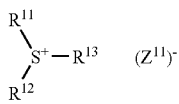

Formula (I)

In Formula (I), $R^{11}$, $R^{12}$ and $R^{13}$ may be the same or different and each represent a hydrocarbon group having 20 or less carbon atoms which may have a substituent. Preferable examples of the substituent include halogen atoms, a nitro group, alkyl groups having 12 or less carbon atoms, alkoxy groups having 12 or less carbon atoms, and aryloxy groups having 12 or less carbon atoms. $(Z^{11})^-$ represents a counter ion selected from the group consisting of a halogen ion, a perchlorate ion, a tetrafluoroborate ion, a hexafluorophosphate ion, a carboxylate ion, and a sulfonate ion, and is preferably a perchlorate ion, a hexafluorophosphate ion, a carboxylate ion, or an arylsulfonate ion.

Hereinafter, typical examples of the onium salt represented by Formula (1), [OS-1] to [OS-12] are shown below, but the invention is not limited by them.

[OS-1]

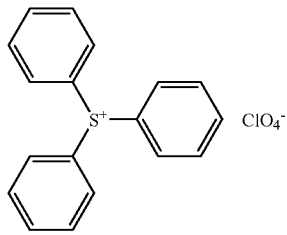

[OS-2]

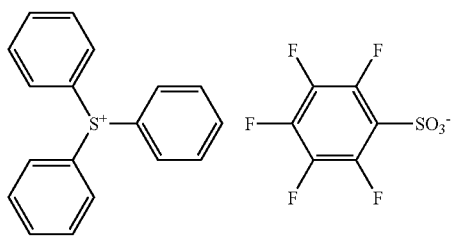

[OS-3]

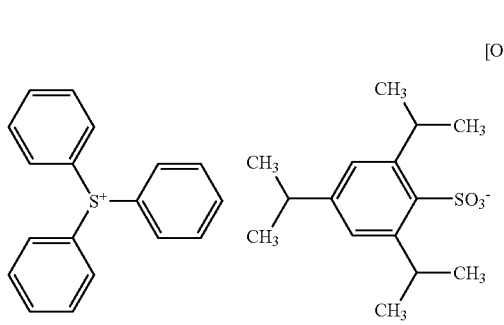

[OS-4]

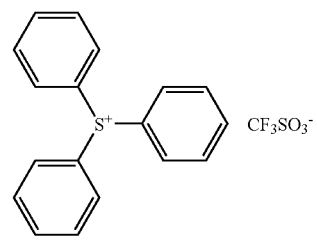

[OS-5]

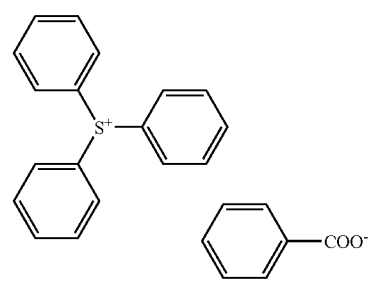

[OS-6]

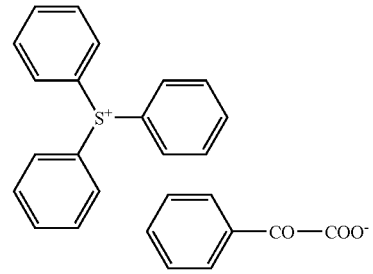

[OS-7]

[OS-8]

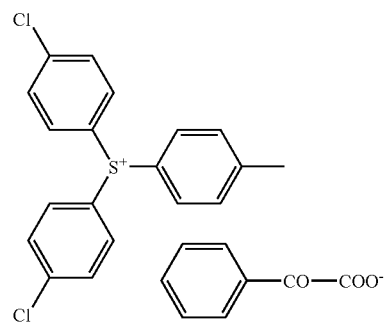

[OS-9]

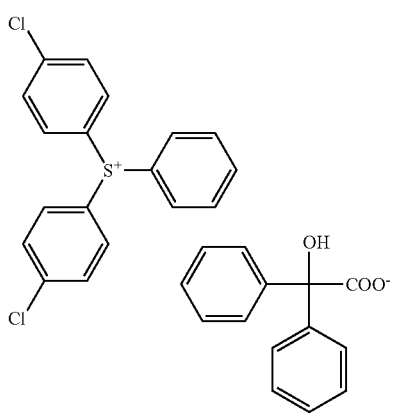

[OS-10]

[OS-11]

[OS-12]

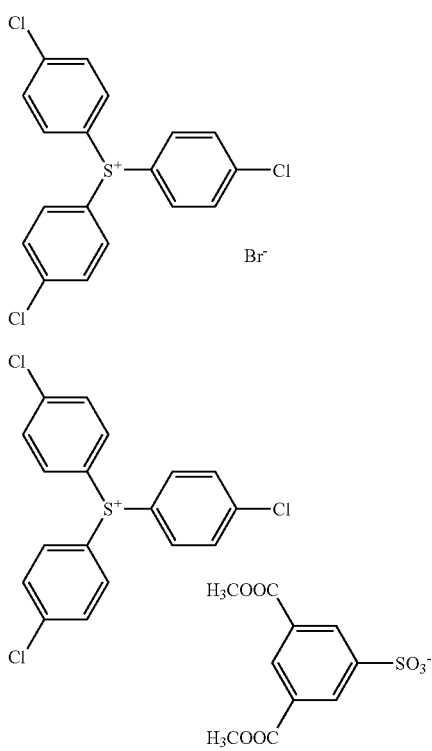

In addition, specific aromatic sulfonium salts described in JP-A Nos. 2002-148790, 2002-350207, and 2002-6482 are also preferably used as the polymerization initiator.

In the invention, not only the sulfonium salt polymerization initiator, but also other polymerization initiators (other radical generators) may also be used. Examples of other radical generators include onium salts other than sulfonium salts, triazine compounds having a trihalomethyl group, peroxides, azo polymerization initiators, azide compounds, quinone diazide, activated halogen compounds, oxime ester compounds, and triaryl monoalkyl borate compounds. Among them, onium salts are preferably used, since they are highly sensitive. In addition, any of these polymerization initiators (radical generators) may be used together with the above-described sulfonium salt polymerization initiator, which is used as an essential component.

Examples of the other onium salts which can be used preferably in the invention include iodonium salts and diazonium salts. In the invention, these onium salts function as radical polymerization initiators rather than as acid generating agents.

The onium salts represented by the following Formulae (II) and (III) can also be used.

$$Ar^{21}-I^+-Ar^{22} \ (Z^{21})^-$$   Formula (II)

$$Ar^{31}-N^+\equiv N \ (Z^{31})^-$$   Formula (III)

In formula (II), $Ar^{21}$ and $Ar^{22}$ each independently represent an aryl group having 20 carbon atoms or less which may have at least one substituent. When the aryl group has at least one substituent, typical examples of the substituent include halogen atoms, a nitro group, alkyl groups having 12 or less carbon atoms, alkoxy groups having 12 or less carbon atoms, and aryloxy groups having 12 or less carbon atoms. $(Z^{21})^-$ is a counter ion having the same definition as that of $(Z^{11})^-$.

In formula (III), $Ar^{31}$ represents an aryl group having 20 or less carbon atoms which may have at least one substituent. Typical examples of the substituent include halogen atoms, a nitro group, alkyl groups having 12 or less carbon atoms, alkoxy groups having 12 or less carbon atoms, aryloxy groups having 12 or less carbon atoms, alkylamino groups having 12 or less carbon atoms, dialkylamino groups having 12 or less carbon atoms, arylamino groups having 12 or less carbon atoms, and diarylamino groups having 12 or less carbon atoms. $(Z^{31})^-$ is a counter ion having the same definition as that of $(Z^{11})^-$.

As the typical examples of the onium salt represented by Formula (II), [OI-1] to [OI-10] and as the onium salt represented by Formula (III), [ON-1] to [ON-5] are shown below, but the invention is not limited by them.

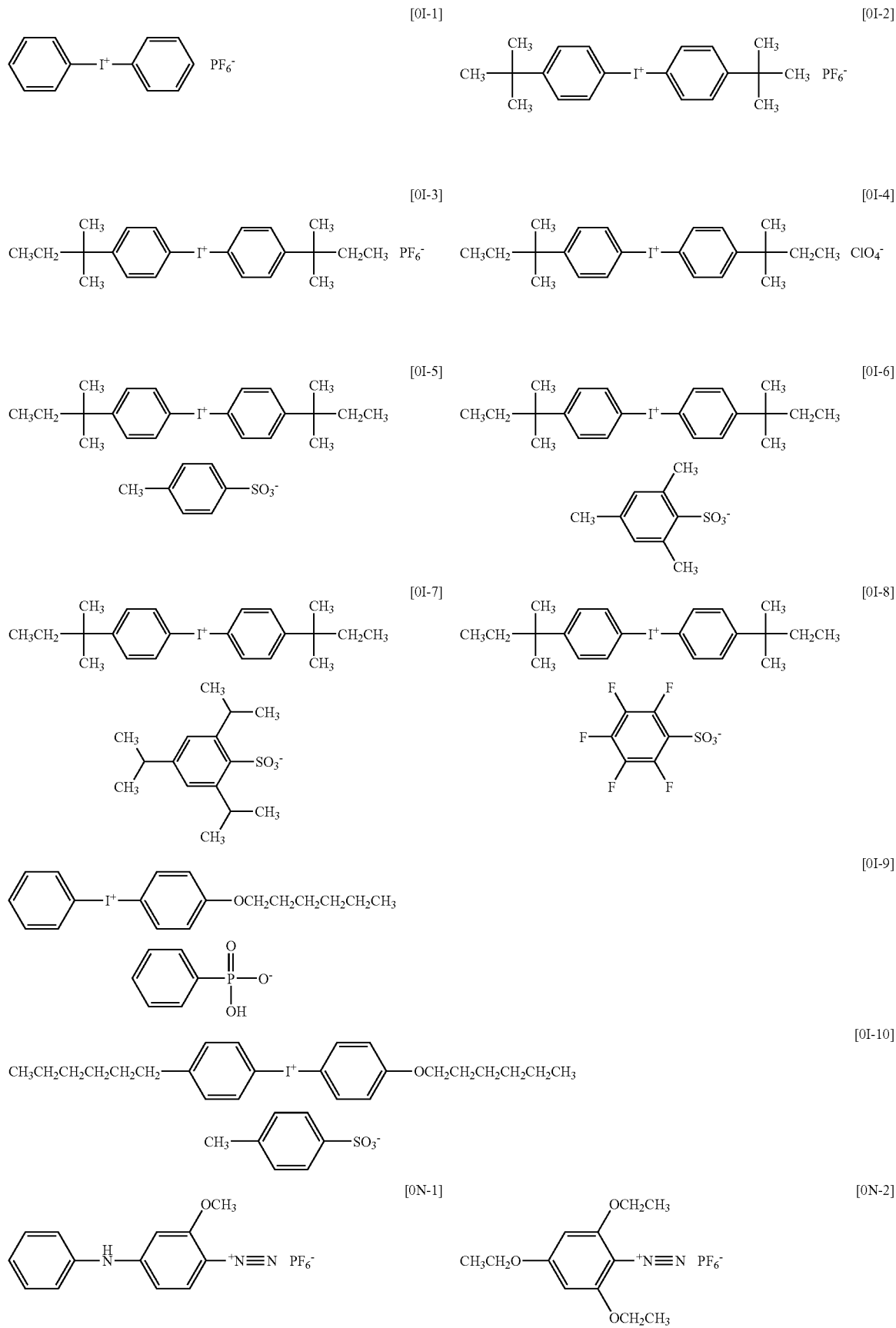

-continued

[0N-3]

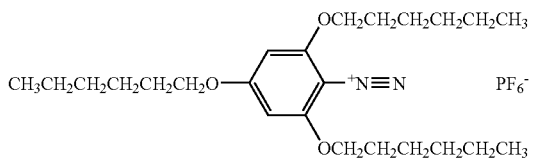

[0N-4]

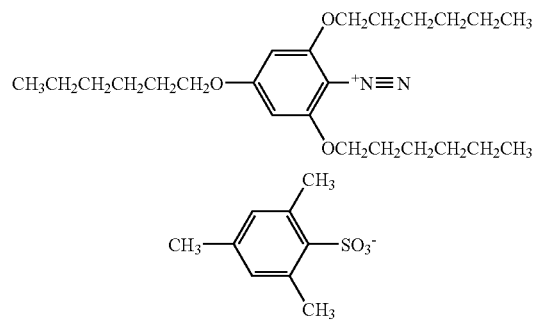

[0N-5]

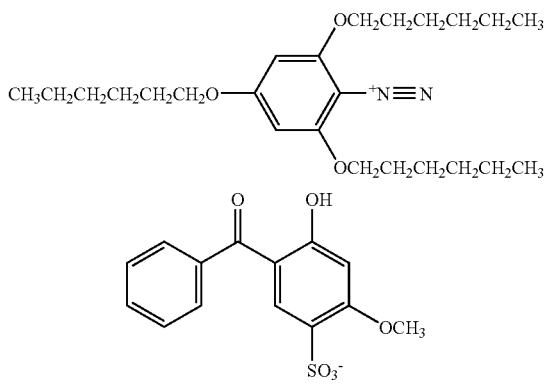

Specific examples of the onium salts preferably used as the polymerization initiator (radical generator) in the invention include those described in JP-A No. 2001-133696.

Further, the polymerization initiator (radical generator) used in the invention preferably has a maximum absorption wavelength of 400 nm or less, and more preferably has a maximum absorption wavelength of 360 nm or less. When the polymerization initiator (radical generator) has its absorption wavelength in the UV range, the planographic printing plate precursor can be handled under a white lamp.

The total content of the polymerization initiator in the invention is 0.1 to 50% by mass, preferably from 0.5 to 30% by mass, more preferably 1 to 20% by mass, relative to the total solid content of the image forming layer, from the viewpoints of sensitivity and prevention of scummings on the non-image area during printing.

In the invention, a polymerization initiator may be used or two or more polymerization initiators can be used together. When two or more polymerization initiators are used together, two or more sulfonium salt polymerization initiators may be used, or a combination of a sulfonium salt polymerization initiator and any other polymerization initiators may be used.

When a sulfonium salt polymerization initiator and another polymerization initiator are used in combination, the mass ratio of these initiators is preferably 100/1 to 100/50 and more preferably 100/5 to 100/25.

In addition, the polymerization initiator and the other component may be contained in the same layer or in different layers.

When a highly sensitive sulfonium salt serving as a typical polymerization initiator is used in the image forming layer in the invention, the radical polymerization reaction effectively proceeds and the strength of an image portion formed is very strong. Accordingly, when a recording layer is combined with a protective layer described hereinafter, which has a high oxygen-blocking function, a planographic printing plate having a very high strength of the image portion can be produced, and consequently the printing durability of the plate is further improved. Further, the sulfonium salt polymerization initiator is superior in storability over time, and, when a planographic printing plate precursor containing the sulfonium salt polymerization initiator is stored, an undesirable polymerization reaction is effectively suppressed.

(Polymerizable Compound)

The polymerizable compound used in the invention is an addition-polymerizable compound having at least one ethylenically unsaturated double bond, and is selected from compounds having at least one, preferably 2 or more, ethylenically unsaturated double bonds. Such compounds are widely known in this industrial field, and any of these compounds may be used in the invention, which are not particularly limited. These have a chemical form such as, for example, a monomer, a prepolymer, i.e., a dimer, a trimer and an oligomer, or a mixture or a copolymer of two or more of these compounds. Examples of the monomer and the copolymer thereof include unsaturated carboxylic acids (e.g., acrylic acid, methacrylic acid, itaconic acid, crotonic acid, isocrotonic acid, and maleic acid), and esters and amides thereof. The polymerizable compound is preferably an ester of an unsaturated carboxylic acid and an aliphatic polyhydric alcohol compound, or an amide of an unsaturated carboxylic acid and an aliphatic polyvalent amine compound. In addition, an addition reaction product of an unsaturated carboxylate ester having a nucleophilic substituent such as a hydroxyl group, an amino group or a mercapto group, or an amide thereof, and a monofunctional or polyfunctional isocyanate, or an epoxy compound; and a dehydration condensation reaction product of such an unsaturated carboxylate ester or an amide, and a monofunctional or polyfunctional carboxylic acid may be preferably used. Furthermore, an addition reaction product of an unsaturated carboxylate ester having an electrophilic substituent such as an isocyanate group or an epoxy group, or an amide thereof, and a monofunctional or polyfunctional alcohol, amine or thiol, and a substitution reaction product of an unsaturated carboxylate ester having a leaving substituent such as a halogen atom or a tosyloxy group, or an amide thereof, and a monofunctional or polyfunctional alcohol, amine or thiol are also preferably used. Alternatively, monomers and prepolymers, and mixtures and copolymers thereof which are the same as the above except that the aforementioned unsaturated carboxylic ester acid is replaced with an unsaturated phosphonic acid, styrene, or vinyl ether may also be used.

Specific examples of acrylate esters as the ester monomer of an aliphatic polyhydric alcohol compound and an unsaturated carboxylic acid include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, and polyester acrylate oligomer.

Examples of the methacrylate esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, and bis-[p-(methacryloxyethoxy)phenyl]dimethylmethane.

Examples of the itaconate esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of the crotonate esters include ethylene glycol dicrotonate, tetramethylene glycol dicrotonate, pentaerythritol dicrotonate, and sorbitol tetradicrotonate.

Examples of the isocrotonate esters include ethylene glycol diisocrotonate, pentaerythritol diisocrotonate, and sorbitol tetraisocrotonate.

Examples of the maleate esters include ethylene glycol dimaleate, triethylene glycol dimaleate, pentaerythritol dimaleate, and sorbitol tetramaleate.

Examples of other esters include aliphatic alcohol esters described in JP-B Nos. 46-27926 and 51-47334, and JP-A No. 57-196231, those having an aromatic skeleton as described in JP-A Nos. 59-5240, 59-5241 and 2-226149, and those containing an amino group as described in JP-A No. 1-165613. Moreover, the ester monomers described above may be used as a mixture.

Specific examples of the amide monomer of an aliphatic polyvalent amine compound and an unsaturated carboxylic acid include methylenebis-acrylamide, methylenebis-methacrylamide, 1,6-hexamethylenebis-acrylamide, 1,6-hexamethylenebis-methacrylamide, diethylene triamine trisacrylamide, xylylenebis-acrylamide, and xylylenebis-methacrylamide. Other examples of preferred amide monomers include those having a cyclohexylene structure as described in JP-B No. 54-21726.

Further, the polymerizable compound in the invention is also preferably an addition-polymerizable urethane compound produced by addition reaction of an isocyanate with a hydroxyl group-containing compound. Typical examples thereof include vinyl urethane compounds described in JP-B No. 48-41708. The vinyl urethane compounds contain two or more polymerizable vinyl groups in one molecule thereof, and are produced by adding a hydroxyl group-containing vinyl monomer represented by the following Formula (A):

$$CH_2=C(R^a)COOCH_2CH(R^b)OH \quad \text{Formula (A)}$$

wherein $R^a$ and $R^b$ each represent H or $CH_3$.

Further, urethane acrylates as described in JP-A No. 51-37193 and JP-B Nos. 2-32293 and 2-16765 and urethane compounds each having an ethylene oxide skeleton as described in JP-B Nos. 58-49860, 56-17654, 62-39417 and 62-39418 may also be suitably used as the polymerizable compound. When any of addition-polymerizable compounds each having an amino structure or a sulfide structure in a molecule thereof described in JP-A Nos. 63-277653, 63-260909 and 1-105238 is used as the polymerizable compound, a photopolymerizable composition that is considerably excellent in photosensitizing speed may be obtained.

Other examples of the polymerizable compound include multifunctional acrylates and methacrylates such as polyester acrylates as described in JP-A No. 48-64183 and JP-B Nos. 49-43191 and 52-30490, and epoxy acrylates obtained by reacting an epoxy resin with (meth)acrylic acid. Specific unsaturated compounds described in JP-B Nos. 46-43946, 1-40337 and 1-40336, and vinylphosphonic acid compounds described in JP-A No. 2-25493 may also be used as the polymerizable compound. In some instances, compounds having a structure with a perfluoroalkyl group, which are described in JP-A No. 61-22048, may be appropriately used. Photo-curable monomers and oligomers described in "Nippon Setchaku Kyokai Shi (Journal of the Adhesive Society of Japan)", Vol. 20, No. 7, pages 300-308 (1984) may also be used.

Details of these addition-polymerizable compounds, for example, the structure thereof, and the method of use thereof such as use of only one of the compounds, use of two or more of the compounds, and the amount(s) of the compound(s) used, may be arbitrarily determined depending on the desired performance of a final planographic printing plate precursor. For example, they are selected from the following viewpoints. From the viewpoint of photosensitizing speed, the addition-polymerizable compound preferably has a large number of unsaturated groups in one molecule, and in many cases, they are preferably bifunctional or more. In order to increase the strength of the image areas, i.e. the cured layer, the addition-polymerizable compounds are preferably trifunctional or more. It is also effective to regulate both photosensitivity and strength by combining compounds (e.g. acrylate esters, methacrylate esters, styrene compounds, and vinyl ether compounds) having different functionalities and different polymerizable groups. Although the polymer compounds or highly hydrophobic compounds have excellent photosensitizing speed and film strength, they may decelerate developing speed and tend to easily precipitate in the developing solution, and are not therefore preferably used in some cases. Selection and use of the addition-polymerizable compound is an important factor for compatibility between the compound and other components (e.g. a binder polymer, an initiator, and a coloring agent) and dispersibility thereof in the image forming layer composition. For example, the compatibility may be improved by using a compound having a low purity or a combination of two or more compounds.

In the invention a planographic printing plate precursor having a specific structure may be selected for the purpose of improving adhesiveness among a support, an intermediate layer, a protective layer etc.

The content of the addition-polymerizable compound in the image forming layer is preferably in the range of 5 to 80% by mass, more preferably in the range of 40 to 75% by mass, relative to the solid content of the image forming layer composition, from the viewpoints of sensitivity, phase separation, adhesiveness of the image forming layer, and the precipitating property of the addition-polymerizable compound in a developing solution.

One of these compounds may be used or two or more of them may be used together. As for use of the addition-polymerizable compound, the structure, the composition, and the addition amount thereof may be selected properly as needed, considering the extent of inhibition of polymerization caused by oxygen, resolution and the fogging property, change in refractive index, and surface adhesion. A layer configuration containing an undercoat and/or an overcoat and a coating method of these coatings may also be applied to the planographic printing plate precursor of the invention.

(Binder Polymer)

The binder polymer used in the invention has a function of improving layer properties, and therefore, any polymers that have a function of improving layer properties may be used as the binder polymer. A binder polymer having a repeating unit represented by Formula (i) below is preferably used as the binder polymer in the invention. Hereinafter, the binder polymer having a repeating unit represented by Formula (i) will be referred to as a specific binder polymer and will be described in detail.

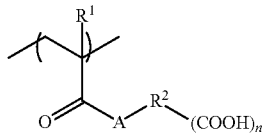

Formula (i)

wherein $R^1$ represents a hydrogen atom or a methyl group; $R^2$ represents a connecting group which includes two or more atoms selected from the group consisting of a carbon atom, a hydrogen atom, an oxygen atom, a nitrogen atom and a sulfur atom and which has 2 to 82 atoms in total; A represents an oxygen atom or —$NR^3$—; $R^3$ represents a hydrogen atom or a monovalent hydrocarbon group having 1 to 10 carbon atoms; and n represents an integer of 1 to 5.

$R^1$ in Formula (i) represents a hydrogen atom or a methyl group, and is preferably a methyl group.

The connecting group represented by $R^2$ in Formula (i) contains two or more atoms selected from the group consisting of a carbon atom, a hydrogen atom, an oxygen atom, a nitrogen atom, and a sulfur atom. The connecting group has 2 to 82 atoms in total, preferably has 2 to 50 atoms in total, more preferably has from 2 to 30 atoms in total. If the connecting group has at least one substituent, the total number of atoms includes the number of atoms of the substituent(s).

More specifically, the number of atoms of the main skeleton of the connecting group represented by $R^2$ is preferably from 1 to 30, more preferably 3 to 25, still more preferably 4 to 20, and most preferably 5 to 10. The term "main skeleton of the connecting group" refers to an atom or an atomic group only for connection between "A" and the terminal COOH group in Formula (i). Particularly when the connecting group has a plurality of connecting routes, the main skeleton of the connecting group refers to an atom or an atomic group forming the shortest connection between "A" and the terminal COOH group. Accordingly, when the connecting group includes a cyclic structure therein, the number of the atoms to be counted may vary depending on the connecting position (e.g., ortho, meta, or para).

Specific examples of the connecting group include substituted or unsubstituted alkylene, substituted or unsubstituted arylene, and groups in which these bivalent groups are connected via at least one amide or ester bond.

Examples of connecting groups having a chain structure include ethylene and propylene. Further preferable examples include connecting groups in which these alkylenes are connected to each other via at least one ester bond.

Among them the connecting group represented by $R^2$ in Formula (i) is preferably a hydrocarbon group having an alicyclic structure with from 3 to 30 carbon atoms and a valence of (n+1). Specific examples of such a compound include hydrocarbon groups having a valence of (n+1) and obtained by removing (n+1) hydrogen atoms each bonding to one of carbon atoms of an alicyclic hydrocarbon compound such as cyclopropane, cyclopentane, cyclohexane, cycloheptane, cyclooctane, cyclodecane, dicyclohexyl, tercyclohexyl, and norebornane, which may be substituted with one or more arbitrary substituent. $R^2$ preferably has from 3 to 30 carbon atoms which include carbon atoms of the substituent.

One or more carbon atoms of the compound having an alicyclic structure may optionally be substituted by one or more heteroatom selected from a nitrogen atom, an oxygen atom and a sulfur atom. In view of printing durability, $R^2$ is preferably a hydrocarbon group which has an alicyclic structure and a valence of (n+1), which may have a substituent and which has from 5 to 30 carbon atoms and includes two or more rings, such as a condensed polycyclic aliphatic hydrocarbon, a crosslinked alicyclic hydrocarbon, a spiro aliphatic hydrocarbon or compounds having aliphatic hydrocarbon rings connected with each other via a bond or a connecting group. Also in this instance, the number of carbon atoms involves the number of carbon atoms included in the substituent.

The connecting group represented by $R^2$ is particularly preferably a group containing a main skeleton with 5 to 10 carbon atoms. Such a group preferably has a chain structure containing at least one ester bond therein or the cyclic structure described above.

Examples of the substituent which may be introduced into the connecting group represented by $R^2$ include monovalent non-metal atomic groups excluding hydrogen, such as halogen atoms (—F, —Br, —Cl and —I), a hydroxyl group, an alkoxy group, an aryloxy group, a mercapto group, an alkylthio group, an arylthio group, an alkyldithio group, an aryldithio group, an amino group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, an ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, a carboxyl group and a conjugated base group thereof, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—SO$_3$H) and a conjugated base group thereof, an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, an N-acylsulfamoyl group and a conjugated base group thereof, an N-alkylsulfonylsulfamoyl group (—SO$_2$NHSO$_2$(alkyl)) and a conjugated base group thereof, an N-arylsulfonylsulfamoyl group (—SO$_2$NHSO$_2$(aryl)) and a conjugated base group thereof, an N-alkylsulfonylcarbamoyl group (—CONHSO$_2$(alkyl)) and a conjugated base group thereof, an N-arylsulfonylcarbamoyl group (—CONHSO$_2$(aryl)) and a conjugated base group thereof, an alkoxysilyl group (—Si(Oalkyl)$_3$), an aryloxysilyl groups (—Si(Oaryl)$_3$), a hydroxysilyl group (—Si(OH)$_3$) and a conjugated base group thereof, a phosphono group (—PO$_3$H$_2$) and a conjugated base group thereof, a dialkylphosphono group (—PO$_3$(alkyl)$_2$), a diarylphosphono group (—PO$_3$(aryl)$_2$), an alkylarylphosphono group (—PO$_3$(alkyl)(aryl)), monoalkylphosphono groups (—PO$_3$H(alkyl)) and a conjugated base group thereof, a monoarylphosphono group (—PO$_3$H(aryl)) and a conjugated base group thereof, a phosphonoxy group (—OPO$_3$H$_2$) and a conjugated base group thereof, a dialkylphosphonoxy group (—OPO$_3$(alkyl)$_2$), a diarylphosphonoxy group (—OPO$_3$(aryl)$_2$), an alkylarylphosphonoxy group (—OPO$_3$(alkyl)(aryl)), a monoalkylphosphonoxy group (—OPO$_3$H(alkyl)) and a conjugated base group thereof, a monoarylphosphonoxy group (—OPO$_3$H(aryl)) and a conjugated base group thereof, a cyano group, a nitro group, a dialkylboryl group (—B(alkyl)$_2$), a diarylboryl group (—B(aryl)$_2$), an alkylarylboryl group (—B(alkyl)(aryl)), a dihydroxyboryl group (—B(OH)$_2$) and a conjugated base group thereof, an alkylhydroxyboryl group (—B(alkyl)(OH)) and a conjugated base group thereof, an arylhydroxyboryl group (—B(aryl)(OH)) and a conjugated base group thereof, an aryl group, an alkenyl group, and an alkynyl group.

In the planographic printing plate precursor of the invention, substituents having at least one hydrogen atom capable of forming a hydrogen bond, particularly, substituents having a smaller value of acid dissociation constant (pKa) than that of carboxylic acid are not preferred because they are likely to reduce printing durability. However, such substituents may be used depending on the design of the image forming layer. On the contrary, halogen atoms, hydrophobic substituents such as hydrocarbon groups (e.g., alkyl groups, aryl groups, alkenyl groups and alkynyl groups), alkoxy groups and aryloxy groups are preferred because they are likely to improve printing durability. In particular, when the cyclic structure is a mono-alicyclic hydrocarbon with a ring skeleton having 6 or less atoms, such as cyclopentane or cyclohexane, it preferably has the aforementioned hydrophobic substituent(s). These substituents may be bound to each other to form a ring, or may be bound to the hydrocarbon group that has a substituent to form a ring, if possible. In addition, the substituent may have at least one substituent.

When A in Formula (i) is —NR$^3$—, R$^3$ represents a hydrogen atom or a monovalent hydrocarbon group having 1 to 10 carbon atoms. The monovalent hydrocarbon group having 1 to 10 carbon atoms, represented by R$^3$, includes alkyl groups, aryl groups, alkenyl groups, and alkynyl groups.

Typical examples of the alkyl groups include linear, branched or cyclic alkyl groups having 1 to 10 carbon atoms, such as a methyl group, an ethyl group, a propyl group, a butyl group, a pentyl group, a hexyl group, a heptyl group, an octyl group, a nonyl group, a decyl group, an isopropyl group, an isobutyl group, a sec-butyl group, a tert-butyl group, an isopentyl group, a neopentyl group, a 1-methylbutyl group, an isohexyl group, a 2-ethylhexyl group, a 2-methylhexyl group, a cyclopentyl group, a cyclohexyl group, a 1-adamantyl group, and a 2-norbornyl group.

Typical examples of the aryl groups include aryl groups having 1 to 10 carbon atoms, such as a phenyl group, a naphthyl group, and an indenyl group; and heteroaryl groups having 1 to 10 carbon atoms and containing at least one heteroatom selected from the group consisting of a nitrogen atom, an oxygen atom and a sulfur atom, such as a furyl group, a thienyl group, a pyrrolyl group, a pyridyl group, and a quinolyl group.

Typical examples of the alkenyl groups include linear, branched or cyclic alkenyl groups having 1 to 10 carbon atoms, such as a vinyl group, a 1-propenyl group, a 1-butenyl group, a 1-methyl-1-propenyl group, a 1-cyclopentenyl group, and a 1-cyclohexenyl group.

Typical examples of the alkynyl groups include alkynyl groups having 1 to 10 carbon atoms, such as an ethynyl group, a 1-propynyl group, a 1-butynyl group, and a 1-octynyl group. R$^3$ may have at least one substituent, and examples of the substituent are the same as those of the substituent which may be introduced into R. However, the total number of carbon atoms of R$^3$ including the number of carbon atoms of the substituent(s) is 1 to 10.

"A" in Formula (i) is preferably an oxygen atom or —NH—, from the viewpoint of easy synthesis of the compound.

"n" in Formula (i) represents an integer of 1 to 5, and is preferably 1 from the viewpoint of printing durability.

Typical examples of the repeating unit represented by Formula (i) are shown below, however the invention is not limited by them.

53 54
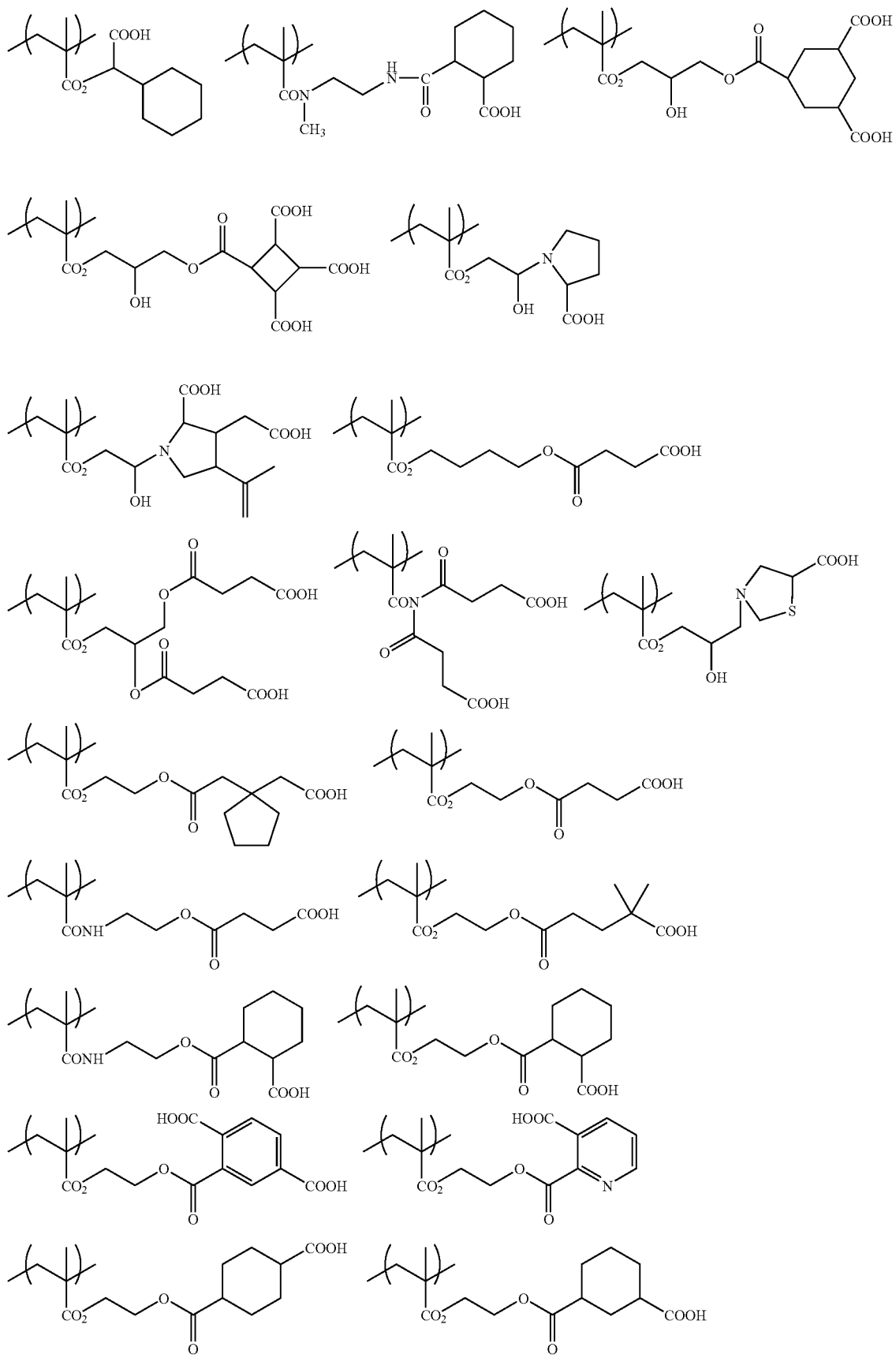

-continued
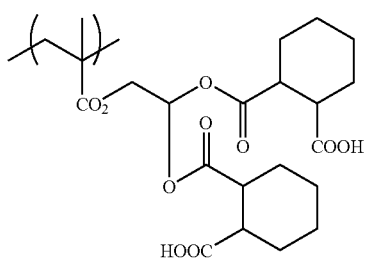 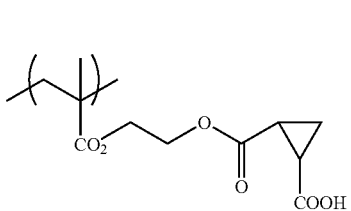
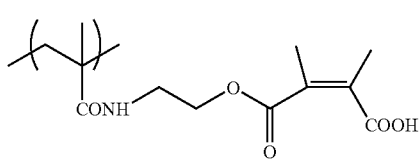 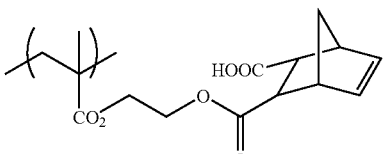
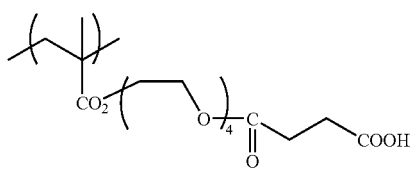 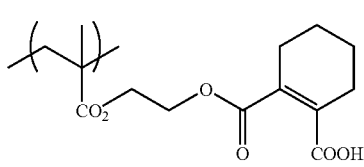
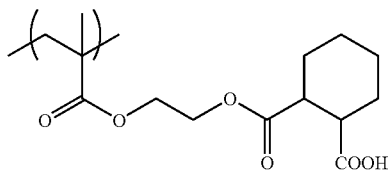 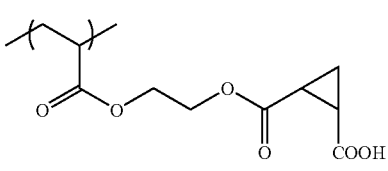
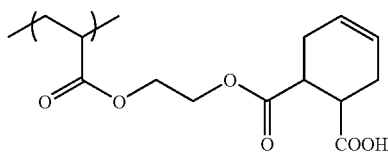 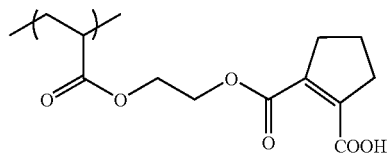
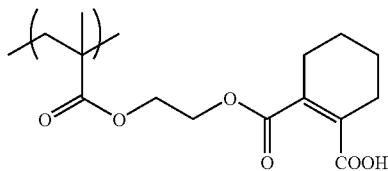 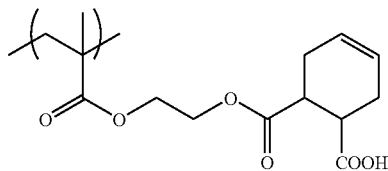
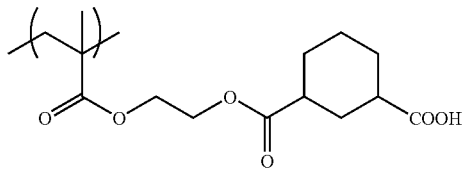 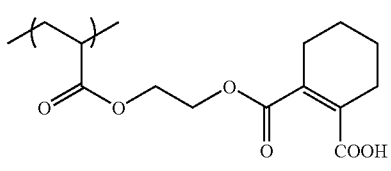
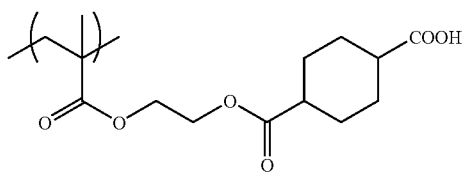 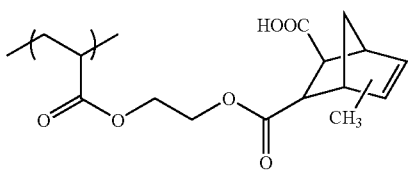
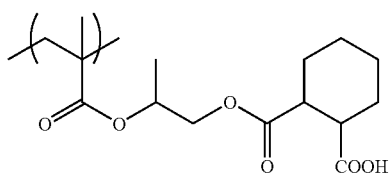 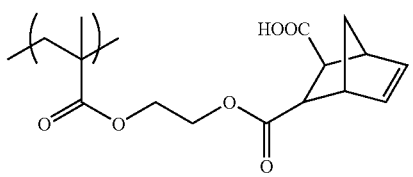

-continued
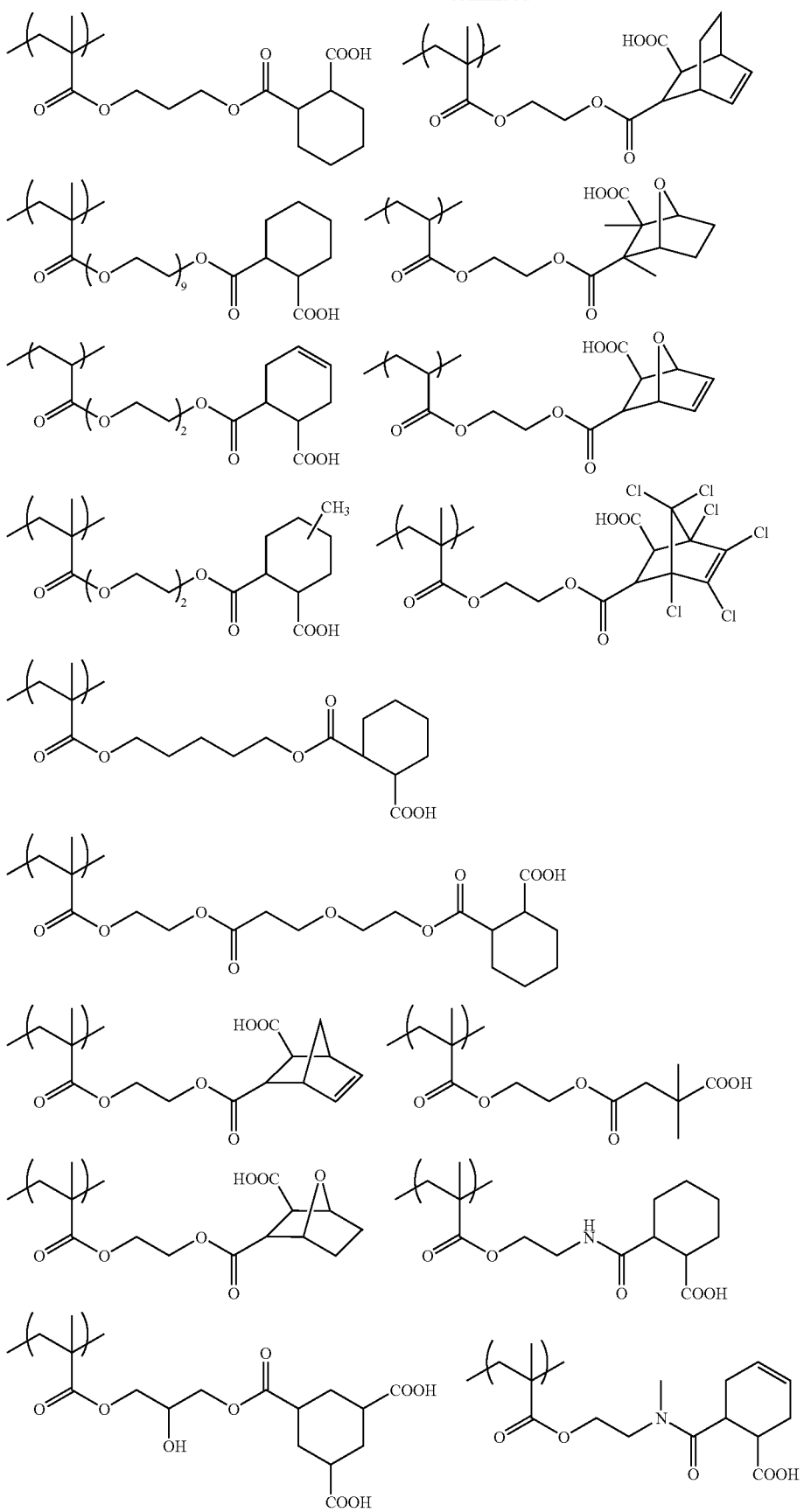

-continued
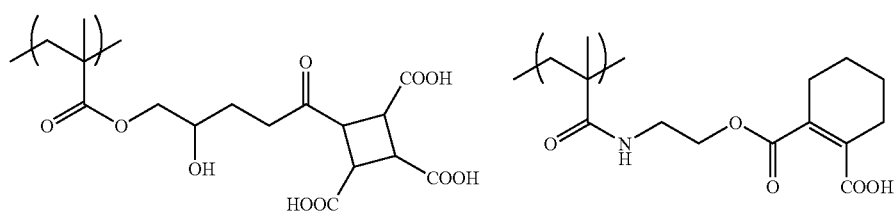
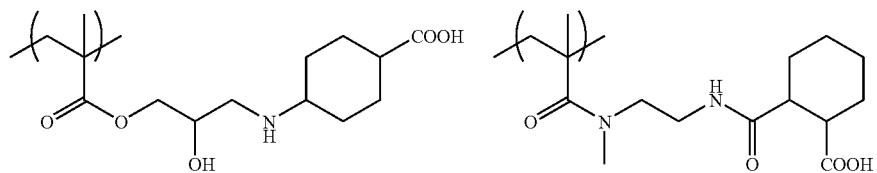
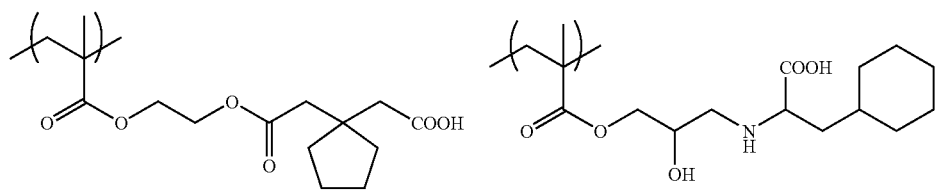
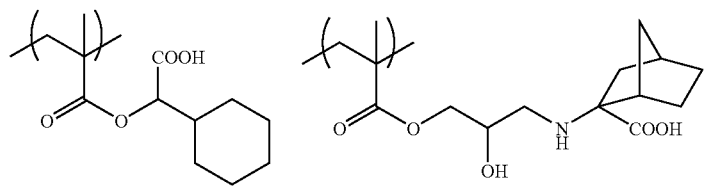
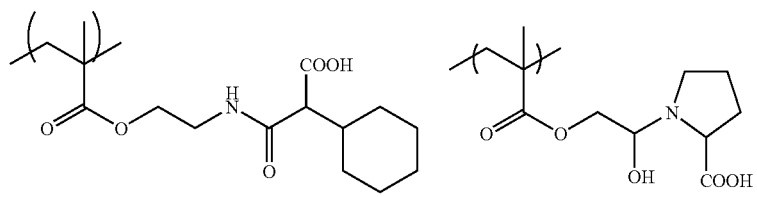
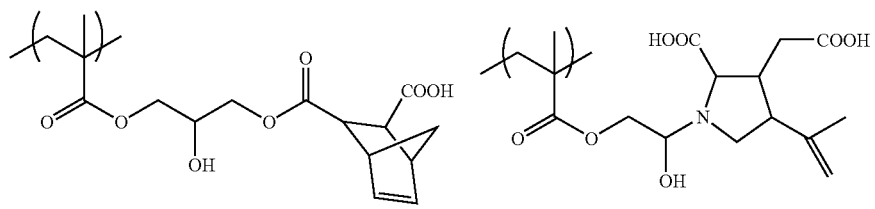
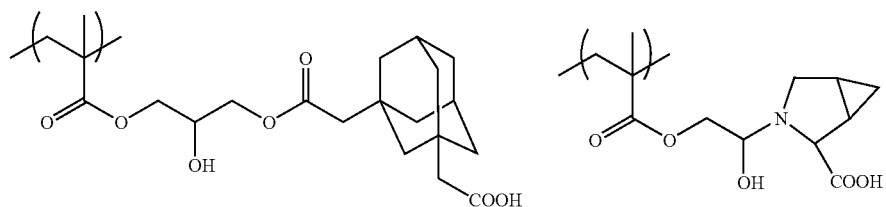
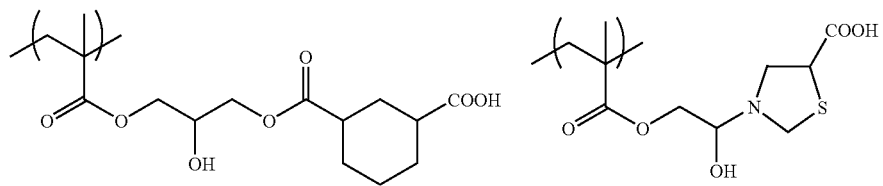

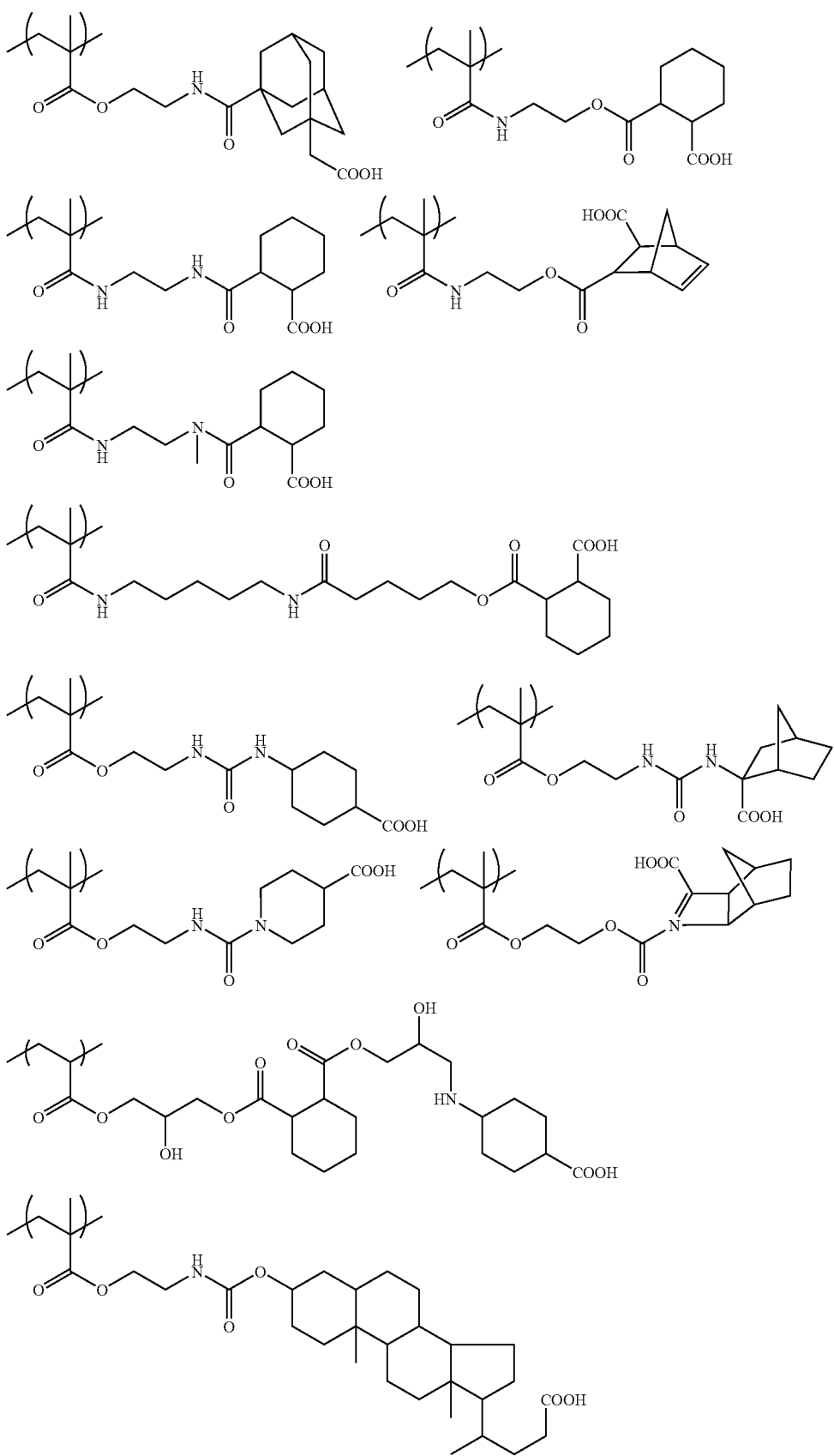

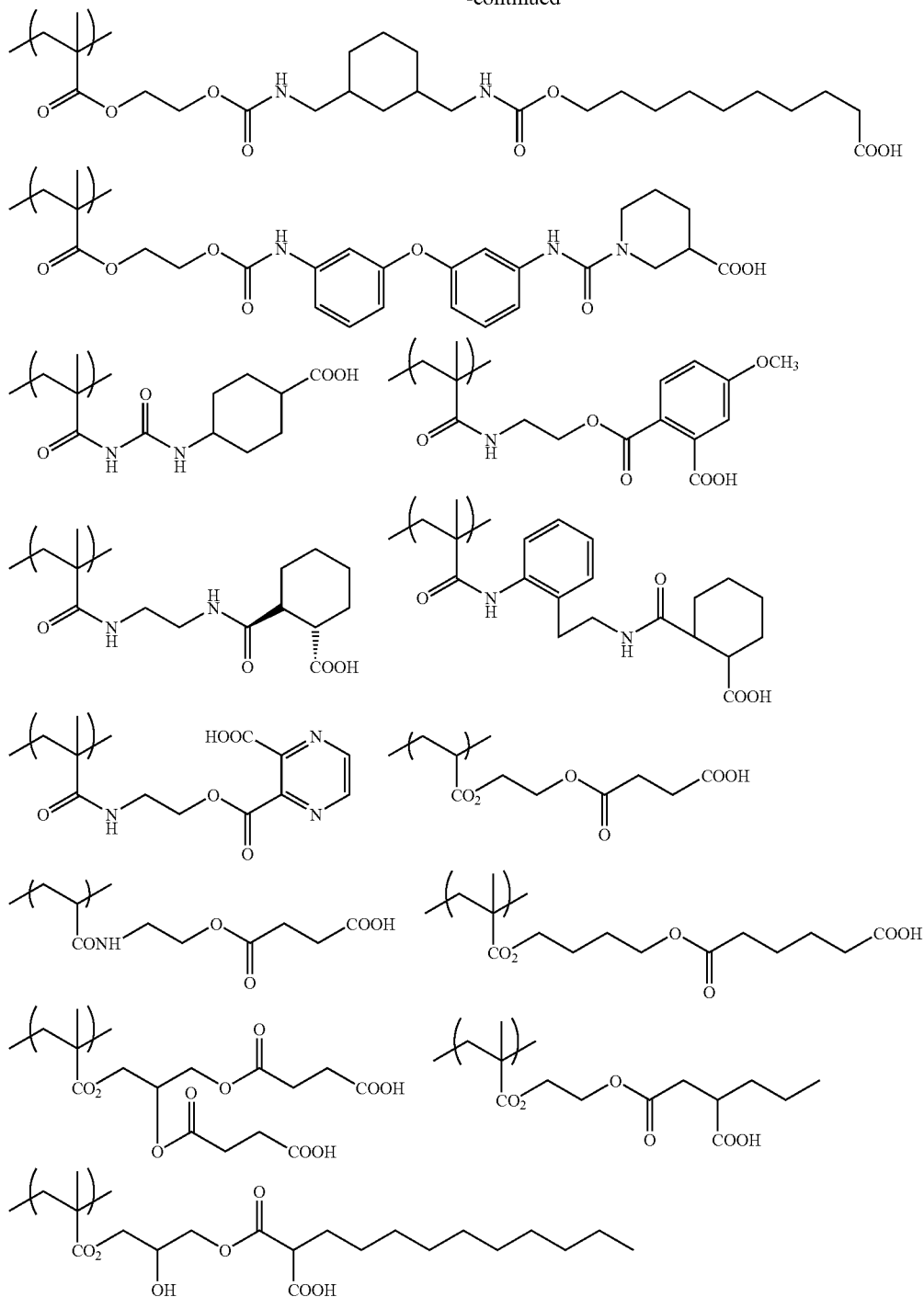

The binder polymer may have one repeating unit or two or more repeating units represented by Formula (i). The specific binder polymer used in the invention may be a polymer consisting of only the repeating unit represented by Formula (i), however is usually used as a copolymer in combination with any other copolymerizable component. A total content of the repeating unit represented by Formula (i) in the copolymer is suitably determined from a structure of the polymer and a composition for a image forming layer, however the total content is preferably in the range of 1 to 99 mol %, more preferably 5 to 40 mol %, and still more preferably 5 to 20 mol % relative to the total mole amount of the polymer components.

When the binder polymer is a copolymer, the copolymerizable component to be used may be any conventionally known monomer that is a radically polymerizable monomer. Specific examples include monomers described in "Kobunshi Data Handbook (Polymer Data Handbook), Kiso-hen (Fundamental Step) edited by Kobunshi Gakkai (Society of Polymer Science, Japan), published by BAIFUKAN CO., LTD in 1986)". One of the copolymerizable components may be used or two or more of them may be used together.

A molecular weight of the specific binder polymer in the invention is determined suitably, considering the image-forming property and printing durability of the precursor. The molecular weight is preferably in the range of 2000 to 1000000, more preferably in the range of 5000 to 500000, even more preferably in the range of 10000 to 200000.

The binder polymer used in the invention may be the specific binder polymer alone, or may be a mixture of the specific binder polymer with one or more other binder polymers. The combined binder polymer is used in the range of 1 to 60% by mass, preferably 1 to 40% by mass, and even more preferably 1 to 20% by mass with respect to the total mass of the binder polymer component. The binder polymer used in combination may be freely used conventionally known binder polymers, and specific examples thereof include acryl main chain binders and urethane binders that are frequently used in the art.

The total amount of the specific binder polymer and the binder polymer which may be used in combination in the image forming layer composition may be appropriately determined, however the total content is usually in the range of 10 to 90% by mass, preferably 20 to 80% by mass, and still more preferably 30 to 70% by mass relative to the total mass of the non-volatile components in the image forming layer composition.

The acid value (meq/g) of the binder polymer is preferably in the range of 2.00 to 3.60.

Other binder polymers usable together with the specific binder polymer

Other binder polymers usable together with the specific binder polymer are preferably binder polymers having a radically polymerizable group.

The radically polymerizable group is not particularly limited as long as it may be radically polymerized. Examples thereof include α-substituted-methylacrylic groups (—OC(=O)—C(—CH$_2$Z)=CH$_2$ wherein Z is a hydrocarbon group with a heteroatom bonding to hydrocarbon group), acrylic groups, methacrylic groups, allyl groups, and styryl groups. The radically polymerizable group is preferably an acrylic group or a methacrylic group.

The content of the radically polymerizable group in the binder polymer, more specifically, the content of the radically polymerizable unsaturated double bonds determined by iodimetry, is preferably from 0.1 to 10.0 mmol, more preferably from 1.0 to 7.0 mmol, and most preferably from 2.0 to 5.5 mmol per gram of the binder polymer, from the viewpoints of sensitivity and storage stability.

It is preferable that the other binder polymer usable together with the specific binder polymer further has an alkali-soluble group. The content of the alkali-soluble group in the binder polymer, in other words, the acid value of the binder polymer determined by neutralization titration, is preferably from 0.1 to 3.0 mmol, more preferably from 0.2 to 2.0 mmol, and most preferably from 0.45 to 1.0 mmol per gram of the binder polymer, from the viewpoints of precipitation of development scums and printing durability.

The weight-average molecular weight of the binder polymer is preferably in the range of from 2000 to 1000000, more preferably in the range of 10000 to 300000, and most preferably in the range of 20000 to 200000, from the viewpoints of the film-forming property (printing durability) of the binder polymer and the solubility of the binder polymer in a coating solvent.

The glass transition temperature (Tg) of the binder polymer is preferably in the range of from 70 to 300° C., more preferably in the range of from 80 to 250° C., and most preferably in the range of from 90 to 200° C., from the viewpoints of storage stability, printing durability, and sensitivity.

The binder polymer preferably has an amide or imide group in the molecule thereof, and more preferably has a methacrylamide or a methacrylamide derivative, in order to raise the glass transition temperature of the binder polymer.

(Other Components)

The image forming layer in the invention may contain not only the aforementioned essential components however also any other component which is suitable for the intended use and the production method, if necessary. Preferred additives will be illustrated below.

Coloring Agent

A dye or pigment may be added to the image forming layer in the invention to color the layer. It is thus possible to improve so-called plate-checking properties such as the visibility of printing plates after plate-making and the applicability for image densitometer. Typical examples of the coloring agents include pigments such as phthalocyanine pigments, azo pigments, carbon black, and titanium oxide and dyes such as ethyl violet, crystal violet, azo dyes, anthraquinone dyes, cyanine dyes, among which cationic dyes are preferable.

The content of the coloring agent (dye or pigment) added is preferably approximately from 0.5 to 5% by mass relative to the total amount of nonvolatile components in the entire image forming layer composition.

Polymerization Inhibitor

It is desirable that the image forming layer in the invention contains a small amount of a thermal polymerization inhibitor in order to inhibit undesired thermal polymerization of the compound having a polymerizable ethylenically unsaturated double bond, namely the polymerizable compound. Suitable examples of the thermal polymerization inhibitor include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), and a primary cerium salt of N-nitrosophenylhydroxylamine.

The content of the thermal polymerization inhibitor added is preferably about 0.01 to about 5% by mass relative to the mass of the nonvolatile components contained in the image forming layer composition. In order to prevent oxygen from inhibiting the polymerization, the image forming layer composition may also contain a higher fatty acid derivative such as behenic acid or behenic acid amide, which is allowed to exist mainly at the surface of the layer during drying of the applied coating, if necessary. The content of the higher fatty acid derivative added is preferably about 0.5 to about 10% by mass relative to the mass of the nonvolatile components contained in the image forming layer composition.

Other Additives

The image forming layer in the invention may further contain any other known additives such as an inorganic filler for improving the physical properties of a cured film, a plasticizer, and a sensitizing agent for improving the surface property of the image forming layer by which an ink easily adheres to the layer surface. Examples of the plasticizer include dioctyl phthalate, didodecyl phthalate, triethylene glycol dicaprylate, dimethyl glycol phthalate, tricresyl phosphate, dioctyl adipate, dibutyl sebacate, and triacetylglycerin. The plasticizer may be added generally in the range of 10% by mass or less relative to the total mass of the binder polymer and the addition-polymerizable compound.

The image forming layer in the invention may contain a UV initiator and/or a thermal crosslinking agent in order to enhance the effects of heating and exposure of the developed layer and in turn improve the film strength (printing durability) described hereinafter.

(Protective Layer)

When the planographic printing plate precursor of the invention has a polymerizable negative image forming layer described above, a protective layer is preferably provided on the image forming layer for the purpose of preventing the introduction of low molecular weight compounds in the air such as oxygen, moisture, and basic substances that inhibit image formation reaction into the image forming layer.

In the invention, the protective layer preferably contains polyvinyl alcohol, fine particles composed of an organic resin, and mica particles. In the invention, the protective layer may have a layered structure. In this case, the uppermost layer is preferably a layer containing polyvinyl alcohol, fine particles composed of an organic resin, and mica particles. Such a protective layer may be arranged to improve the stability of the fine particles of an organic resin in a coating solution, to improve film strength, and to impart a matting property. As a result, the protective layer may improve sensitivity, storage stability over time and safelight suitability and may suppress the deterioration due to deformation and occurrence of scratches. Further, the excellent matting property of the protective layer suppresses, in a pile of the planographic printing plate precursors of the invention, the adhesion between the front surface of the protective layer of one planographic printing plate precursor and the rear surface of the support of the adjacent printing plate precursor, and the occurrence of scratches between the front surface of the protective layer and the rear surface of the aluminum support.

Hereinafter, fine particles composed of an organic resin, mica particles (mica compound), and polyvinyl alcohol are described in detail.

(Fine Particles Composed of an Organic Resin)

The fine particles composed of an organic resin in the invention are contained to suppress the adhesion between the front surface of the protective layer of one planographic printing plate precursor and the rear surface of the support of the adjacent planographic printing plate precursor, and the occurrence of scratches between the front surface of the protective layer and the rear surface of the aluminum support. The fine particles serving as a matting agent are desirably resin particles that do not substantially inhibit the transmission of rays used for exposure, and do not soften or become wet by moisture in the air or by heat. When the particles are contained in the uppermost protective layer, they preferably impart adequate irregularities to the surface of the protective layer to decrease the adhesion surface area. From the viewpoint of suppressing scratches, the matting particles preferably are relatively soft, have elasticity and relieve the stress produced upon rubbing with the hard Al surface. Further, the fine particles preferably have high affinity for polyvinyl alcohol as the binder in the protective layer, well kneaded in the film, and hardly fall off from the film surface. The average particle size of the fine particles composed of an organic resin is 2.0 to 15 μm, preferably 3.0 to 12 μm. The particle size distribution may be monodispersion or polydispersion, however is preferably monodispersion.

Examples of organic resins having such characteristics include particles of synthetic resins such as poly(meth)acrylic esters, polystyrene, and derivatives thereof, polyamides, polyimides, polyolefins such as low density polyethylene, high density polyethylene and polypropylene, copolymers thereof with poval, polyurethane, polyurea, and polyesters, and fine particles of natural polymers such as chitin, chitosan, cellulose, crosslinked starch, and crosslinked cellulose. Among them, fine particles of a synthetic resin are preferable from the viewpoints of easiness of particle size control and easiness of desired surface property control through surface modification.

The fine particles composed of an organic resin may be produced by a crushing method when the resin is a relatively hard resin such as PMMA. At present, however, the particles are usually synthesized by emulsion suspension polymerization owing to the easiness and accuracy of particle diameter control. The method of producing the fine particle powder is described in detail in "Chobiryushi to Zairyo" edited by Materials Science Society of Japan, published by Shokabo Publishing Co., Ltd., 1993, and "Manufacturing and Application of Particles and Powders (or Biryushi Funtai no Sakusei to Oyo)", supervised by Haruma Kawaguchi, published by CMC Publishing CO., LTD., 2005.

Commercial products of the fine particles of an organic resin include crosslinked acrylic resins manufacture by Soken Chemical & Engineering Co., Ltd., such as MX-300, MX-500, MX-1000, MX-1500H, MR-2HG, MR-7HG; MR-10HG, MR-3GSN, MR-5GSN, MR-7G, MR-10G MR-5C, and MR-7GC, styryl resins manufacture by Soken Chemical & Engineering Co., Ltd., such as SX-350H and SX-500H, acrylic resins manufactured by Sekisui Plastics Co., Ltd., such as MBX-5, MBX-8, MBX-12, MBX-15, MBX-20, MB20X-5, MB30X-5, MB30X-8, MB30X-20, SBX-6, SBX-8, SBX-12, and SBX-17, polyolefin resins manufactured by Mitsui Chemicals, Inc., such as CHEMI-PEARL W100, W200, W300, W308, W310, W400, W401, W405, W410, W500, WF640, W700, W800, W900, W950, and WP100, and polyacryl resin manufactured by Negami Chemical Industrial Co. Ltd, such as ART PEARL J-5P, J-6P, and J-7P.

These fine particles composed of an organic resin, when supplied in the form of powders, are dispersed in an aqueous solution of polyvinyl alcohol by using a simple dispersion machine such as a homogenizer, a homomixer, a ball mill, or a paint shaker. When a surfactant is added and dispersed therein as needed, the dispersed particles are further stabilized. Examples of the surfactant used for such dispersion include a nonionic surfactant, an anionic surfactant, and a cationic surfactant. Examples of the nonionic surfactant include polyethylene glycol alkyl ether, alkenyl ethers, polyethylene glycol alkyl esters, and polyethylene glycol aryl ethers. Examples of the anionic surfactant include alkyl or aryl sulfonic acid salts, alkyl or aryl sulfonate ester salts, alkyl or aryl phosphate esters, and alkyl or aryl carboxylate salts. Examples of the cationic surfactant include alkyl amine salts, alkyl pyridinum salts, and alkyl ammonium salts. Specifically, more specific examples of the surfactant are disclosed in "The Latest Function Creation, Material Development, and Application Technique of Surfactant" edited by Teruo Horiuchi and Toshiyuki Suzuki and published by Gijutsu Kyoiku Shuppan.

Fine particles of CHEMIPEARL manufactured by Mitsui Chemicals, Inc. are supplied in the form of dispersions in water, and thus these dispersions are added directly to an aqueous solution of polyvinyl alcohol under stirring to prepare a protective layer coating solution.

The fine particles composed of an organic resin contained in the protective layer preferably has a true specific gravity of 0.90 to 1.30 and an average particle diameter of 2.0 to 15 μm, more preferably a true specific gravity of 0.90 to 1.20 and an average particle diameter of 3.0 to 12 μm.

The content of the fine particles composed of an organic resin is preferably 1.0 to 20% by mass, more preferably 2.0 to 10% by mass, based on the solid content of the protective layer. When the content is too low, the surface matting effect is not brought about and the adhesion prevention effect and scratch resistance are insufficient. When the content is too high, there occurs decrease in the sensitivity or easy falling off of the fine particles from the protective layer surface to cause troubles.

(Mica Compound)

Examples of the mica particles for use in the invention include natural and synthetic micas represented by Formula: $A(B, C)_{2-5}D_4O_{10}(OH, F, O)_2$ wherein A represents K, Na, or Ca; B and C each represent Fe(II), Fe(III), Mn, Al, Mg, or V; and D represents Si or Al.

Among the above micas group, examples of the natural micas include white mica, soda mica, gold mica (phlogopite), black mica, and scaly mica (lepidolite). Examples of the synthetic micas include non-swelling micas such as fluorophlogopite $KMg_3(AlSi_3O_{10})F_2$ and potassium tetrasilicic mica $KMg_{2.5}(Si_4O_{10})F_2$; and swelling micas such as sodium tetrasilicic mica $NaMg_{2.5}(Si_4O_{10})F_2$, Na or Li type teniolite $(Na,Li)Mg_2Li(Si_4O_{10})F_2$, and montmorillonite Na or Li hectorite $(Na,Li)_{1/8}Mg_{2/5}L_{1/8}(Si_4O_{10})F_2$; and the like. Synthetic smectites are also useful.

In the invention, fluorine-containing swelling micas are particularly useful among the mica compounds mentioned above. The swelling synthetic micas have a laminated structure of unit crystal lattice layers having a thickness of approximately 10 to 15 Å, and show metal atoms substitution in lattices at much higher degree than other clay minerals. As a result, the lattice layers become deficient in the amount of positive charges, and cations such as $Na^+$, $Ca^{2+}$, or $Mg^{2+}$ are absorbed between the layers to compensate for the deficiency. The cations present between the layers are called exchangeable cations and may be exchanged with various cations. When the cations between the layers are $Li^+$ or $Na^+$ in particular, the small ionic radii provide weak linkage of crystal-layer lattices, and thus the mica compound swells significantly with water. If a shear is applied to the mica compound in that state, the mica compound is easily cleaved to form stable sol in water. Swelling synthetic micas strongly tend to show that property and they are preferred in the invention. In particular, swelling synthetic mica may be preferably used.

As a shape of the mica compound used in the invention, the thickness is preferably smaller from the viewpoint of adsorption on the organic resin fine particles, and the plate size is preferably larger within the range which does not inhibit the smoothness of the coated surface or permeability to active lights. Accordingly, the aspect ratio is preferably 20 or more, more preferably 100 or more, and still more preferably 200 or more. The aspect ratio is a ratio of thickness to the major axis of a particle, and is measured from, for example, a microphotographic projection drawing of the particle. The higher the aspect ratio is, the higher the effect is.

Particles of the mica compound for use in the invention preferably have an average major axis length of 0.3 to 20 µm, more preferably 0.5 to 10 µm, and still more preferably 1 to 5 µm. The average thickness of the particles is preferably 0.1 µm or less, more preferably 0.05 µm or less, and still more preferably 0.01 µm or less. Specifically, for example, typical swelling synthetic mica has a thickness of 1 to 50 nm and a face size (major axis length) of approximately 1 to 20 µm.

The amount of the mica compound contained in the protective layer depends on the addition amount and kind of the fine particles composed of an organic resin. In general, the mass ratio of the mica particles to the fine particles composed of an organic resin is preferably in the range of 3:1 to 2:3, more preferably in the range of 2:1 to 1:1. When the amount of the mica compound is too small relative to the fine particles composed of an organic resin, its effect for improvement of dispersibility is low, while when the amount of the mica compound is too large, scratch resistance upon rubbing against the rear surface of the support is deteriorated. Even when plural kinds of mica compounds are used in combination, the total amount of these mica compounds need to be within the above-defined mass ratio.

(Polyvinyl Alcohol)

The requirement of the protective layer in the invention is that the layer is excellent in adhesiveness to the image forming layer, has a surface with low adhesiveness to other materials, and is readily removable in the developing step after exposure.

To attain such desired basic characteristics of the protective layer, polyvinyl alcohol is used as the binder component of the protective layer in the invention. Polyvinyl alcohol has an excellent film forming property and a relatively low adhesive surface.

The polyvinyl alcohol used in the invention has a saponification degree of preferably 85 to 99, more preferably 91 to 99. When the saponification degree is within the range, the polyvinyl alcohol may have any structure as long as it contains an unsubstituted vinyl alcohol unit to develop a required oxygen-blocking property and low adhesiveness of the surface. More specifically, the polyvinyl alcohol may be partially substituted by an ester, ether, or acetal, partially modified or may partially contain other copolymerization components.

In general, the higher the saponification degree of the polyvinyl alcohol is, or the higher the content of the unsubstituted vinyl alcohol unit in the protective layer is, the higher the oxygen-blocking property is. In the protective layer in the invention, the oxygen-blocking property of the protective layer may be further improved for example by using polyvinyl alcohol having a saponification degree of 91 mol % or more in combination with a mica compound and fine particles composed of an organic resin.

The polyvinyl alcohol preferably has a polymerization degree in the range of 200 to 2400.

Specific examples of the polyvinyl alcohol include PVA-102, PVA-103, PVA-104, PVA-105, PVA-110, PVA-117, PVA-120, PVA-124, PVA-117H, PVA-135H, PVA-HC, PVA-617, PVA-624, PVA-706, PVA-613, PVA-CS and PVA-CST manufactured by Kuraray Co., Ltd., GOSENOL NL-05, NM-11, NM-14, AL-06, P-610, C-500, A-300 and AH-17 manufactured by Nippon Synthetic Chemical Industry Co., Ltd., and JF-04, JF-05, JF-10, JF-17, JF-17L, JM-05, JM-10, JM-17, JM-17L, JT-05, JT-13 and JT-15 manufactured by JAPAN VAM&POVAL CO., LTD.

Preferable examples of the specific polyvinyl alcohol in the invention also include carboxy-modified polyvinyl alcohols such as itaconic acid- or maleic acid-modified polyvinyl alcohol, and sulfonic acid-modified polyvinyl alcohol.

These acid-modified polyvinyl alcohols are also preferably used. Preferable examples of the acid-modified polyvinyl alcohol include KL-118, KM-618, KM-118, SK-5102, MP-102 and R-2105 manufactured by Kuraray Co., Ltd., GOSENAL CKS-50, T-HS-1, T-215, T-350, T-330 and T-330H manufactured by Nippon Synthetic Chemical Industry Co., Ltd., and AF-17, AT-17 etc. manufactured by JAPAN VAM&POVAL CO., LTD.

The content of the polyvinyl alcohol is preferably in the range of 45 to 95% by mass, more preferably in the range of 50 to 90% by mass, based on the total solid content contained in the protective layer. A content of less than 45% by mass may result in insufficient film-forming properties and in a reduction in sensitivity. Alternatively, a content of more than 95% by mass leads to deterioration of the efficiency with which adhesion between stacked planographic printing plate precursors is suppressed.

The polyvinyl alcohol preferably contains at least one binder polymer or alternatively may contain multiple binder polymers. When multiple polyvinyl alcohol is used, the total content thereof is preferably in the above-defined mass range.

The protective layer in the invention may contain a binder component other than polyvinyl alcohol as long as its effect is not impaired.

The content of polyvinyl alcohol in the protective layer, the coating amount of the intermediate layer and other conditions are selected in consideration of the oxygen-blocking property, development removability, fogging property, adhesiveness, and scratch resistance.

The protective layer in the invention preferably has an oxygen permeability of 0.5 ml/m$^2$·day to 100 ml/m$^2$·day under conditions of 25° C., 60% RH, and 1 atmospheric pressure. It is that preferable that a composition which achieves this oxygen permeability is selected.

A coloring agent (water-soluble dye) which has excellent permeability to rays used for exposing the image forming layer (infrared rays in the invention) and efficiently absorbs rays having a wavelength not involved in the exposure may be contained in the protective layer in the invention. The safelight suitability may thereby be improved without decrease in the sensitivity.

(Formation of the Protective Layer)

The protective layer in the invention is formed as follows: a dispersion of the fine particles composed of an organic resin is mixed with a dispersion of the mica compound under stirring, and the mixed dispersion is mixed with a binder component containing polyvinyl alcohol (or an aqueous solution of a binder component containing polyvinyl alcohol) to prepare a protective layer coating solution, and the solution is applied onto a image forming layer to form a protective layer.

An example of the general method of dispersing the mica compound used in the protective layer will be described. First, 5 to 10 parts by mass of the swelling layered compound mentioned above as a preferable layered compound is added to 100 parts by mass of water, and left sufficiently to reach a stable state, so that the layered compound swells. Then, the mixture is treated with a dispersing machine, so that the layered compound is dispersed. Examples of the dispersing machine to be used include various mills that mechanically apply direct force for dispersing, high-speed stirring dispersing machines having high shear force, and dispersing machines giving high-intensity ultrasonic energy. Specific examples include a ball mill, a sand grinder mill, a viscomill, a colloid mill, a homogenizer, a dissolver, a Polytron, a homomixer, a homoblender, a Keddy mill, a jet agitator, a capillary emulsifier, a liquid siren, an electromagnetic strain ultrasonic generator, and an emulsifier having a Poleman whistle. A 2 to 15% by mass dispersion of the mica compound dispersed by the method described above is highly viscous or gelled and extremely excellent in storage stability.

When this dispersion is used to prepare a protective layer coating solution, the protective layer coating solution is prepared preferably by mixing it with an aqueous suspension of fine particles composed of an organic resin, mixing them, sufficiently stirring the mixture, and mixing it with a binder component including polyvinyl alcohol (or an aqueous solution of a binder component including the specific polyvinyl alcohol).

Known additives such as a surfactant for improvement in coatability and a water-soluble plasticizer for improvement in the physical properties of film may be added to the protective layer coating solution. Examples of the water-soluble plasticizer include propionamide, cyclohexanediol, glycerol, and sorbitol. A water-soluble (meth)acrylic polymer may also be added. Known additives for improvement in the adhesiveness of the protective layer to the image forming layer and the storability of the coating solution may further be added to the coating solution.

A method of forming the protective layer in the invention is not particularly limited, and the method described in U.S. Pat. No. 3,458,311 or JP-A No. 55-49729 may be used.

The coating amount of the protective layer according to the invention is preferably 0.1 to 4.0 g/m$^2$, more preferably 0.3 to 3.0 g/m$^2$. When the coating amount is lower than 0.1 g/m$^2$, the film strength of the protective layer may not be maintained and abrasion resistance may be deteriorated. When the coating amount is higher than 3.0 g/m$^2$, light entering the protective layer upon exposure is scattered to cause deterioration in image quality, and oxygen permeability is made so low that safelight suitability may be deteriorated.

The protective layer in the invention may have a layered structure. In this case too, the coating amount in terms of the total amount of the protective layers in the layered structure is preferably in the range defined above.

<Back Coat Layer>

The planographic printing plate precursor of the invention may be provided if necessary with a back coat layer on the rear surface (surface opposite to the surface where the image forming layer is formed) of the support.

The back coat is preferably a coating layer consisting of metal oxides obtained by hydrolysis and polycondensation of organic polymer compounds described in JP-A No. 5-45885 and organic or inorganic metal compounds described in JP-A No. 6-35174. Among these coating layers, coating layers made of metal oxides obtained from silicon alkoxy compounds such as $Si(OCH_3)_4$, $Si(OC_2H_5)_4$, $Si(OC_3H_7)_4$ and $Si(OC_4H_9)_4$ are particularly preferable because these starting materials are easily available inexpensively and a coating layer of metal oxides obtained therefrom is excellent in development durability.

Other preferable examples of the back coat layer in the invention include a back coat layer composed of an organic resin film formed on the rear surface of the support.

A particularly preferable example is an organic resin film composed of an organic polymer compound having a softening point of 70° C. or more as determined by the Vicat method (method of measuring polymer softening point by American Society for Testing Method ASTM D1235).

Preferable examples of the resin capable of forming a back coat layer consisting of this organic resin film include thermosetting resins such as urea resins, epoxy resins, phenolic resins, melamine resins, and diallyl phthalate resins. Among these resins, epoxy resins and phenolic resins are preferable from the viewpoint of forming a layer having a high physical strength. Specific examples of the epoxy resins include bisphenol A epoxy resins, bisphenol F epoxy resins, glycidyl ester epoxy resins, and biphenyl epoxy resins. Specific examples of the phenol resins include novolac resins and pyrogallol acetone resins such as phenol formaldehyde resins, m-cresol formaldehyde resins, p-cresol formaldehyde resins, m-/p-mixed cresol formaldehyde resins, mixed phenol/cresol (m-, p-, or m-/p-mixed) formaldehyde resins.

Further examples of usable phenolic resins include a condensation polymer of phenol having an alkyl group having 3 to 8 carbon atoms as the substituent and formaldehyde as described in U.S. Pat. No. 4,123,279, such as a condensation polymer of t-butylphenol and formaldehyde resin, or a condensation polymer of octylphenol and formaldehyde resin, or an organic resin having a phenol structure containing an electron-withdrawing group on an aromatic ring as described in JP-A No. 2000-241972, which was filed by the inventors.

As these resins, the weight-average molecular weight of the resin is preferably 500 or more, more preferably 1000 to 700000, from the viewpoint of improving the handleability of the planographic printing plate precursor. The number-average molecular weight of the resin is preferably 500 or more, more preferably 750 to 650000. The degree of dispersion (weight-average molecular weight/number-average molecular weight) of the resin is preferably 1.1 to 10.

The back coat layer coating solution in the invention may contain a surfactant for the purpose of improving the properties of the coated surface and controlling the physical properties of the surface. Examples of the surfactant to be used herein include anionic surfactants having any one of carboxylate, sulfonate, sulfate ester, and phosphate ester; cationic surfactants such as aliphatic amines or quaternary ammonium salts; betaine-type amphoteric surfactants; nonionic surfactants such as fatty acid esters of polyoxy compounds, polyalkylene oxide condensates, or polyethylene imine condensates; and fluorinated surfactants. Among them, fluorinated surfactants are particularly preferable.

The amount of the surfactant added is appropriately selected according to the desired use, and is usually in the range of 0.1 to 10.0% by mass based on the back coat layer.

The back coat layer coating solution in the invention may contain a curing agent capable of curing reaction with the resin after application and drying. The curing agent is preferably a compound having a bifunctional or more methylol group, an epoxy group or an amino group, most preferably trimethylol propanes. In consideration of the stability of the coating solution, the curing agent may be a precursor that generates a methylol group by heat or hydrolysis.

The amount of the curing agent added is appropriately selected according to the desired use, and is usually in the range of 0.1 to 10.0% by mass of the back coat layer.

The planographic printing plate precursor of the invention has an effect of giving a large number of high-quality prints even under severe printing conditions by satisfying high printing durability on an image area and excellent scumming resistance on a non-image area.

The planographic printing plate precursor of the invention may give a planographic printing plate by applying a known plate-making method adapted to its image forming layer.

Thereafter, the resulting planographic printing plate is loaded onto a printing machine and used for printing on a large number of sheets.

EXAMPLES

Hereinafter, the present invention was described in more detail by reference to the Examples, which however are not intended to limit the invention.

Examples 1 to 8 and Comparative Examples 1 to 5

Preparation of a Support

An aluminum plate having a thickness of 0.3 mm (material: 1050) was degreased with 10% by mass aqueous sodium aluminate solution for removal of surface rolling oil at 50° C. for 30 seconds, and the aluminum surface was grained with three bundle nylon brushes having a bristle diameter of 0.3 mm by using an aqueous suspension of pumice containing pumice particles with a median diameter of 25 μm (specific density: 1.1 g/cm$^3$), followed by sufficient washing with water. The plate was dipped and etched in 25% by mass aqueous sodium hydroxide solution at 45° C. for 9 seconds, then washed with water, dipped in 20% by weight nitric acid at 60° C. for 20 seconds, and washed with water. The amount of etching on the grained surface was approximately 3 g/m$^2$.

The plate was subjected continuously to electrochemical surface roughening treatment with an alternating voltage of 60 Hz. The electrolyte used was 1% by mass aqueous nitric acid solution (containing 0.5% by mass aluminum ion) at a liquid temperature of 50° C. The electrochemical surface roughening treatment was carried out with a carbon electrode as a counter electrode, wherein the time TP required for the electric current to reach from 0 to a peak was 0.8 msec., the duty ratio was 1:1 and a trapezoid rectangular wave alternating current was used. Ferrite was used as an assistant anode. The current density was 30 A/dm$^2$ in terms of electric current peak, and 5% of the electric current from the power source was fed to the assistant anode. The electrical quantity was 175 C/dm$^2$ in terms of total electrical quantity upon anodizing of the aluminum plate. Thereafter, the plate was washed by spraying with water.

Then, the plate was subjected to electrochemical surface roughening in an electrolyte solution of 0.5% by mass aqueous hydrochloric acid solution (containing 0.5% by mass aluminum ion) at a liquid temperature of 50° C. under the condition of an electrical quantity of 50 C/dm$^2$ when the aluminum plate works as the anode, by a method similar to the nitric acid electrolysis described above. Then, the plate was washed by spraying with water.

A direct current anodic oxide film having a thickness of 2.5 g/m$^2$ was formed on the plate by using an electrolyte solution of 15% by mass sulfuric acid (containing 0.5% by mass aluminum ion) at an electric current density of 15 A/dm$^2$, then washed with water, and dried.

The arithmetic average roughness (arithmetic mean deviation of the profile) (Ra) of this aluminum support, as determined by using a needle having a diameter of 2 μm, was 0.53 μm.

<Formation of an Intermediate Layer>

Subsequently, the following intermediate layer coating solution was applied via a wire bar onto the aluminum support, and the resultant coating was dried at 100° C. for 10 seconds. The coating amount (coating amount after drying) was 11 mg/m$^2$.

| (Intermediate layer coating solution) | |
|---|---|
| A specific copolymer in Table 1 or a comparative compund having the structure below | 0.05 g |
| Methanol | 27 g |
| Deionized water | 3 g |

The specific copolymers (a-1) to (a-8) used in the intermediate layer coating solution correspond to the exemplary compounds (a-1) to (a-8), respectively.

The comparative compounds (c-1) to (c-5) used in the intermediate layer coating solution are those having the following structures.

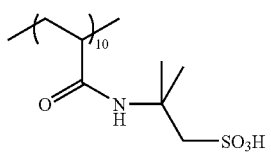

Mw = 32000

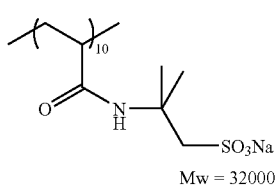

Mw = 33000

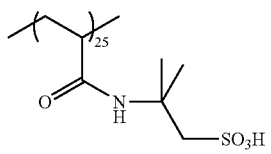

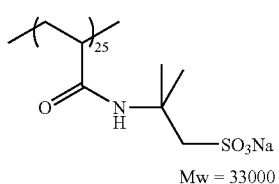

Mw = 33000

(c-1)

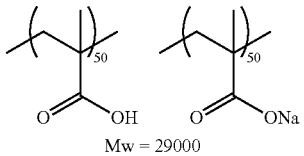

(c-2)

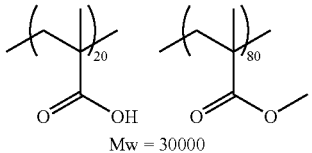

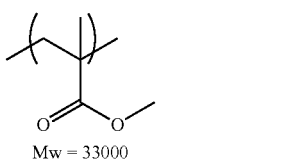

(c-3)

Mw = 29000

(c-4)

Mw = 30000

(c-5)

Mw = 33000

(Formation of an Image Forming Layer)

The intermediate layer formed as described above was coated via a wire bar with the image forming layer coating solution shown below such that the coating amount after drying became 0.9 g/m², followed by drying at 115° C. for 34 seconds in a hot-air oven, to form a image forming layer thereon.

| (Image forming layer coating solution) | |
|---|---|
| Infrared absorbing agent (IR-1 with the structure below) | 0.038 g |
| Polymerization initiator A (S-1 with the structure below) | 0.061 g |
| Polymerization initiator B (I-1 with the structure below) | 0.094 g |
| Mercapto compound (SH-1 with the structure below) | 0.015 g |
| Sensitizing agent (T-1 with the structure below) | 0.081 g |
| Addition-polymerizable compound (M-1 with the structure below) | 0.428 g |
| Binder polymer A (B-1 with the structure below) | 0.311 g |
| Binder polymer B (B-2 with the structure below) | 0.250 g |
| Binder polymer C (B-3 with the structure below) | 0.062 g |
| Polymerization inhibitor (Q-1 with the structure below) | 0.0012 g |
| Copper phthalocyanine pigment dispersion | 0.159 g |
| Fluorochemical surfactant (trade name: MEGAFAC F-780-F, 30% by mass solution in methyl isobutyl ketone (MIBK), manufactured by Dainippon Ink and Chemicals, Inc.) | 0.0081 g |
| Methyl ethyl ketone | 5.886 g |
| Methanol | 2.733 g |
| 1-Methoxy-2-propanol | 5.886 g |

IR-1

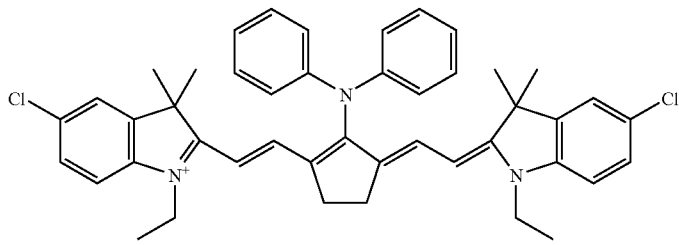

| (Image forming layer coating solution) |
|---|
S-1
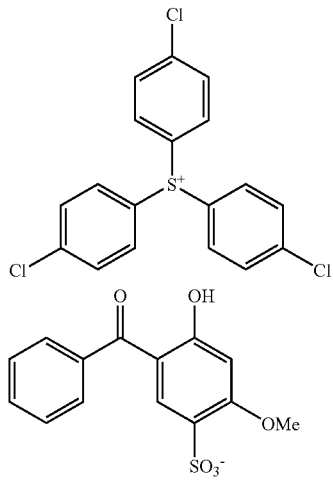
I-1
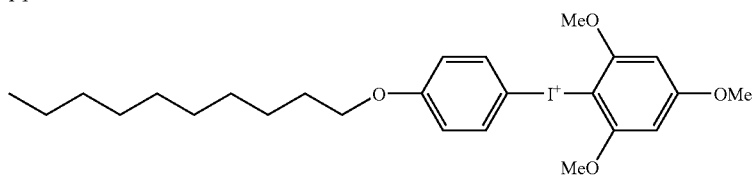
SH-1
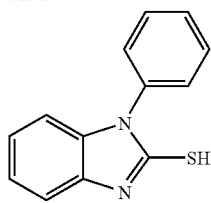
Q-1
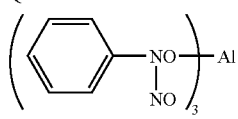
T-1
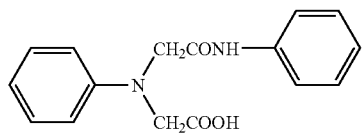
M-1
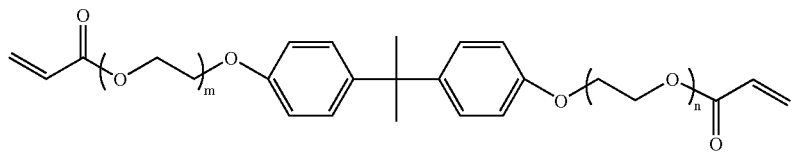
m + n = 4
B-1
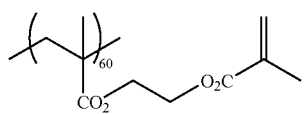

-continued
(Image forming layer coating solution)
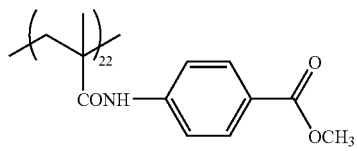
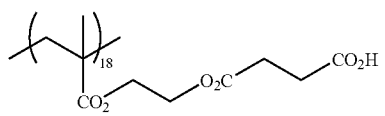
Mw = 95000
B-2
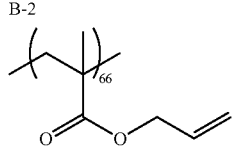
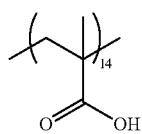
Mw = 130000
B-3
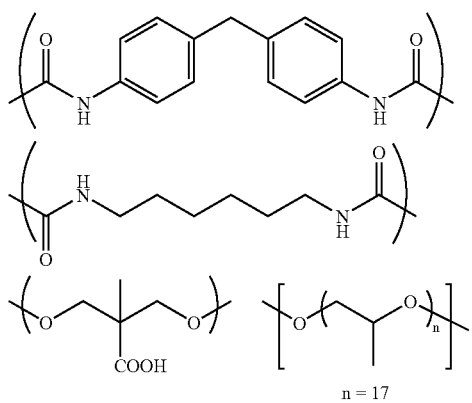
n = 17
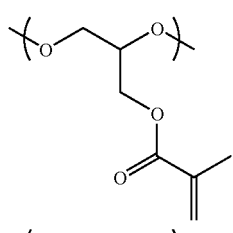
Mw = 110000

(Coating of a Protective Layer)

<Lower Protective Layer>

The surface of the image forming layer was coated via a wire bar with an aqueous mixture (protective layer coating solution) of synthetic mica (trade name: SOMASHIF MEB-3L, 3.2 mass % aqueous dispersion, manufactured by Co-op Chemical Co., Ltd.), polyvinyl alcohol (trade name: GOSE-RAN CKS-50, saponification degree of 99 mol %, polymerization degree of 300, sulfonic acid-modified polyvinyl alcohol, manufactured by Nippon Synthetic Chemical Industry Co., Ltd.), surfactant A (trade name: EMALEX 710, manufactured by Nippon Emulsion Co., Ltd.) and surfactant B (trade name: Adeka Pluronic P-84, manufactured by Asahi Denka Kogyo K.K.) and then dried at 125° C. for 30 seconds in a hot-air oven.

The synthetic mica (solid content)/polyvinyl alcohol/surfactant A/surfactant B ratio in this aqueous mixture (protective layer coating solution) was 7.5/89/2/1.5 (% by mass), and the amount of the aqueous mixture applied (coating amount after drying) was 0.5 $g/m^2$.

<Upper Protective Layer>

The surface of the lower protective layer was coated via a wire bar with an aqueous mixture (protective layer coating solution) of an organic filler (trade name: ART PEARL J-7P, manufactured by Negami Chemical Industrial Co. Ltd.), synthetic mica (trade name: SOMASHIF MEB-3L, 3.2% by mass aqueous dispersion, manufactured by Co-op Chemical Co., Ltd.), polyvinyl alcohol (trade name: L-3266, saponification degree of 87 mol %, polymerization degree of 300, sulfonic acid-modified polyvinyl alcohol, manufactured by Nippon Synthetic Chemical Industry Co., Ltd.), a thickener (trade name: SEROGEN FS-B, manufactured by Dai-Ichi Kogyo Seiyaku Co., Ltd.) and a surfactant (trade name: EMALEX 710, manufactured by Nihon Emulsion Co., Ltd.) and then dried at 125° C. for 30 seconds in a hot-air oven.

The organic filler/synthetic mica (solid content)/polyvinyl alcohol/thickener/surfactant ratio in this aqueous mixture (protective layer coating solution) was 4.7/2.8/69.7/18.6/4.2 (% by mass), and the amount of the aqueous mixture applied (coating amount after drying) was 1.8 $g/m^2$.

In this manner, the planographic printing plate precursors in Examples 1 to 8 and Comparative Examples 1 to 5 are obtained.

<Evaluation>

(1) Evaluation of Sensitivity

The resulting planographic printing plate precursor was exposed to light with Trendsetter 3244 VX (manufactured by Creo Co., Ltd.) equipped with a water-cooling type 40 W infrared semiconductor laser under the conditions of an output power in the range of 0 to 8 W changed by 0.15 in log E with a resolution of 175 1 pi at an outer drum revolution number of 150 rpm. Exposure was carried out under the condition of 50% RH at 25° C. After the exposure, the planographic printing plate precursor was developed at 30° C. for 12 seconds with LP-1310 News manufactured by FUJIFILM Corporation. A dilution of DH-N (manufactured by FUJIFILM Corporation) with water in a ratio of 1:4 was used as the developing solution, and a dilution of GN-2K (manufactured by FUJIFILM Corporation) with water in a ratio of 1:1 was used as the finisher.

The density of the developed image area of the planographic printing plate obtained by development was measured with a Macbeth reflection densitomer RD-918, and a red filter attached to the densitomer was used to measure the cyan density. A reciprocal number of the amount of exposure light necessary for attaining a density of 0.8 was evaluated as sensitivity. Assuming that the sensitivity of the planographic printing plate obtained in Example 1 was regarded as 100, the evaluation results of the other planographic printing plates are shown in relative sensitivity. A higher value is indicative of higher sensitivity. The results are shown in Table 1.

(2) Evaluation of Raw Stock Storability (Evaluation of Aging Properties)

The planographic printing plate precursor in a light-unexposed state was stored at 45° C. under 75% RH for 3 days, and then subjected to exposure and development in the same manner as in (3) Evaluation of printing durability below, and the density of the non-image area was measured with a Macbeth reflection densitomer RD-918. The planographic printing plate precursor just after preparation was also subjected to exposure and development in the same manner, and the density of the non-image area was measured.

In this example, the difference $\Delta$ in the density of the non-image area in the planographic printing plate precursor before and after storage was determined and used as an indicator of raw stock storability.

A smaller $\Delta$ value indicates higher raw stock storability, and 0.02 or less is a practically usable level. The results are shown in Table 1.

(3) Evaluation of Printing Durability

The prepared planographic printing plate precursor was subjected to exposure using Trendsetter 3244 VX (manufactured by Creo Co., Ltd.) equipped with a water-cooling type 40 W infrared semiconductor laser under the conditions of an output of 8 W, an outer face drum rotation number of 206 rpm, and a plate surface energy of 100 $mJ/cm^2$ to form a 80% halftone tint image having a resolution of 175 1 pi. After the exposure, the protective layer was removed by washing with tap water, and then the precursor was developed in the same manner as in the development step in (1) Evaluation of sensitivity above. The resulting planographic printing plate was used in printing with a LITHRONE printing machine (manufactured by Komori Corporation). The printing durability of the solid image area was evaluated in terms of the number of printed sheets obtained by the time when the image began to be thinned. The results are shown in Table 1.

(4) Evaluation of Scumming Resistance in Printing

The planographic printing plate obtained in the same manner as in "(3) Evaluation of printing durability" above was used in printing on 10,000 sheets with a Mitsubishi Diamond F2 Printing Machine (manufactured by Mitsubishi Heavy Industries, Ltd.). Separately, the planographic printing plate precursor underwent accelerated aging at 60° C. and 75% RH for 2 days and then processed by the same method as in "(3) Evaluation of printing durability" above to prepare a planographic printing plate which was then used in printing in the same manner as the above planographic printing plate, which did not undergo accelerated aging before printing.

Scumming resistance on the non-image area was evaluated visually according to 5 levels. A larger numerical value is indicative of higher scumming resistance. In this evaluation, 4 or more is a practical level, and 3 is an acceptable lower limit. The results are shown in Table 1.

TABLE 1

| | Specific copolymer or comparative compound | Sensitivity | Printing durability (sheets) | Scumming resistance (before accelerated aging) | Scumming resistance (after accelerated aging) | Raw stock storability Δ fog |
|---|---|---|---|---|---|---|
| Example 1 | (a-1) | 100 | 120,000 | 5 | 5 | 0 |
| Example 2 | (a-2) | 100 | 110,000 | 5 | 5 | 0 |
| Example 3 | (a-3) | 100 | 110,000 | 5 | 5 | 0 |
| Example 4 | (a-4) | 100 | 120,000 | 5 | 5 | 0 |
| Example 5 | (a-5) | 100 | 110,000 | 5 | 5 | 0 |
| Example 6 | (a-6) | 100 | 130,000 | 5 | 4 | 0 |
| Example 7 | (a-7) | 100 | 120,000 | 5 | 5 | 0 |
| Example 8 | (a-8) | 100 | 110,000 | 5 | 5 | 0 |
| Comparative Example 1 | (c-1) | 100 | 80,000 | 2 | 2 | 0.05 |
| Comparative Example 2 | (c-2) | 100 | 30,000 | 4 | 3 | 0.03 |
| Comparative Example 3 | (c-3) | 100 | 50,000 | 3 | 1 | 0.08 |
| Comparative Example 4 | (c-4) | 100 | 100,000 | 1 | 1 | 0.02 |
| Comparative Example 5 | (c-5) | 100 | 100,000 | 1 | 1 | 0 |

As shown above, it may be seen that the planographic printing plate precursors in Examples 1 to 8 show high printing durability and excellent scumming resistance on the non-image area and are excellent in the balance therebetween, and may exhibit excellent printing performance.

It may be seen that in Comparative Examples 1 to 4, there is a problem in raw stock storability. This is probably because a change causing deterioration in the scumming resistance of an intermediate layer outside of the scope of the invention arises for some reason when the planographic printing plate precursor is left under high temperature and high humidity conditions.

Some exemplary embodiments of the invention are shown below.

(1) A planographic printing plate precursor having an intermediate layer and a image forming layer in this order on a support, the intermediate layer comprising at least one copolymer comprising:

a structural unit represented by the following Formula (1):

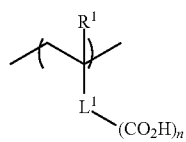

Formula (1)

wherein $R^1$ represents a hydrogen atom, a substituent having from 1 to 30 carbon atoms, or a halogen atom, $L^1$ represents a single bond or a (n+1)-valent connecting group, and n represents an integer of from 1 to 10, a structural unit represented by the following Formula (2):

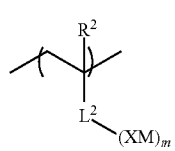

Formula (2)

wherein $R^2$ represents a hydrogen atom, a substituent having from 1 to 30 carbon atoms, or a halogen atom, $L^2$ represents a single bond or a (m+1)-valent connecting group, X represents a carboxylate ion, M represents a counter cation necessary for neutralization of charge, and m represents an integer of from 1 to 10, and a structural unit represented by the following Formula (3):

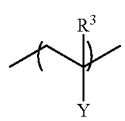

Formula (3)

wherein $R^3$ represents a hydrogen atom, a substituent having from 1 to 30 carbon atoms, or a halogen atom, and Y represents a substituent having from 0 to 30 carbon atoms, provided that Y does not represent a carboxy group and does not represent the same constituent as (XM) in Formula (2).

(2) The planographic printing plate precursor according to (1), wherein Y in Formula (3) represents a substituent comprising a group selected from a carboxylate ester group, a carbamoyl group, an aromatic group, a hydroxy group, and an acyloxy group.

(3) The planographic printing plate precursor according to (1), wherein Y in Formula (3) is a substituent comprising a carboxylate ester group.

(4) The planographic printing plate precursor according to (1), wherein the molar ratio of content of the structural unit represented by Formula (1) to content of the structural unit represented by Formula (2) is from 0.8:0.2 to 0.2:0.8.

(5) The planographic printing plate precursor according to (1), wherein the molar ratio of total content of the structural units represented by Formulae (1) and (2) to content of the structural unit represented by Formula (3) is from 0.8:0.2 to 0.2:0.8.

(6) The planographic printing plate precursor according to (1), wherein the image forming layer is recorded with an infrared laser.

(7) The planographic printing plate precursor according to (1), wherein the image forming layer comprises a polymerization initiator, a polymerizable compound, and a binder polymer.

(8) The planographic printing plate precursor according to (7), wherein the image forming layer further comprises an infrared absorbing agent.

(9) The planographic printing plate precursor according to (1), which has, on the recording layer, a protective layer comprising polyvinyl alcohol, fine particles composed of an organic resin, and mica particles.

(10) A method of producing a copolymer comprising:
a structural unit represented by the following Formula (1):

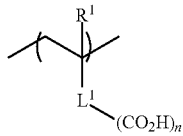

Formula (1)

wherein $R^1$ represents a hydrogen atom, a substituent having from 1 to 30 carbon atoms, or a halogen atom, $L^1$ represents a single bond or a (n+1)-valent connecting group, and n represents an integer of from 1 to 10,
a structural unit represented by the following Formula (2):
Formula (2)

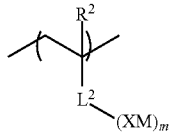

Formula (2)

wherein $R^2$ represents a hydrogen atom, a substituent having from 1 to 30 carbon atoms, or a halogen atom, $L^2$ represents a single bond or a (m+1)-valent connecting group, X represents a carboxylate ion, M represents a counter cation necessary for neutralization of charge, and m represents an integer of from 1 to 10, and
a structural unit represented by the following Formula (3):

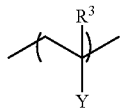

Formula (3)

wherein $R^3$ represents a hydrogen atom, a substituent having from 1 to 30 carbon atoms, or a halogen atom, and Y represents a substituent having from 0 to 30 carbon atoms, provided that Y does not represent a carboxy group and does not represent the same constituent as (XM) in Formula (2),
the method comprising synthesizing a copolymer containing a structural unit represented by Formula (1) and a structural unit represented by Formula (3) in a substantially water-free solvent and then adding water and a basic compound simultaneously or successively to produce a copolymer containing a structural unit represented by Formula (1), a structural unit represented by Formula (2) and a structural unit represented by Formula (3).

(11) The method of producing a copolymer according to (10), wherein Y in Formula (3) represents a substituent containing a group selected from a carboxylate ester group, a carbamoyl group, an aromatic group, a hydroxy group, and an acyloxy group.

(12) The method of producing a copolymer according to (10), wherein Y in Formula (3) represents a substituent containing a carboxylate ester group.

(13) The method of producing a copolymer according to (10), wherein the molar ratio of content of the structural unit represented by Formula (1) to content of the structural unit represented by Formula (2) is from 0.8:0.2 to 0.2:0.8.

(14) The method of producing a copolymer according to (10), wherein the molar ratio of total content of the structural units represented by Formulae (1) and (2) to content of the structural unit represented by Formula (3) is from 0.8:0.2 to 0.2:0.8.

What is claimed is:

1. A planographic printing plate precursor having an intermediate layer and an image forming layer in this order on a support,
the intermediate layer comprising at least one copolymer comprising:
a structural unit represented by the following Formula (1):

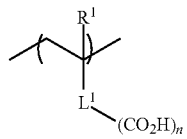

Formula (1)

wherein $R^1$ represents a hydrogen atom, a substituent having from 1 to 30 carbon atoms, or a halogen atom, $L^1$ represents a single bond or a (n+1)-valent connecting group, and n represents an integer of from 1 to 10,
a structural unit represented by the following Formula (2):

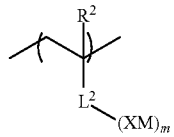

Formula (2)

wherein $R^2$ represents a hydrogen atom, a substituent having from 1 to 30 carbon atoms, or a halogen atom, $L^2$ represents a single bond or a (m+1)-valent connecting group, X represents a carboxylate ion, M represents a counter cation necessary for neutralization of charge, and m represents an integer of from 1 to 10, and
a structural unit represented by the following Formula (3):

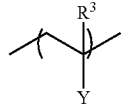

Formula (3)

wherein $R^3$ represents a hydrogen atom, a substituent having from 1 to 30 carbon atoms, or a halogen atom, and Y represents a substituent comprising a carboxylate ester group and having from 2 to 30 carbon atoms;
wherein the carboxylate ester group of Y is at least one selected from the group consisting of methoxycarbonyl, ethoxycarbonyl, propyloxycarbonyl, isopropyloxycarbonyl, butyloxycarbonyl, hexyloxycarbonyl, octyloxycarbonyl, cyclohexyloxycarbonyl, 2-ethylhexyloxycarbonyl, benzyloxycarbonyl, 2-hydroxyethoxycarbonyl, 2-methoxyethoxycarbonyl and phenoxycarbonyl.

2. The planographic printing plate precursor according to claim 1, wherein the molar ratio of content of the structural unit represented by Formula (1) to content of the structural unit represented by Formula (2) is from 0.8:0.2 to 0.2:0.8.

3. The planographic printing plate precursor according to claim 1, wherein the molar ratio of total content of the structural units represented by Formulae (1) and (2) to content of the structural unit represented by Formula (3) is from 0.8:0.2 to 0.2:0.8.

4. The planographic printing plate precursor according to claim 1, wherein the image forming layer is recorded with an infrared laser.

5. The planographic printing plate precursor according to claim 1, wherein the image forming layer comprises a polymerization initiator, a polymerizable compound, and a binder polymer.

6. The planographic printing plate precursor according to claim 5, wherein the image forming layer further comprises an infrared absorbing agent.

7. The planographic printing plate precursor according to claim 1, which has, on the image forming layer, a protective layer comprising polyvinyl alcohol, fine particles composed of an organic resin, and mica particles.

* * * * *